(12) United States Patent
Taku

(10) Patent No.: US 6,375,367 B2
(45) Date of Patent: *Apr. 23, 2002

(54) OPTICAL APPARATUS

(75) Inventor: Masakazu Taku, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/105,755

(22) Filed: Jun. 26, 1998

(30) Foreign Application Priority Data

Jul. 2, 1997 (JP) ................................................. 9-190789

(51) Int. Cl.[7] .............................. G03B 1/00; G03B 17/02

(52) U.S. Cl. ........................ 396/418; 396/536; 396/538

(58) Field of Search ................................ 396/387, 411, 396/418, 535, 536, 538

(56) References Cited

U.S. PATENT DOCUMENTS

| | | | | | |
|---|---|---|---|---|---|
| 5,481,325 A | * | 1/1996 | Wada et al. | ................. | 396/538 |
| 5,565,951 A | * | 10/1996 | Tokui | .......................... | 396/538 |
| 5,630,192 A | * | 5/1997 | Kobayashi | ................... | 396/513 |
| 5,761,559 A | * | 6/1998 | Yamazaki et al. | .......... | 396/513 |
| 5,809,359 A | * | 9/1998 | Taku | ........................... | 396/513 |
| 5,870,644 A | * | 2/1999 | Naka et al. | ................. | 396/512 |
| 5,987,268 A | * | 11/1999 | Takahashi et al. | .......... | 396/538 |

* cited by examiner

*Primary Examiner*—David M. Gray
(74) *Attorney, Agent, or Firm*—Robin, Blecker & Daley

(57) ABSTRACT

An optical apparatuses having a cartridge chamber lid, includes a motor, a sun gear which is driven by the motor, a planet gear meshing with the sun gear and arranged to move from a first position to a second position while rotating when the sun gear rotates in a first direction, and to move from the second position to the first position while rotating when the sun gear rotates in a second direction opposite to the first direction, and a lock mechanism which unlocks the cartridge chamber lid when the planet gear moves from the first position to the second position, and which maintains locking the cartridge chamber lid when the planet gear moves from the second position to the first position.

12 Claims, 35 Drawing Sheets

F I G. 5(a)
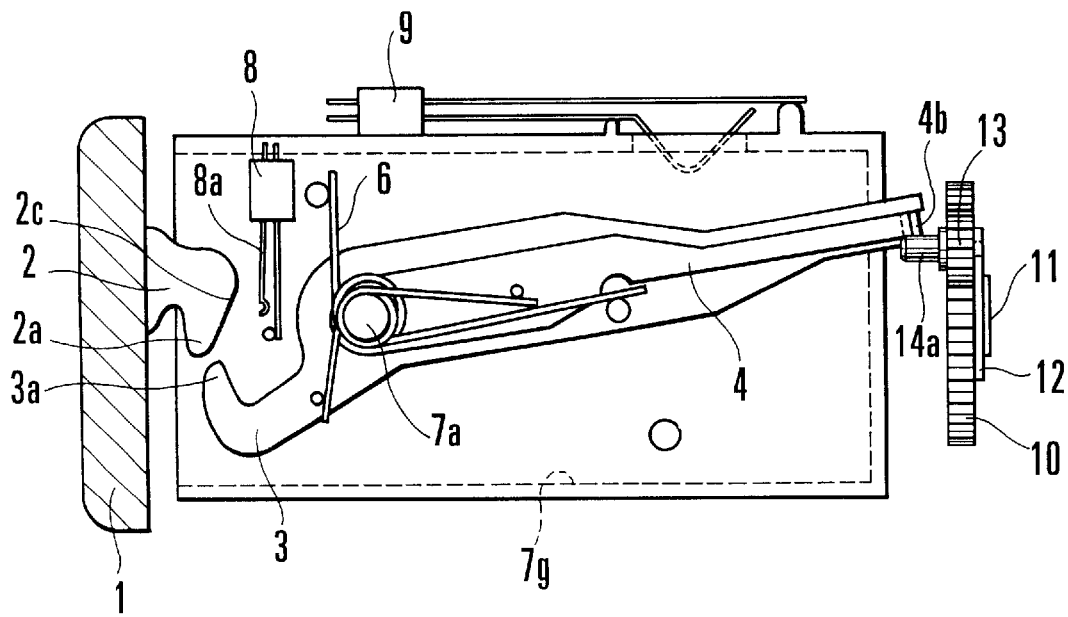
F I G. 5(b)
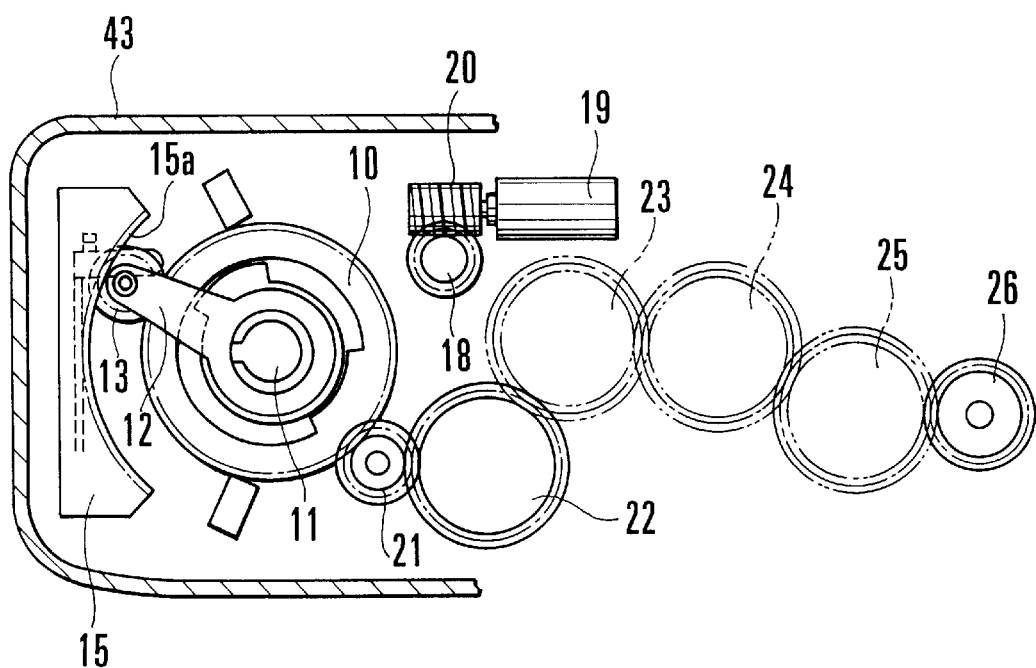

F I G. 24(a)
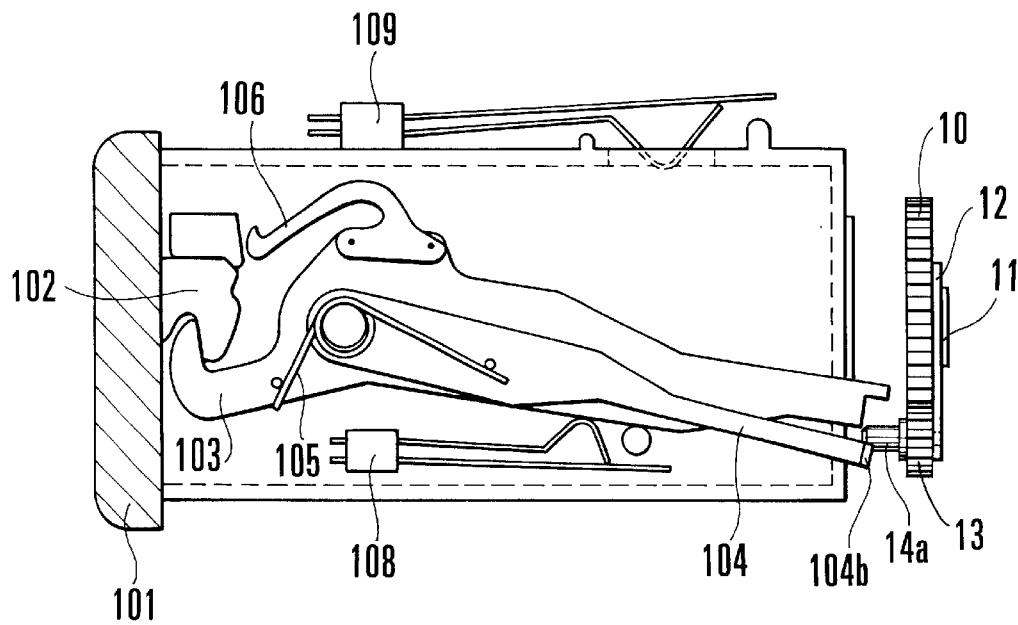
F I G. 24(b)
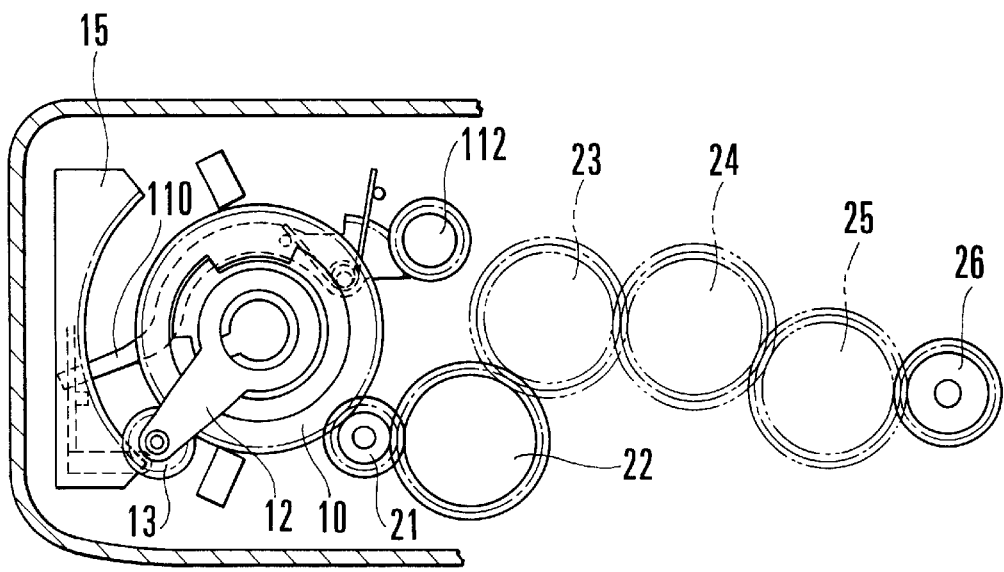

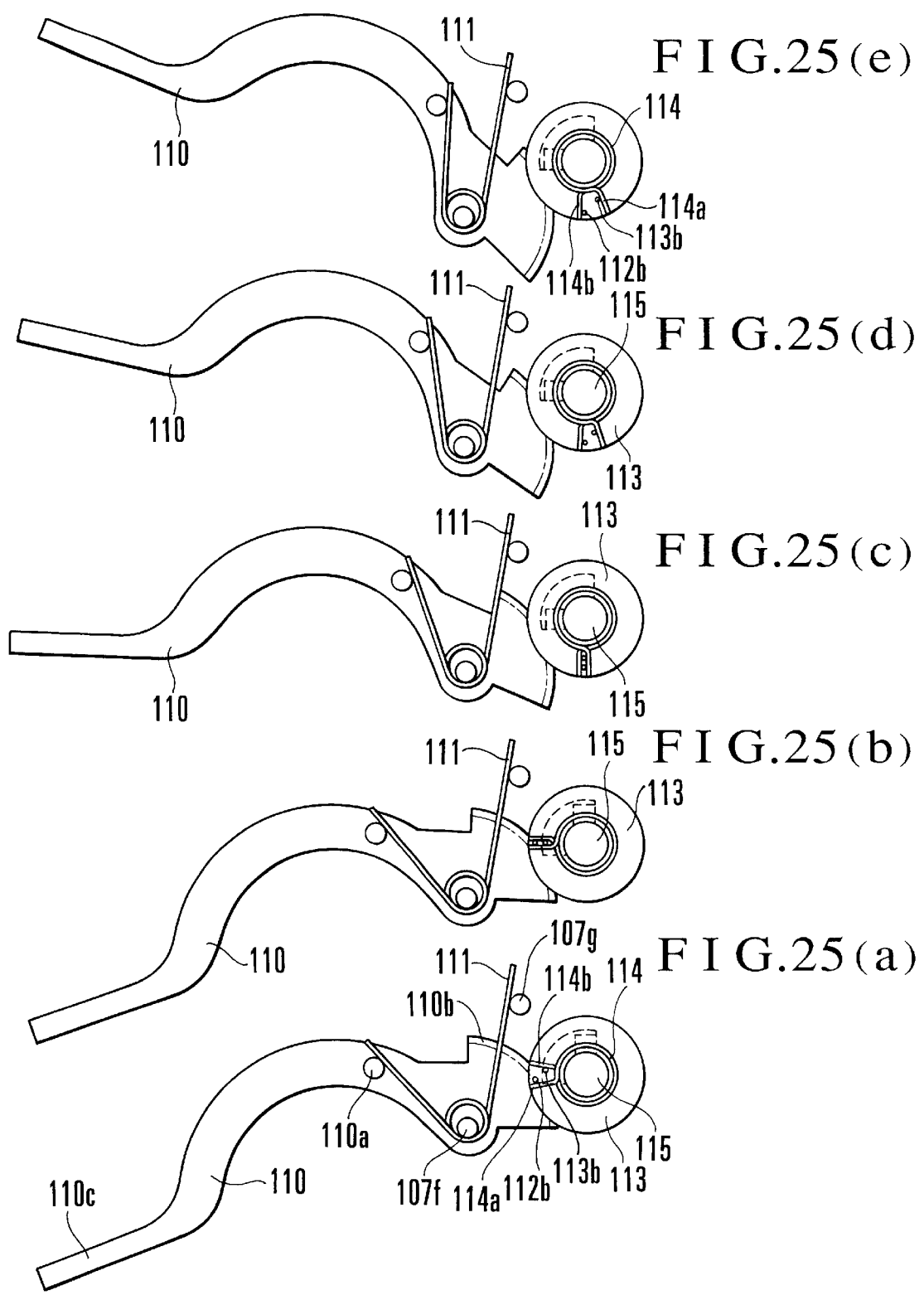

F I G. 35
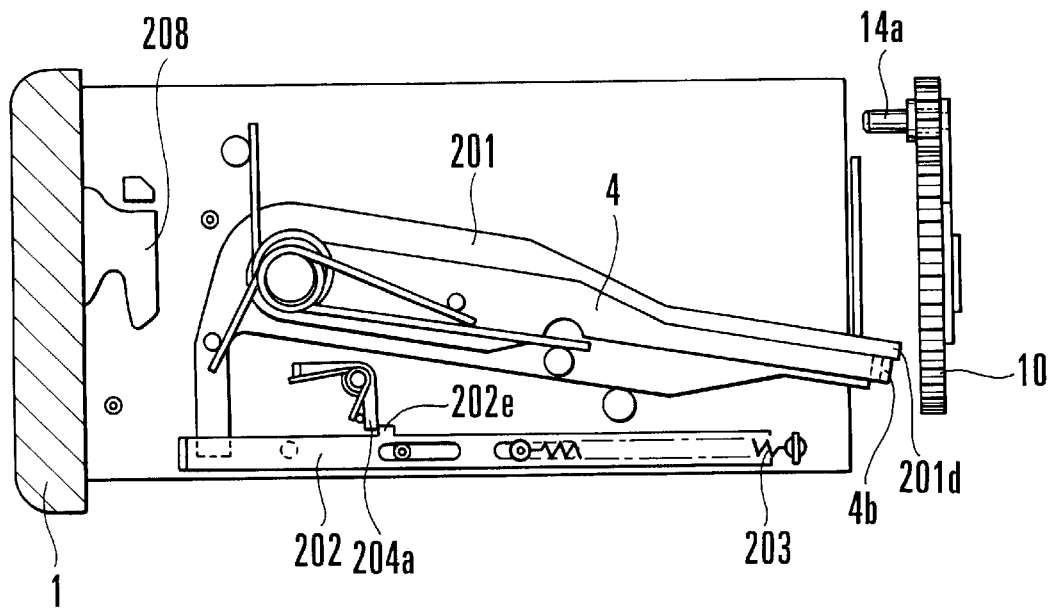
F I G. 36
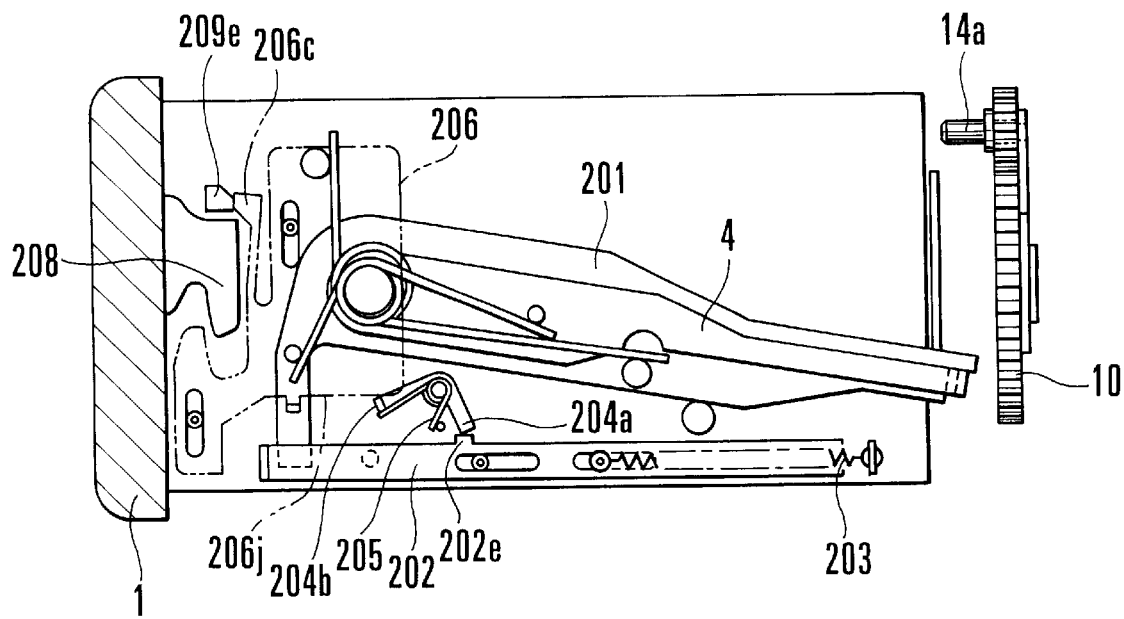

OPTICAL APPARATUS

BACKGROUND OF THE INVENTION

1. Field of the Invention

The present invention relates to an improvement on a cartridge chamber lid opening-and-closing mechanism.

2. Description of Related Art

In recent years, there have been put on the market, cameras having the structure in which when a film cartridge of the type having even a fore end part (leader part) of film rolled therein has been loaded into the camera, a fork of the camera is driven to thrust out the film from the inside of the film cartridge and the film is advanced to be wound onto a spool shaft of the camera.

Such a kind of camera has a shortcoming in that, when the film has been pulled out from the inside of the film cartridge loaded in a cartridge chamber of the camera, the film would be exposed to light if a cartridge chamber lid happens to be inadvertently opened by the user of the camera. To prevent this accident, a lock mechanism for the cartridge chamber lid has been variously developed. For example, in Japanese Laid-Open Patent Application No. HEI 8-286245, there is disclosed a camera in which a lock member, which is disposed at a part of a film transport gear train, is arranged to render a cartridge chamber lid inoperable during process of winding or rewinding the film by moving the lock member to a position where the lock member acts to inhibit an opening operation on an operation knob provided at the cartridge chamber lid.

According to the camera disclosed in Japanese Laid-Open Patent Application No. HEI 8-286245, the cartridge chamber lid can be prevented from being inadvertently opened at the time of winding or rewinding the film since the operation knob provided for operating the cartridge chamber lid is locked by the lock member under that condition. However, during the time when the rotating direction of a film transport motor is being changed from the winding direction to the rewinding direction upon completion of photo-taking of the last frame or upon the turning-on of a forced rewinding switch, the lock member is brought into a position where the operation knob is left unlocked. Therefore, if the operation knob happens to be inadvertently operated under this condition, the cartridge chamber lid would accidentally open.

BRIEF SUMMARY OF THE INVENTION

In accordance with one aspect of the invention, there is provided an optical apparatus having a cartridge chamber lid, which comprises a driving gear arranged to drive a member which engages a spool of a cartridge, and a lock mechanism which unlocks the cartridge chamber lid when a rotating direction of the driving gear changes from a first rotating direction for rewinding a film to a second rotating direction for thrusting out the film and which maintains locking the cartridge chamber lid when the rotating direction of the driving gear changes from the second rotating direction to the first rotating direction, so that the cartridge chamber lid can be locked and unlocked at an apposite timing.

The above and other aspects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 5(a) and 5(b) are sectional views showing the same essential parts in a state obtained when the cartridge chamber lid becomes operable with the unlocking action of the cartridge chamber lid progressing further from the state shown in FIGS. 4(a) and 4(b).

FIGS. 24(a) and 24(b) are sectional views showing the same essential parts in a state obtained at the commencement of film rewinding in the camera in the second embodiment of the invention.

FIGS. 25(a) to 25(e) show displacement taking place in the state of a driving system for a light-blocking door in association with the unlocking action of the cartridge chamber lid in the camera in the second embodiment of the invention.

FIG. 35 is a sectional view showing the same essential parts in a state obtained when an operation knob is unlocked to render the operation knob operable at any time and when the planet gear is in a second position in the camera in the fourth embodiment of the invention.

FIG. 36 is a sectional view showing the same essential parts in a state obtained immediately before a cartridge chamber lid opens after the process of an opening operation of the cartridge chamber lid is progressed by the operation of the operation knob from the state shown in FIG. 35.

DETAILED DESCRIPTION OF THE INVENTION

Hereinafter, preferred embodiments of the invention will be described in detail with reference to the drawings.

(First Embodiment)

Figure 1:
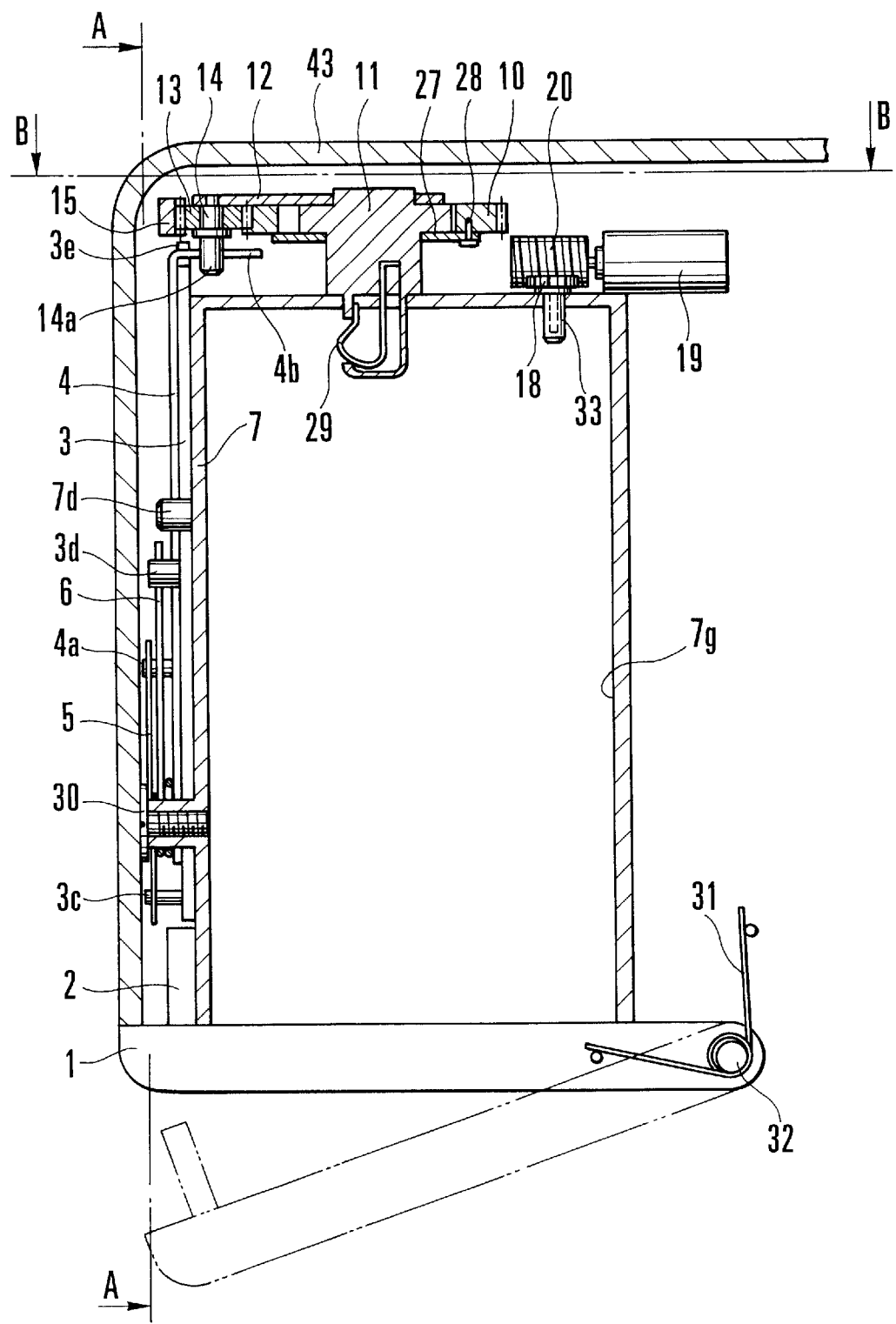
FIG. 1 is a sectional view showing a cartridge chamber and an arrangement therearound of a camera according to a first embodiment of the invention.
Figure 2A:
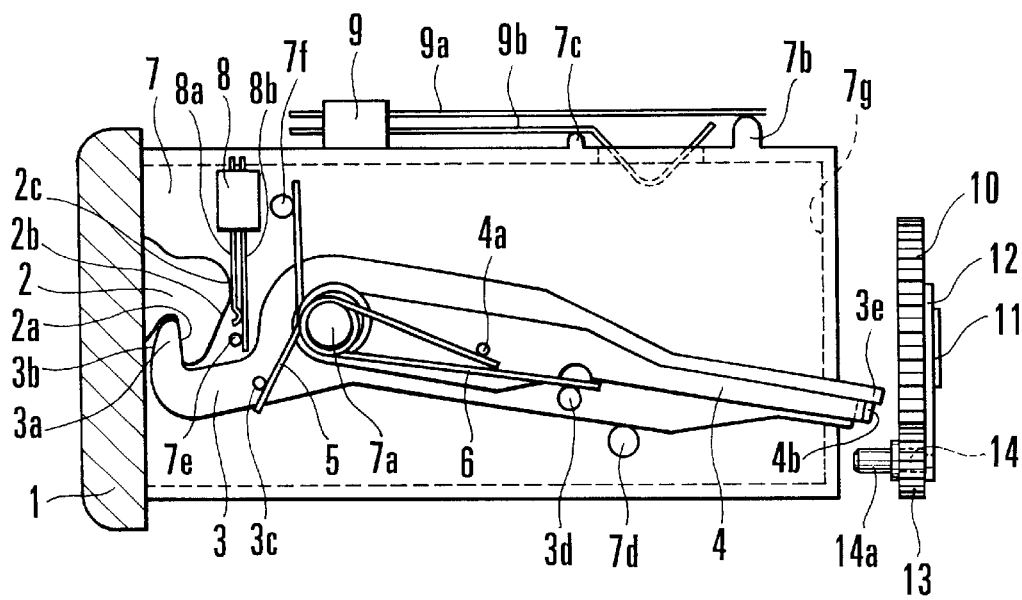
FIGS. 2(a) and 2(b) are sectional views showing essential parts of the camera shown in FIG. 1, when a planet gear is in a first position.
Figure 2B:
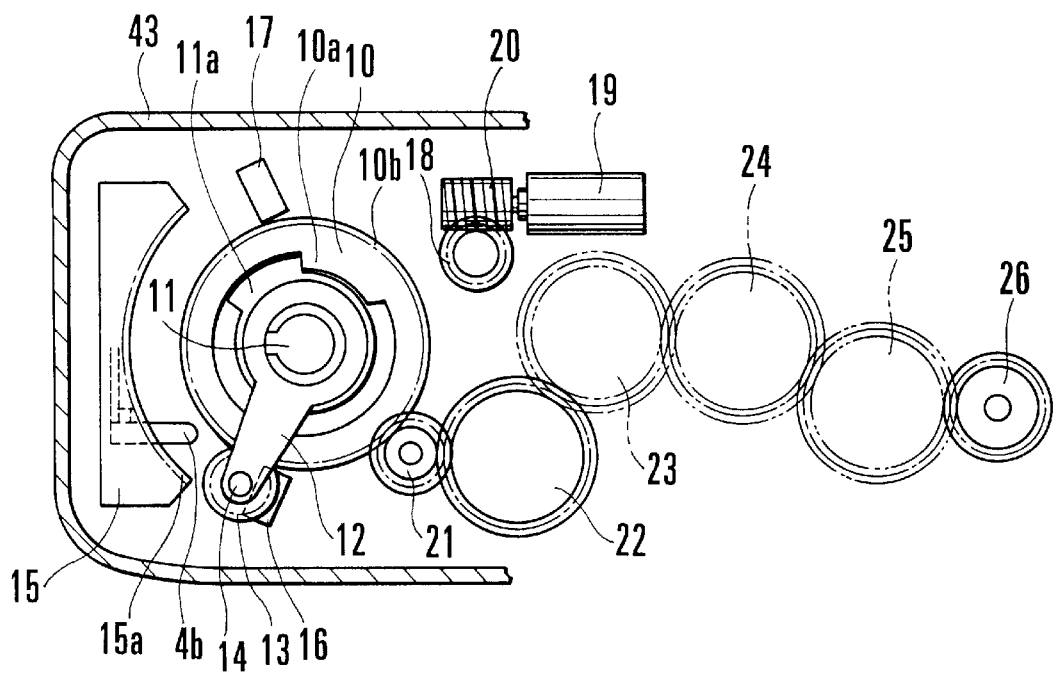
Figure 3A:
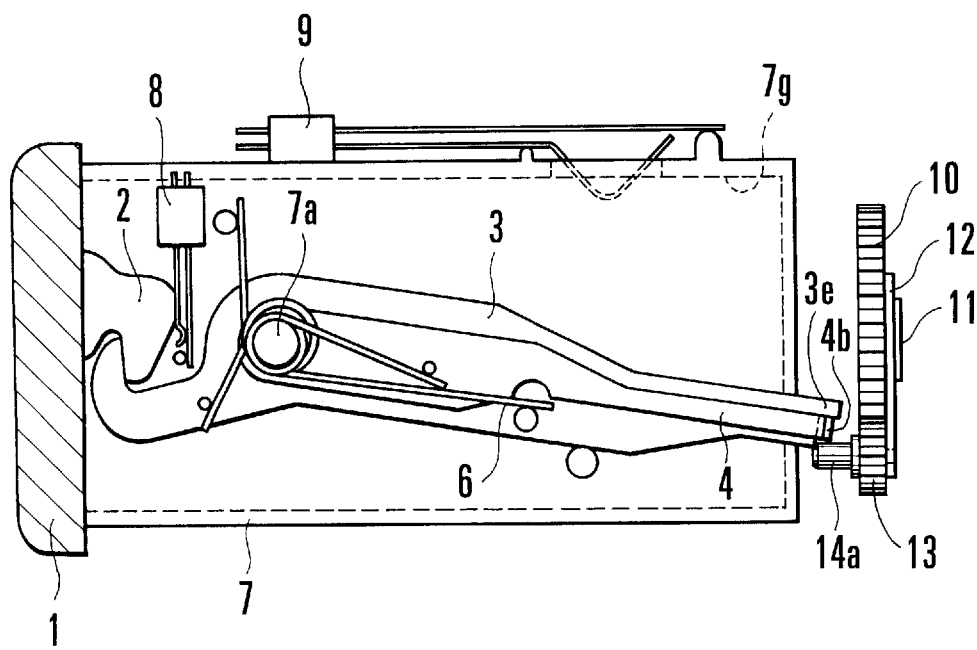
FIGS. 3(a) and 3(b) are sectional views showing a state of the essential parts obtained immediately after the start of an unlocking action of a cartridge chamber lid from the state shown in FIGS. 2(a) and 2(b).
Figure 3B:
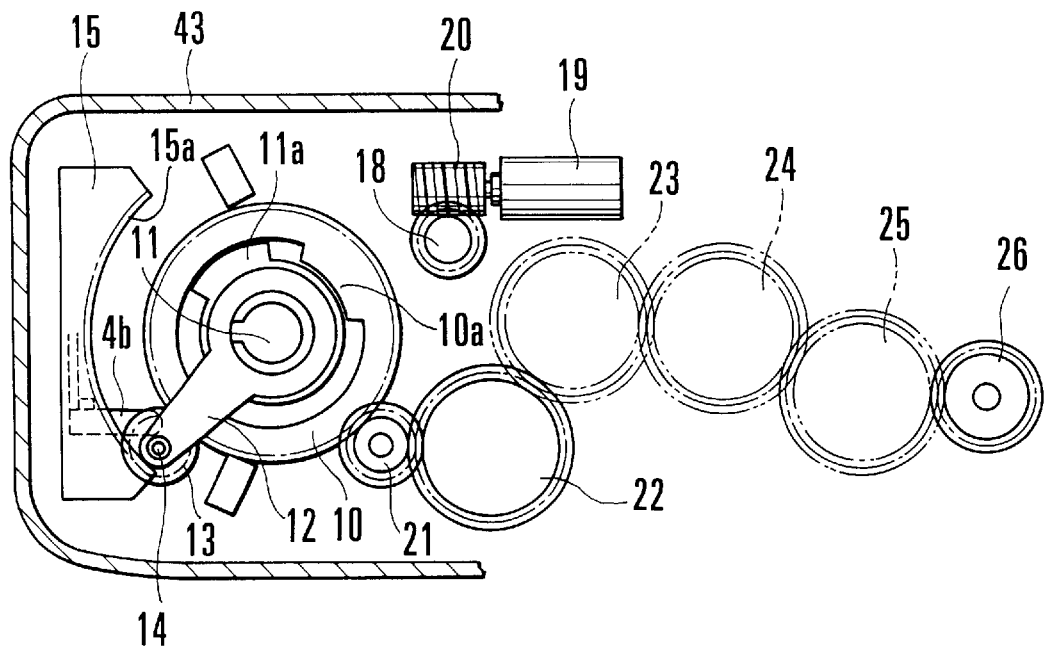
Figure 4A:
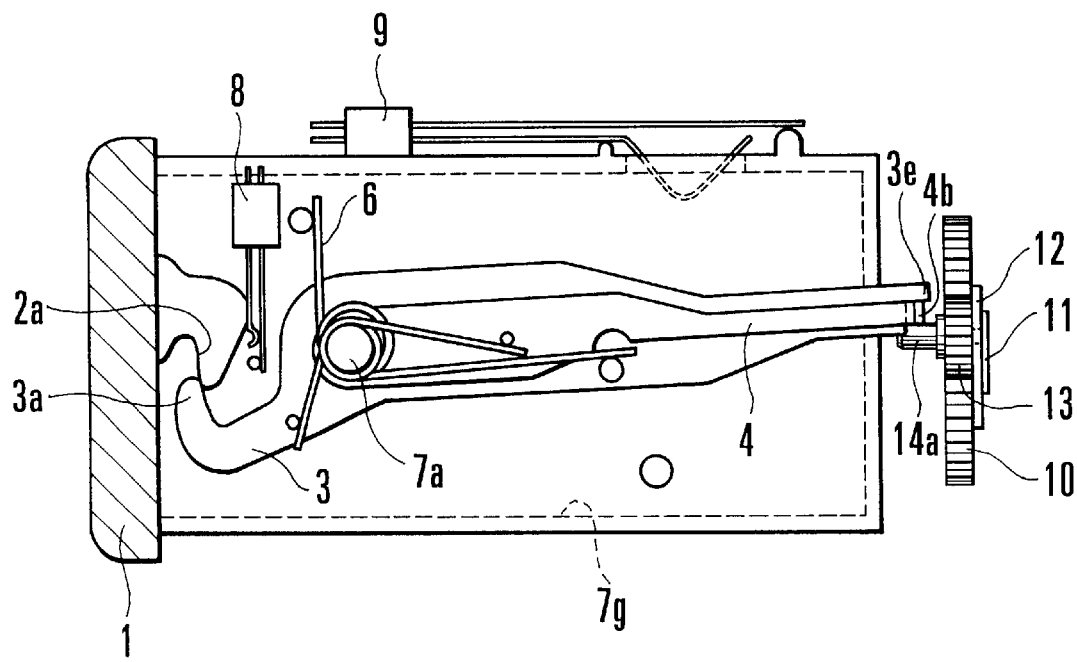
FIGS. 4(a) and 4(b) are sectional views showing the same essential parts in a state obtained when the unlocking action of the cartridge chamber lid progresses from the state shown in FIGS. 3(a) and 3(b).
Figure 4B:
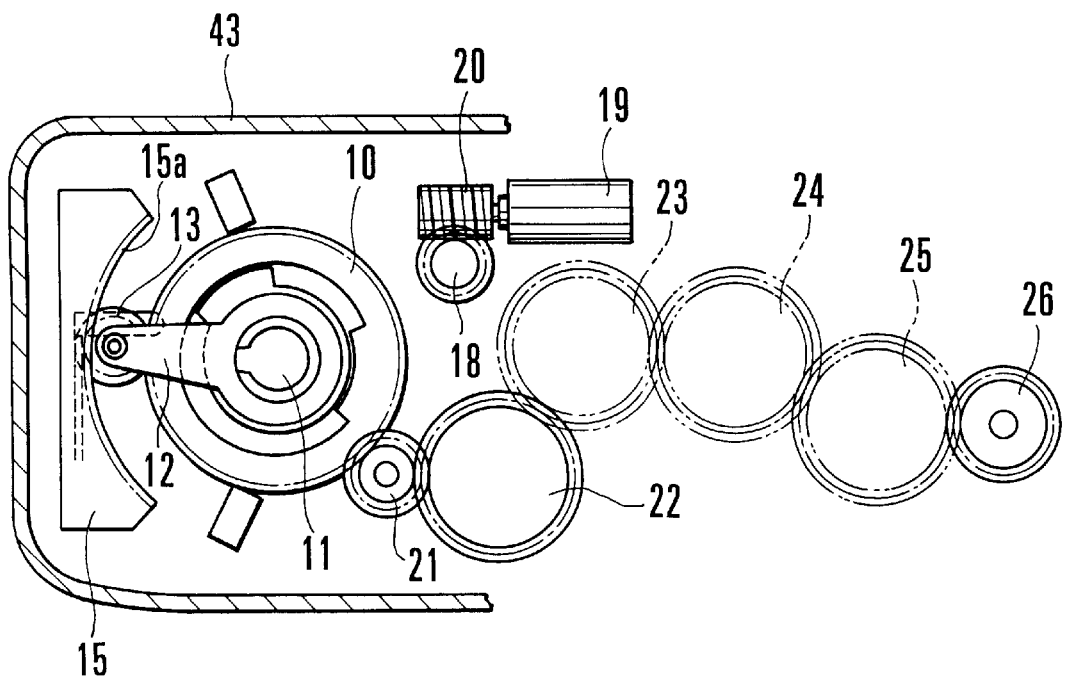
Figure 6A:
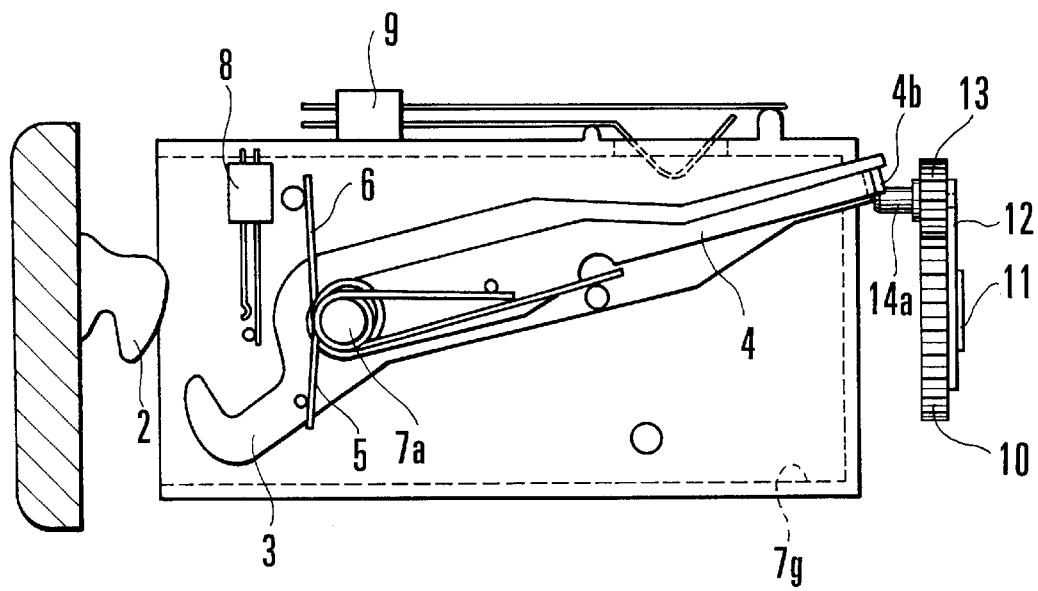
FIGS. 6(a) and 6(b) are sectional views showing the same essential parts in a state obtained immediately before the end of the unlocking action of the cartridge chamber lid shown in FIG. 1, etc.
Figure 6B:
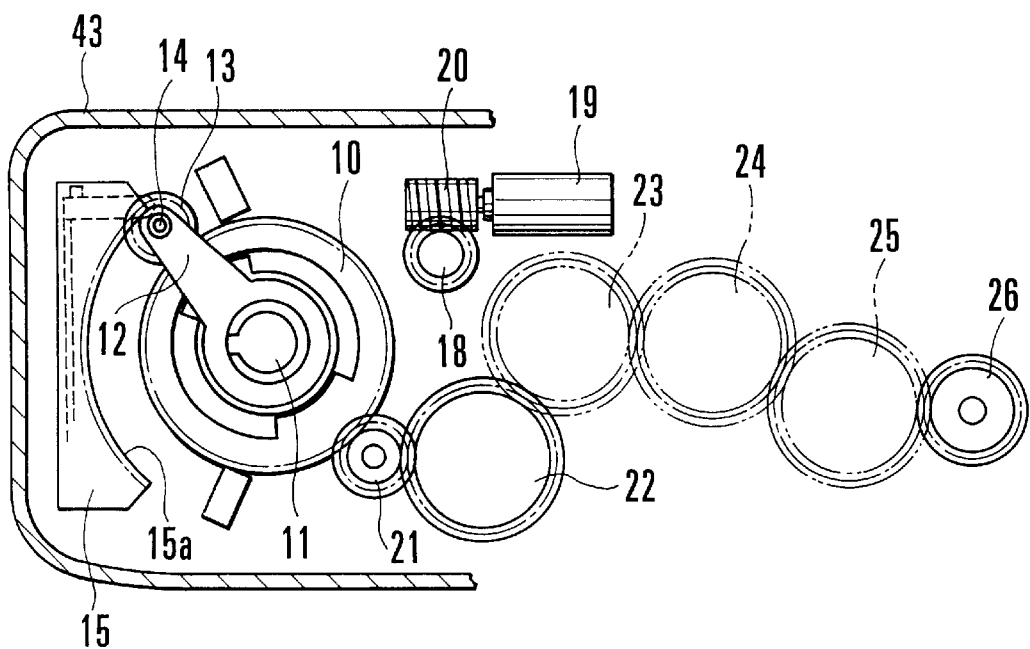
Figure 7A:
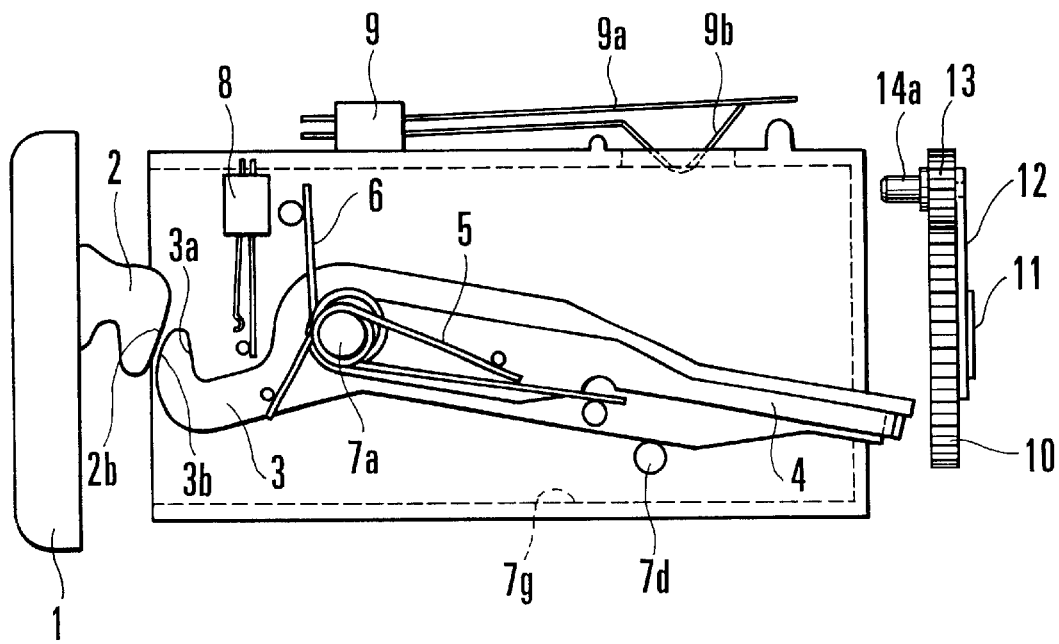
FIGS. 7(a) and 7(b) are sectional views showing the same essential parts in a state obtained when the clockwise rotation of a fork gear is brought to a stop after completion of the unlocking action of the cartridge chamber lid shown in FIG. 1, etc., and when the planet gear is in a second position.
Figure 7B:
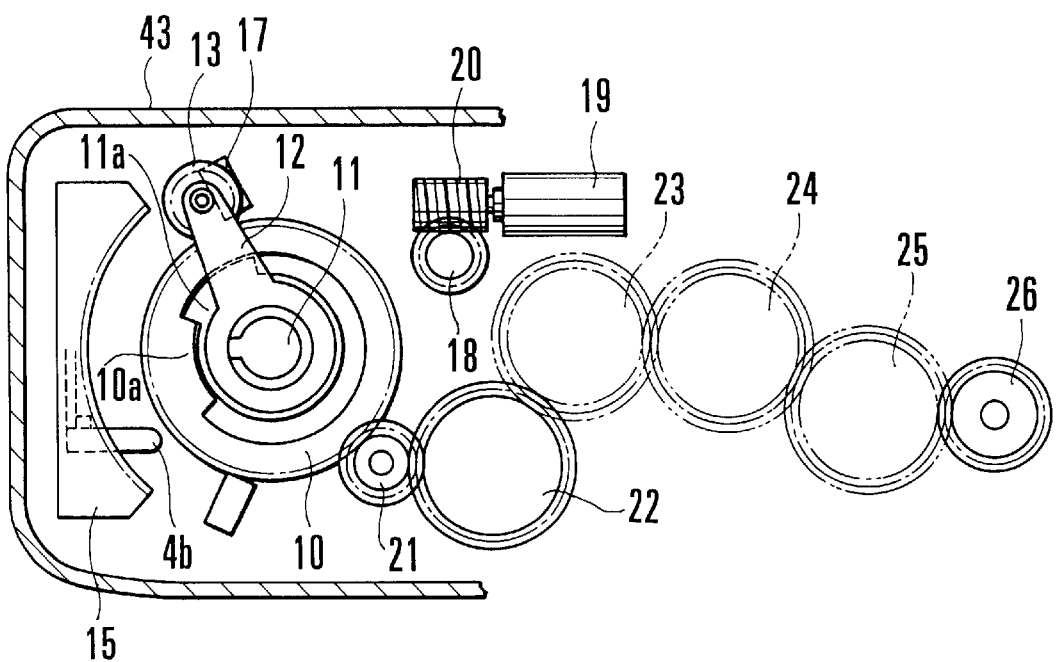
Figure 8A:
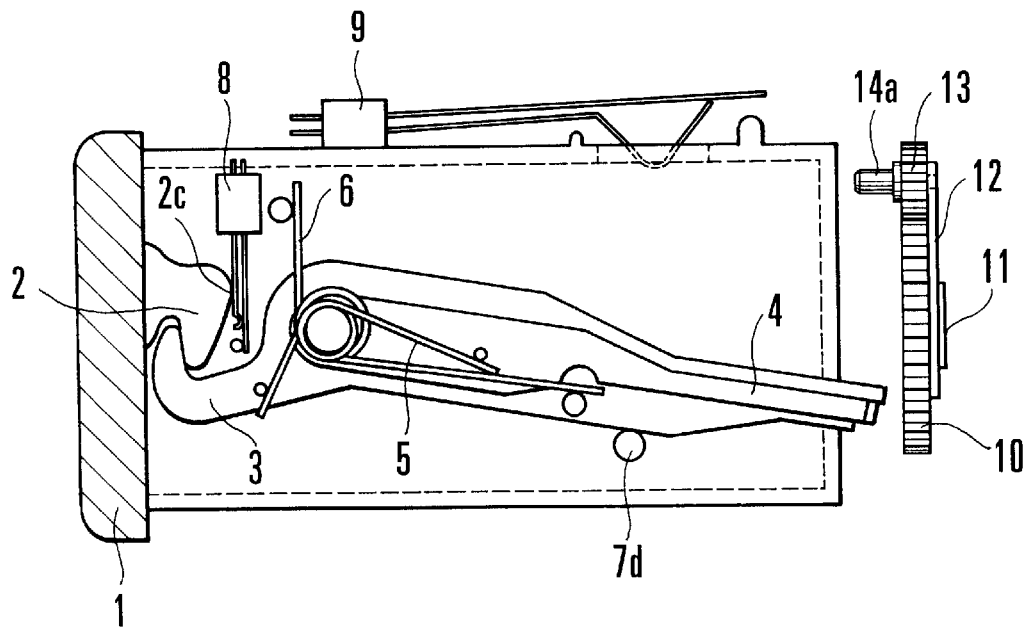
FIGS. 8(a) and 8(b) are sectional views showing the same essential parts in an ordinary photo-taking state obtained after a film cartridge is loaded into the camera in the first embodiment of the invention.
Figure 8B:
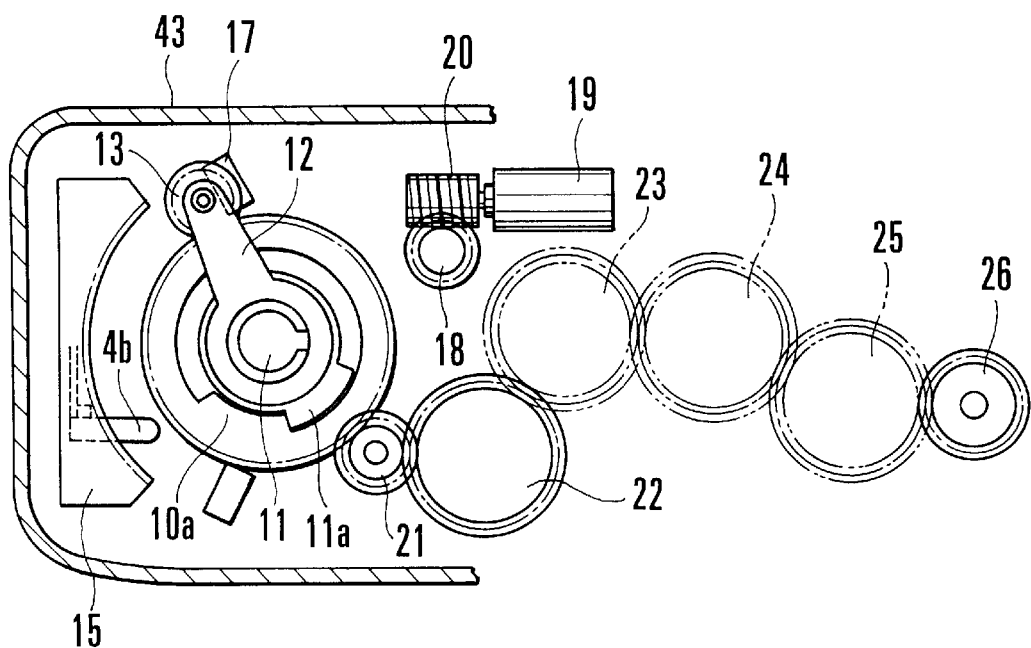
Figure 9A:
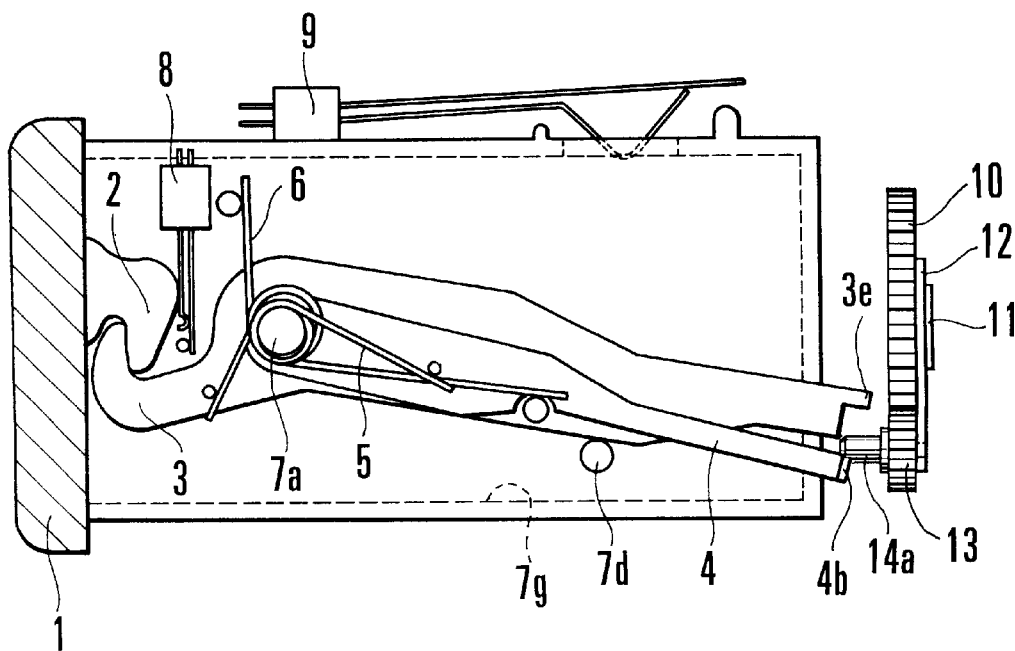
FIGS. 9(a) and 9(b) are sectional views showing the same essential parts in a state obtained at the commencement of a film rewinding action in the camera in the first embodiment of the invention.
Figure 9B:
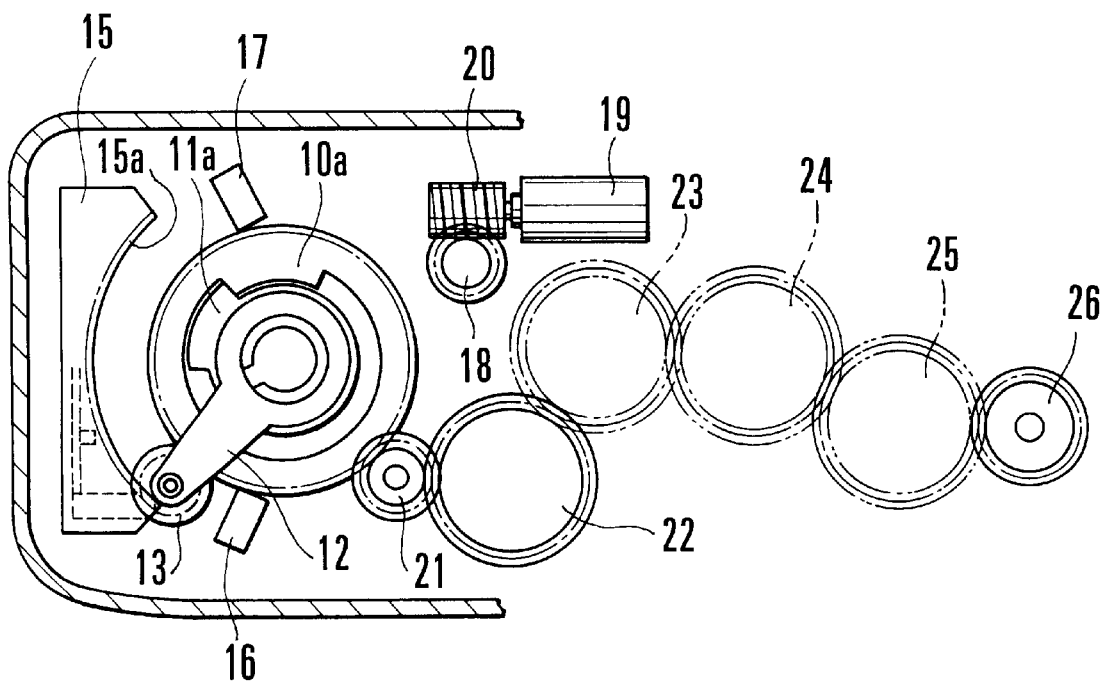
Figure 10:
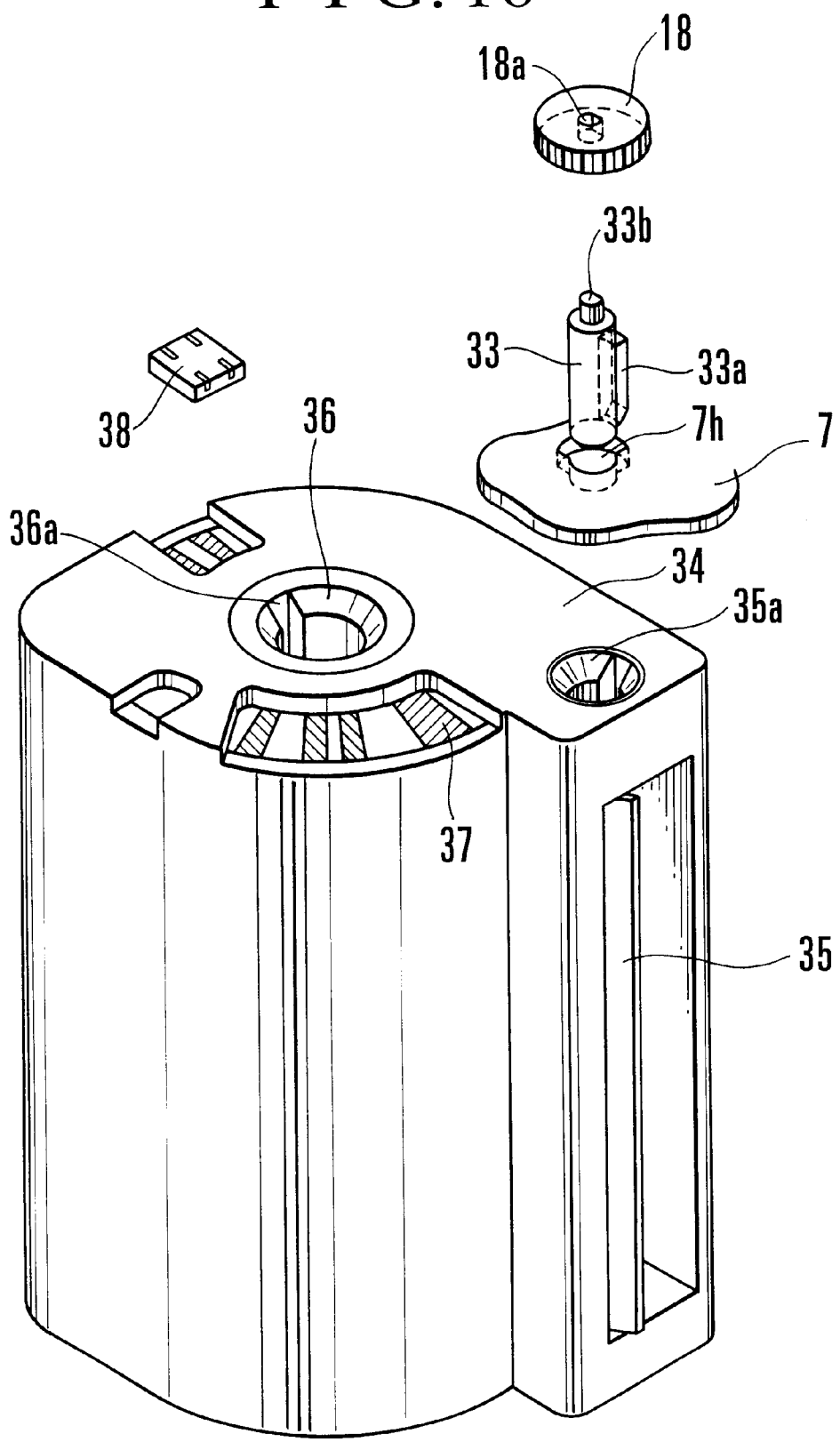
FIG. 10 is a perspective view showing a film cartridge usable for the camera in the first embodiment of the invention.
Figure 11:
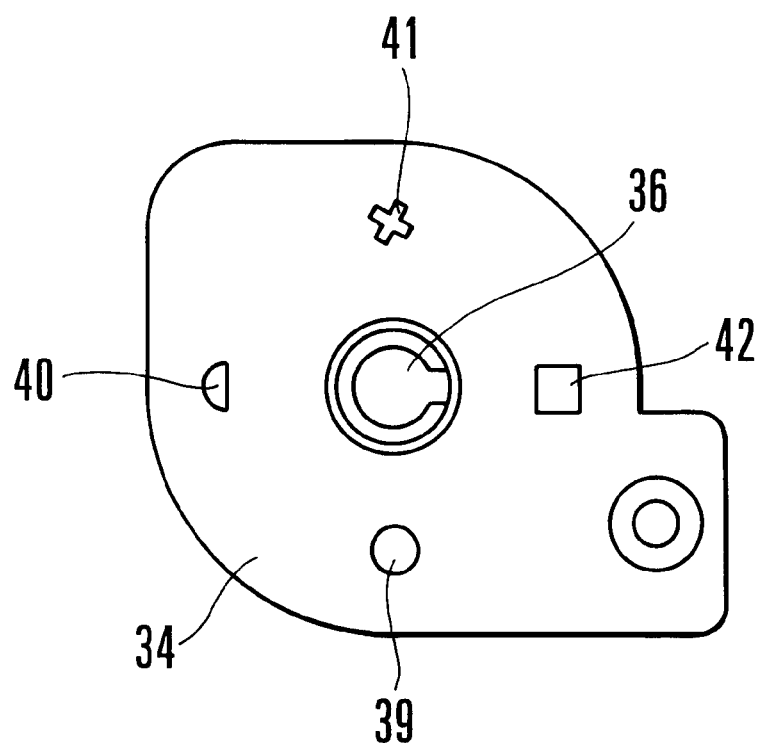
FIG. 11 shows an indication part provided at the bottom of the film cartridge shown in FIG. 10 to indicate the state of a film contained in the film cartridge.
Figure 12:
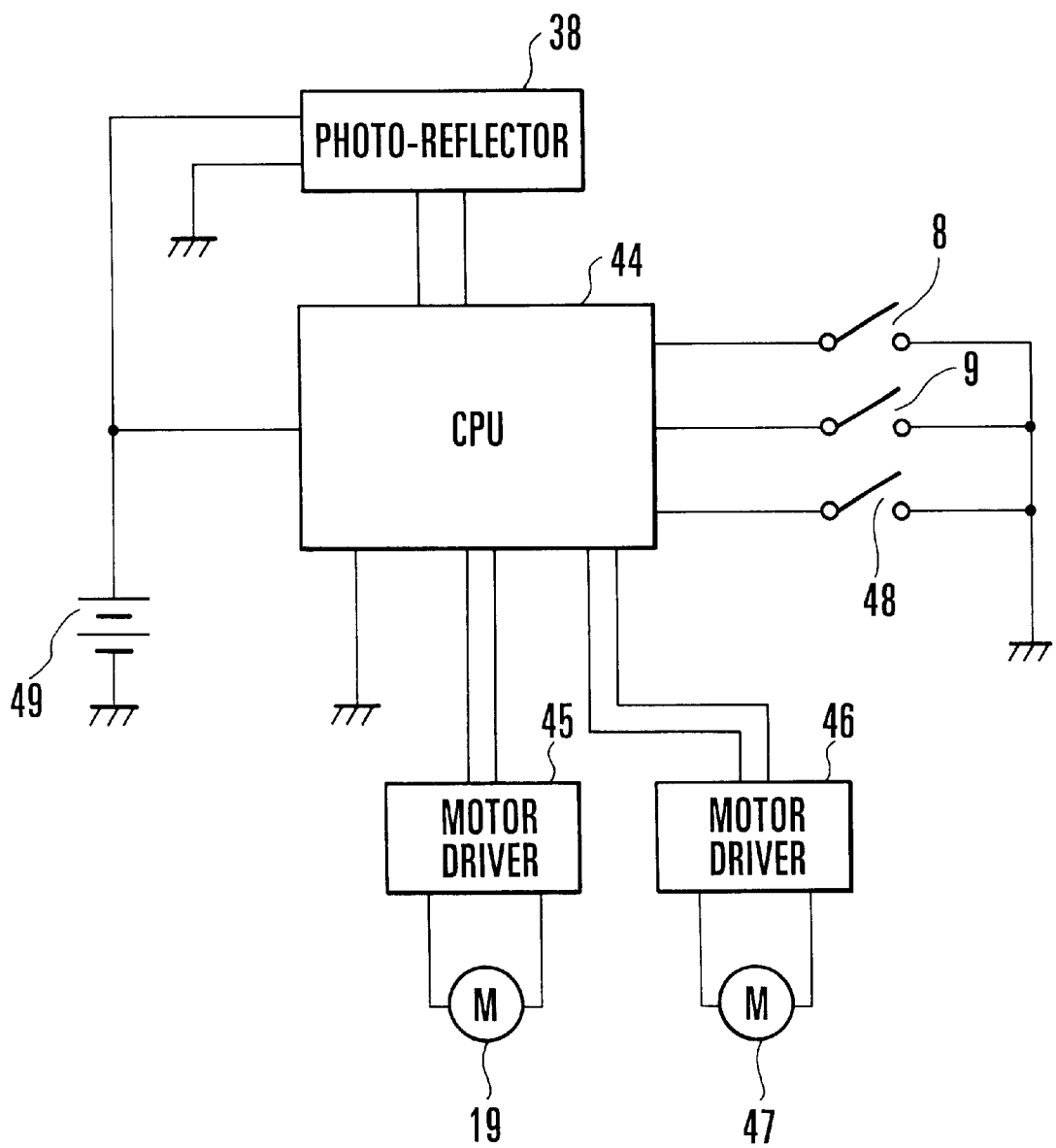
FIG. 12 is a block diagram showing the circuit arrangement of essential parts of the camera in the first embodiment of the invention.
Figure 13:
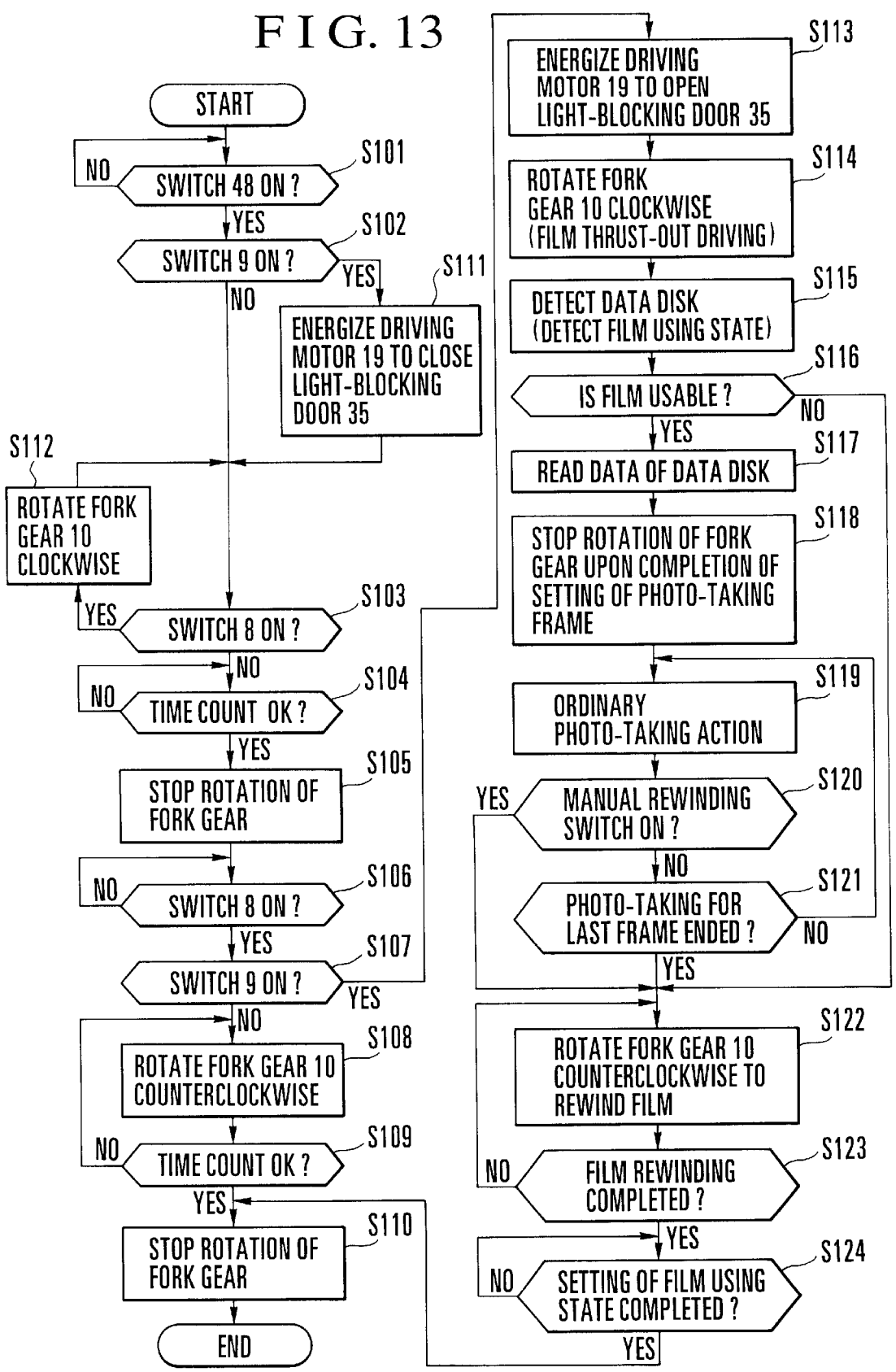
FIG. 13 is a flow chart showing a series of actions of the camera in the first embodiment of the invention.

FIGS. 1 to 13 relate to a camera according to a first embodiment of the invention. FIG. 1 shows in a sectional view the arrangement of a cartridge chamber and parts disposed around the cartridge chamber in the camera in the first embodiment of the invention. FIGS. 2(a) and 2(b) show essential parts of the camera shown in FIG. 1. More specifically, FIGS. 2(a) is taken on a line A—A in FIG. 1 and FIG. 2(b) is taken on another line B—B in FIG. 1. Other pairs of sectional views, i.e., FIGS. 3(a) and 3(b) to FIGS. 9(a) and 9(b), are also taken in the same manner. FIGS. 3(a) and 3(b) are sectional views showing a state of essential parts obtained immediately after the start of an unlocking action of a cartridge chamber lid from the state shown in FIGS. 2(a) and 2(b). FIGS. 4(a) and 4(b) are sectional views showing the same essential parts in a state obtained when the unlocking action of the cartridge chamber lid progresses from the state shown in FIGS. 3(a) and 3(b). FIGS. 5(a) and 5(b) are sectional views showing the same essential parts in a state obtained when the cartridge chamber lid becomes operable with the unlocking action of the cartridge chamber lid progressing further from the state shown in FIGS. 4(a) and 4(b). FIGS. 6(a) and 6(b) are sectional views showing the essential parts in a state obtained immediately before the end of the unlocking action of the cartridge chamber lid. FIGS. 7(a) and 7(b) are sectional views showing the essential parts in a state obtained when the clockwise rotation of a fork gear is brought to a stop after completion of the unlocking action of the cartridge chamber lid. FIGS. 8(a) and 8(b) are sectional views showing the essential parts in an ordinary photo-taking state obtained after the camera is loaded with a film cartridge. FIGS. 9(a) and 9(b) are sectional views showing the essential parts in a state obtained at the commencement of a film rewinding action. FIG. 10 is a perspective view showing a film cartridge usable for the camera in the first embodiment of the invention. FIG. 11 shows an indication part provided at the bottom of the film cartridge shown in FIG. 10 to indicate the state of a film contained in the film cartridge. FIG. 12 is a block diagram showing the circuit arrangement of essential parts of the camera in the first embodiment of the invention. FIG. 13 is a flow chart showing a series of actions of the camera in the first embodiment of the invention.

Referring mainly to FIGS. 1, 2(a) and 2(b) which show all the essential component parts, the arrangement of each member of the camera in the first embodiment is first described as follows.

The camera is provided with a cartridge chamber lid 1. The cartridge chamber lid 1 can be opened and closed using a rotation shaft 32 and is constantly urged to move in the direction of opening by a spring 31. A lock claw 2 is disposed on the cartridge chamber lid 1 and is composed of a hook part 2a, a slanting face 2b and a top part 2c. A hook lever 3 is rotatably supported by a rotation shaft 7a of a camera body 7. A spring 6 is arranged to urge the hook lever 3 to swing clockwise for locking the lock claw 2 of the cartridge chamber lid 1. The clockwise swing of the hook lever 3 under the urging force of the spring 6 is restricted by a stopper 7d which abuts on the hook lever 3. A driving lever 4 is swingably supported by the rotation shaft 7a, which is coaxial with the hook lever 3. The driving lever 4 is urged to swing counterclockwise with respect to the hook lever 3 by a spring 5. Under the urging force of the spring 5, the counterclockwise swing of the driving lever 4 is restricted as a driving part 4b of the driving lever 4 abuts on an abutting part 3e of the hook lever 3. The camera body 7 is provided with stoppers 7b, 7c, 7d, 7e and 7f, a cartridge chamber 7g, etc. A switch 8 which is secured to the camera body 7 is arranged to detect opening and closing of the cartridge chamber lid 1. When the cartridge chamber lid 1 is closed, the top part 2c of the lock claw 2 of the cartridge chamber lid 1 pushes a moving contact piece 8a into contact with a contact piece 8b to turn on the switch 8. With the switch 8 thus turned on, a CPU of the camera is informed that the cartridge chamber lid 1 is closed. Another switch 9 is secured to the camera body 7 and is arranged to detect the presence or absence of a film cartridge. When the cartridge chamber 7g is loaded with a film cartridge 34 (FIG. 10), a moving contact piece 9b of the switch 9 is pushed by the external cover of the film cartridge 34 (hereinafter referred to simply as the cartridge) into contact with a contact piece 9a to turn on the switch 9. With the switch 9 thus turned on, the CPU is informed that the camera is loaded with the cartridge 34.

A fork gear 10 has a projection 10a on the inner side thereof. When the inner projection 10a engages an outer projection 11a provided on the outer side of a fork 11, the rotation in the engaging direction of the fork gear 10 is transmitted to the fork 11. When the rotating direction of the fork gear 10 changes to a reverse direction, the fork gear 10 rotates alone within a rotation non-transmitting range in which the rotation of the fork gear 10 is not transmitted to the fork 11. The fork gear 10 is in mesh with gears 22, 23, 24, 25 and 26 through a gear 21. Further, a film transport motor, a reduction system, a one-way clutch, etc., are arranged in such a manner as disclosed in Japanese Laid-Open Patent Application No. HEI 7-325337. When an output of the film transport motor is transmitted through these parts, the fork gear 10 is driven to rotate clockwise or counterclockwise. Further, a planet gear 13 is in mesh with the fork gear 10 and is supported by a shaft 14 of a planetary lever 12 which is rotatably supported by the fork 11. A friction spring (not shown) which is disposed between the planetary lever 12 and the planet gear 13 acts to allow the planet gear 13 to revolve. When the planet gear 13 is caused to revolve by the rotation of the fork gear 10, the planet gear 13 comes to intermesh with the teeth 15a of an inner gear 15. When these members are in this phase relation, the revolving force of the planet gear 13 becomes much greater than a frictional force of the friction spring disposed between the planet gear 13 and the planetary lever 12.

As shown in FIGS. 1 and 2(a), the shaft 14 is provided with an extended shaft part 14a which extends on one side opposite to the other side on which the shaft 14 is caulked to the planetary lever 12. The planet gear 13 is prevented from revolving outside of a necessary range by arranging the extended shaft part 14a of the shaft 14 to abut on each of stopper parts 16 and 17, which are secured in positions to determine a revolvable range relative to the camera body 7. Thus, the planet gear 13 is arranged to be revolvable only from one end to the other end within the predetermined range. Further, the range within which a large revolving force is obtainable by intermeshing the inner gear 15 and the planet gear 13, as mentioned above, is arranged such that the extended shaft part 14a abuts on the driving part 4b of the driving lever 4 to cause the driving lever 4 to swing. A helical gear 18 is in mesh with a worm gear 20 mounted on the shaft of a driving motor 19. The shaft 33b of an engaging shaft 33 which engages a light-blocking door 35 of the cartridge 34 (see FIG. 10) is press-fitted into a hole 18a of the helical gear 18 to make the helical gear 18 and the engaging shaft 33 into one unified body. The rotation of the driving motor 19 is thus arranged to be transmitted to the engaging shaft 33 through the worm gear 20 and the helical gear 18 to open or close the light-blocking door 35 of the cartridge 34. Further, the rotation of the engaging shaft 33 for opening and closing the light-blocking door 35 is restricted by a hole 7h of a special shape formed in the camera body 7 to prevent the cartridge 34 from being broken by any excessive rotation of the engaging shaft 33.

A rotary plate 27 is rotatably supported around the fork 11. The rotary plate 27 is secured to the fork gear 10 by a pin 28, as shown in FIG. 1, in such a way as to enable the fork gear 10 to rotate around the fork 11. A spring member 29 is arranged on the fork 11 to be axially movable back and forth and to cause a rotary spool 36 of the cartridge 34 to rotate together with the fork 11. In a case where the phase of a projection of the spring member 29 differs from the phase of a groove 36a provided in the spool 36 in loading the camera with the cartridge 34, the cartridge 34 can be placed up to the upper side of the cartridge chamber 7g as the spring member 29 is arranged to be movable back and forth (in the horizontal direction as viewed in FIG. 1). Under the condition of having such a phase difference, the fork 11 is caused to rotate to bring the spring member 29 into the groove 36a of the spool 36. Then, the fork 11 immediately engages the spool 36 to enable the spool 36 to thrust out the film by rotating together with the fork 11. Reference numeral 30 denotes a stop screw.

Referring to FIG. 10, a data disk 37 is arranged to rotate together with the spool 36 within the cartridge 34. To read data provided in bar codes on the data disk 37 and also to detect the stopping phase of the spool 36, a photo-reflector 38 is secured to the camera body 7 in a position as shown in FIG. 10. As shown in FIG. 11, the cartridge 34 is provided with indication parts 39, 40, 41 and 42 which are arranged to indicate the using state of the film contained in the cartridge 34. Indication made by one of the indication parts 39, 40, 41 and 42 becomes clear according to the stopping phase of the spool 36. The indication parts 39, 40, 41 and 42 correspond respectively to the unexposed, partly-exposed, exposed and developed states of the film. In FIG. 1, reference numeral 43 denotes the external cover of the camera.

FIG. 12 shows the circuit arrangement of the camera according to the first embodiment of the invention. Parts which are the same as those shown in FIG. 1, etc., are indicated by the same reference numerals. Incidentally, the circuit arrangement shown in FIG. 1 is limited to elements related to the first embodiment while other circuits related to ordinary camera functions such as light-measuring, distance-measuring, shutter-control and frame-position-searching circuits, etc., are omitted from the illustration given.

Referring to FIG. 12, a CPU 44 is arranged to control the various actions of the camera and is capable of storing information on inputs obtained from various switches and data read out from the data disk 37. A motor driver 45 is arranged to control the driving motor 19 which is provided for opening and closing the light-blocking door 35 of the cartridge 34. A motor driver 46 is arranged to control a film transport motor 47 (not shown in FIG. 1 to FIGS. 9(*a*) and 9(*b*)) provided for transporting the film. A chamber lid opening switch 48 is provided for opening the cartridge chamber lid 1. A battery 49 is arranged to be a power source of the camera.

With the camera in the first embodiment provided with the above circuit arrangement, actions to be performed by the members of the camera, when the chamber lid opening switch 48 is turned on for loading the camera with the cartridge 34, are as described below with reference to FIGS. 1 to 13.

FIGS. 2(*a*) and 2(*b*) show the camera in a state of having the cartridge chamber lid 1 closed with the cartridge 34 not loaded in the cartridge chamber 7*g*. The camera is in this state when it is newly purchased.

When the user of the camera turns on the chamber lid opening switch 48 for loading the camera with the cartridge 34, the CPU 44 becomes active to energize the film transport motor 47 so as to rotate the fork gear 10 clockwise for opening the cartridge chamber lid 1. Then, in association with the rotation of the fork gear 10, the state of each of members varies as shown in the drawings in the order of FIGS. 2(*a*) and 2(*b*)→FIGS. 3(*a*) and 3(*b*)→FIGS. 4(*a*) and 4(*b*)→FIGS. 5(*a*) and 5(*b*)→FIGS. 6(*a*) and 6(*b*)→FIGS. 7(*a*) and 7(*b*).

More specifically, when the fork gear 10 rotates clockwise (in a first direction) in the state shown in FIGS. 2(*a*) and 2(*b*), the planet gear 13 revolves clockwise together with the planetary lever 12. Then, the planet gear 13 comes to intermesh with the inner gear 15. Further, the extended shaft part 14*a* of the shaft 14 comes to abut on the driving part 4*b* of the driving lever 4, as shown in FIG. 3(*a*). At this moment, the fork 11 remains unchanged from its position shown in FIGS. 2(*a*) and 2(*b*) as the projection 10*a* of the fork gear 10 is moving in the direction of parting from the projection 11*a* of the fork 11, although the fork gear 10 rotates clockwise, i.e., in the direction of beginning to rotate from one point toward another within the rotation non-transmitting range. When the fork gear 10 rotates further clockwise, the extended shaft part 14*a* of the shaft 14 pushes the driving part 4*b* of the driving lever 4 to cause the driving part 4*b* to push the abutting part 3*e* of the hook lever 3, as the revolving force of the planet gear 13 has been increased by intermeshing of the planet gear 13 and the inner gear 15. Therefore, the driving lever 4 and the hook lever 3 eventually come to swing counterclockwise together against the urging force of the spring 6. FIGS. 4(*a*) and 4(*b*) show this state.

When the further clockwise rotation of the fork gear 10 causes the hook lever 3 and the driving lever 4 to swing further counterclockwise as shown in FIGS. 5(*a*) and 5(*b*), the lock part 3*a* of the hook lever 3 disengages from the hook part 2*a* of the lock claw 2 to allow the cartridge chamber lid 1 to be opened by the force of the spring 31 as shown in FIG. 1.

FIGS. 5(*a*) and 5(*b*) show the camera in a state obtained when the cartridge chamber lid 1 is opened and the top part 2*c* of the lock claw 2 no longer pushes the moving contact piece 8*a* of the switch 8. In this state, therefore, the switch 8 is in an off-state and the CPU 44 is informed of the open state of the cartridge chamber lid 1. However, as will be described later, the fork gear 10 keeps on rotating clockwise to further drive the film transport motor 74. Then, as shown in FIGS. 6(*a*) and 6(*b*), the extended shaft part 14*a* of the shaft 14 further pushes the driving part 4*b* of the driving lever 4 to bring the driving lever 4 to an overcharging position together with the hook lever 3. When the fork gear 10 rotates clockwise still further from the state shown in FIGS. 6(*a*) and 6(*b*), the extended shaft part 14*a* parts from the driving part 4*b* to release the hook lever 3 from its abutting state caused by the rotation of the fork gear 10. The hook lever 3 is thus moved back in the clockwise direction by the force of the spring 6 until the hook lever 3 comes to a stop by abutting on the stopper pin 7*d*, as shown in FIG. 7(*a*). The lock part 3*a* of the hook lever 3 also returns to its lock position. However, since the lock claw 2 is away together with the cartridge chamber lid 1, the cartridge chamber lid 1 is not locked again.

Further, after the extended shaft part 14*a* breaks away from interlocking with the driving part 4*b*, the planet gear 13 is caused by the clockwise rotation of the fork gear 10 to pull out from the inner gear 15. The planet gear 13 then stops revolving at a point where the extended shaft part 14*a* of the shaft 14 abuts on the stopper 17, as shown in FIG. 7(*b*).

Even if the fork gear 10 rotates clockwise further in the state shown in FIG. 7(*b*), any adverse effect is effectively prevented as the friction of the planet gear 13 causes the fork gear 10 to make an idle rotation.

The energizing action on the film transport motor 47 is brought to a stop in the state shown in FIG. 7(*b*) a predetermined period of time after the switch 8 is turned off. A timer is arranged to count the predetermined time as will be described later. Even if the fork gear 10 rotates clockwise from the state shown in FIGS. 2(*a*) and 2(*b*) to the state shown in FIGS. 7(*a*) and 7(*b*), the fork 11 does not rotate, because the projection 10*a* of the fork gear 10 rotates in the direction of moving away from the projection 11*a* of the fork 11 within the rotation non-transmitting range, as mentioned in the foregoing.

In the state shown in FIG. 7(*b*), the cartridge chamber 7*g* is in a standby state waiting for being loaded with the cartridge 34 as the cartridge chamber lid 1 is open. When the user puts the cartridge 34 into the cartridge chamber 7*g* in this state, the switch 9, which is arranged to detect the presence or absence of a cartridge, changes from an off-state to an on-state, as shown in FIG. 7(*a*). At this moment, the cartridge chamber lid 1 has not been closed as yet.

When the user pushes the cartridge chamber lid 1 in the direction of closing the cartridge chamber lid 1, i.e., to the right as viewed in FIG. 7(*a*), the slanting face 2*b* of the lock claw 2 abuts on the slanting face 3*b* of the hook lever 3. However, since these faces are slanting, a further pushing operation on the cartridge chamber lid 1 in the closing direction causes the hook lever 3 to swing counterclockwise on the shaft 7*a* against the force of the spring 6. After the hook lever 3 has swung approximately to the state shown in FIG. 5(*a*), the hook lever 3 again swings clockwise according to the urging force of the spring 6. Then, the closing operation on the cartridge lid 1 is finished when the clockwise swing of the hook lever 3 reaches the stopper 7*d*. In other words, the cartridge chamber lid is locked, as shown in FIG. 8(*a*). The top part 2*c* of the lock claw 2 then pushes the contact piece 8*a* of the switch 8 to turn on the switch 8. With the switch 8 thus turned on, the CPU 44 begins to execute a photo-taking preparing operation, as follows.

In the photo-taking preparing operation, the driving motor 19 is first energized to bring the light-blocking door 35 of the cartridge 34 to its open position. After that, when the film transport motor 47 is energized in the film thrust-out direction, the fork gear 10 comes to rotate clockwise. At this moment, the planet gear 13 does not revolve, because the extended shaft part 14a still remains abutting on the stopper 17. However, when the projection 10a of the fork gear 10 comes to abut on the projection 11a of the fork 11 after finishing its rotation from one end to the other of the rotation non-transmitting range, the fork gear 10 comes to drive the fork 11. Then, the spring member 29 of the fork 11 comes to engage the groove 36a of the spool 36 of the cartridge 34 with the phase of the fork 11 adjusted to that of the spool 36. The spool 36 is thus rotated by the fork 11 to thrust out the film from the inside of the cartridge 34. Further, at this time, the CPU 44 reads the bar codes provided on the data disk 37 which is rotating, by using the photo-reflector 38, and thus detects the using state of the film disposed inside the cartridge 34. If the result of detection indicates that the film is in a usable state, i.e., in the unexposed state or in the partly exposed state, the fork gear 10 is allowed to be further rotated clockwise to set the film in a photo-taking position. At the same time, the contents of the bar codes on the data disk 37 are stored in a RAM or the like disposed within the CPU 44.

With the camera in the state shown in FIGS. 8(a) and 8(b), the film is thrust out from the cartridge and is transported for an ordinary photo-taking operation. While these actions are in process, the lock claw 2 is kept in its lock position by the spring 6 of the hook lever 3. Therefore, the cartridge chamber lid 1 is of course effectively prevented from being inadvertently opened by any erroneous operation of the user on the chamber lid opening switch 48.

In cases where the film begins to be rewound after completion of the ordinary photo-taking operation on the last frame or where the film begins to be rewound in a state of being used only halfway, or where the result of the detection of the film using state performed in the state shown in FIGS. 8(a) and 8(b) indicates that the cartridge 34 is in an unusable state (in the exposed state or in the developed state), the film transport motor 47 is energized for rewinding the film. This causes the fork gear 10 to rotate counterclockwise (in a second direction) from the state shown in FIGS. 8(a) and 8(b) to the state shown in FIGS. 9(a) and 9(b). The planet gear 13 then moves away from the stopper 17 and comes to mesh with the inner gear 15 by revolving counterclockwise around the fork gear 10. With the planet gear 13 thus coming to intermesh with the inner gear 15, the extended shaft part 14a of the shaft 14 comes to abut on the driving part 4b of the driving lever 4. The extended shaft part 14a pushes the driving part 4b of the driving lever 4 accordingly as the planet gear 13 revolves further. The driving lever 4 then swings clockwise on the shaft 7a with respect to the spring 5 while the hook lever 3 is stopped from swinging by the stopper 7d, as shown in FIG. 9(a). The hook lever 3 is arranged to have no force transmitted thereto during this process.

When the fork gear 10 rotates counterclockwise further from the state shown in FIGS. 9(a) and 9(b), the planet gear 13 revolves further to cause the extended shaft part 14a to part from the driving part 4b and to abut on the stopper 16 as shown in FIG. 2(b). Since the driving part 4b is no longer pushed by the extended shaft part 14a, the driving lever 4 is caused by the spring 5 to swing counterclockwise on the shaft 7a. As a result, the driving part 4b comes to abut on the abutting part 3e of the hook lever 3.

The film rewinding action can be carried on with the fork gear 10 rotating further counterclockwise. When the film rewinding action finishes in the state shown in FIG. 2(b), the phase of the bar code on the data disk 37 is detected by the photo-reflector 38. A phase indexing action is performed for the current using state of the film, on the basis of the bar code phase detected. The energizing action on the film transport motor 47 for rotation in the direction of rewinding the film is then brought to a stop.

After that, when the chamber lid opening switch 48 is turned on by the user for taking out the cartridge 34, the CPU 44 causes the driving motor 19 to be energized to close the light-blocking door 35. With the light-blocking door 35 closed, a sequence of processes are performed, in the same manner as the sequence of processes to be performed with the camera loaded with no cartridge, by energizing the film transport motor 47 to change the rotating direction of the fork gear 10 from the film rewinding direction to the film thrust-out direction and to change the state of the camera shown in FIGS. 2(a) and 2(b) in the order of the states shown in FIGS. 2(a) and 2(b)→FIGS. 3(a) and 3(b)→FIGS. 4(a) and 4(b)→FIGS. 5(a) and 5(b)→FIGS. 6(a) and 6(b) FIGS. 7(a) and 7(b). The cartridge chamber lid 34 is unlocked through these processes to enable the user to take out the cartridge 34 from the camera.

While the rotating direction of the fork gear 10 is changed from the film rewinding direction over to the film thrust-out direction through the transition of the state of the camera as shown in FIGS. 2(a) and 2(b) to 7(a) and 7(b), the projection 10a of the fork gear 10 is not abutting on the projection 11a of the fork 11, because the fork gear 10 is rotating clockwise within the rotation non-transmitting range. Therefore, the phase of the spool 36 on which the film using state of the cartridge 34 is set after completion of film rewinding is not changed by the change-over of the rotating direction. In other words, the film using state set can be retained. Even when the fork gear 10 and the fork 11 are in one unified body, the cartridge may be taken out in a state of retaining the film in a correct position by setting the film using state at a phase obtained by shifting its phase in the direction of rewinding just as much as the rotation phase of the fork gear 10 obtained as shown in FIGS. 2(a) and 2(b) to FIGS. 7(a) and 7(b). In such a case, however, the film using state setting action is extremely difficult as it is to be performed at the same time as the timing of taking out the film.

In a case where the cartridge chamber lid 1 is closed without loading the cartridge 34 in the state shown in FIGS. 7(a) and 7(b), the switch 8 is turned on and the switch 9 remains in an off-state. The CPU 44, therefore, causes the fork gear 10 to be rotated not in the film thrust-out direction but in the film rewinding direction (counterclockwise rotation) for a predetermined period of time by using a timer. A current applied to the film transport motor 47 is cut off after the lapse of the predetermined time. Accordingly, the state shown in FIGS. 7(a) and 7(b) can be changed in the order of the states shown in FIGS. 7(a) and 7(b)→FIGS. 6(a) and 6(b)→FIGS. 5(a) and 5(b)→FIGS. 4(a) and 4(b) →FIGS. 3(a) and 3(b)→FIGS. 2(a) and 2(b). Therefore, for the next cartridge, the sequence of processes can be performed from its beginning.

FIG. 13 is a flow chart showing a flow of a sequence of processes to be performed by the camera according to the first embodiment of the invention.

At a step S101 of FIG. 13, the camera is in the state shown in FIGS. 2(a) and 2(b) and is waiting for turning-on of the chamber lid opening switch 48 provided for opening the cartridge chamber lid 1. When the chamber lid opening switch 48 is turned on, the flow of processes proceeds to a step S102. At the step S102, a check is made for the state of the switch 9 which is provided for detecting the presence or absence of a film cartridge. If the switch 9 is found to be in an on-state which indicates the presence of the cartridge 34, the flow proceeds to a step S111. At the step S111, the driving motor 19 is energized to close the light-blocking door 35 of the cartridge 34, and then the flow proceeds to a step S103.

If the switch 9 is found at the step S102 to be in an off-state which indicates the absence of the cartridge 34, the flow proceeds to the step S103.

At the step S103, a check is made for the state of the switch 8 which is provided for detecting whether the cartridge chamber lid 1 is open or closed. If the switch 8 is found to be in an on-state, the flow proceeds to a step S112. At the step S112, the fork gear 10 is caused to rotate clockwise to cause the driving lever 4 and the hook lever 3 to be moved by the shaft 14 of the planet gear 13 in the direction of opening the cartridge chamber lid 1. After that, the flow returns to the step S103.

As mentioned in the foregoing, the clockwise rotation of the fork gear 10 causes the hook lever 3 to part from the lock claw 2, so that the cartridge chamber lid 1 is opened by the spring 31. Then, the switch 8 turns off. With the switch 8 found to be in the off-state, the flow proceeds from the step S103 to a step S104.

At the step S104, to change the state of the camera from the state shown in FIGS. 2(*a*) and 2(*b*) to the states in the order of FIGS. 2(*a*) and 2(*b*)→FIGS. 3(*a*) and 3(*b*)→FIGS. 4(*a*) and 4(*b*)→FIGS. 5(*a*) and 5(*b*)→FIGS. 6(*a*) and 6(*b*) →FIGS. 7(*a*) and 7(*b*), the fork gear 10 is caused to rotate clockwise for a predetermined period of time as counted by the timer. After the lapse of the predetermined time, the state shown in FIGS. 7(*a*) and 7(*b*) is obtained. The flow then proceeds to a step S105 to bring the rotation of the fork gear 10 to a stop.

At the next step S106, since the cartridge chamber lid 1 is in an open state, the flow waits for closing of the cartridge chamber lid 1, that is, waits for turning-on of the switch 8. When the cartridge chamber lid 1 is closed, the state of the camera shown in FIGS. 7(*a*) and 7(*b*) changes to the state shown in FIGS. 8(*a*) and 8(*b*), so that the lock claw 2 pushes the switch 8 to turn on the switch 8. With the switch 8 thus turned on, the flow proceeds to a step S107. At the step S107, a check is made for the state of the switch 9 which is provided for detecting the presence or absence of the cartridge. If the switch 9 is found to be in an off-state, it indicates that the cartridge chamber lid 1 is closed without loading the camera with the cartridge 34. In that instance, the flow proceeds to a step S108 to prepare the camera for the next opening operation on the cartridge chamber lid 1. At the step S108, a process is performed to change the state shown in FIGS. 8(*a*) and 8(*b*) to the state shown in FIGS. 9(*a*) and 9(*b*) and then to the state shown in FIGS. 2(*a*) and 2(*b*). At a step S109, a check is made for the lapse of a predetermined period of time as counted by the timer. The fork gear 10 is assumed to have reached the state shown in FIGS. 2(*a*) and 2(*b*) when the predetermined period of time is found to have elapsed. Then, the flow proceeds to a step S110 to bring the rotation of the fork gear 10 to a stop by stopping the energizing action on the film transport motor 47, and a series of actions comes to an end.

In a case where the cartridge 34 is found at the step S107 to be present, i.e., to be in a loaded position, the flow proceeds from the step S107 to a step S113. At the step S113, the driving motor 19 is energized to open the light-blocking door 35 of the cartridge 34. At the next step S114, the film transport motor 47 is energized to cause the fork gear 10 to rotate clockwise. The film contained in the cartridge 34 then begins to be thrust out. The film thrust-out action causes the data disk 37 which is secured to the spool 36 of the cartridge 34 to rotate. At a step S115, the phase of the data disk 37 at which the rotation of the data disk 37 comes to a stop is read by the photo-reflector 38 to detect the using state of the film. At a step S116, a check is made to find if the film is either in the unexposed state or in the partly exposed state, i.e., is in a usable state. If so, the flow proceeds to a step S117.

At the step S117, data of the film, such as the sensitivity of the film, a maximum available number of photo-taking frames, etc., is read from the data disk 37 by the photo-reflector 38. At a step S118, one of photo-taking frames of the film is set in a predetermined position (an aperture position), and the rotation of the fork gear 10 is brought to a stop. By this process, either the first frame of an unexposed film or an unexposed frame located next to the last exposed frame of the partly exposed film, is set in the predetermined position. At a step S119, when a release button (not shown) is pushed for an ordinary photo-taking operation, the ordinary photo-taking action is carried out, including a shutter control action for an exposure, a one-frame winding action on the film after the exposure, etc. The flow then proceeds to a step S120.

At the step S120, a check is made to find if the manual rewinding switch is turned on. If not, the flow proceeds to a step S121 to find if the last frame has been used for photo-taking. If not, the flow returns to the step S119 to repeat the steps S119, S120 and S121.

If the manual rewinding switch is found at the step S120 to be turned on or if the last frame is found at the step S121 to be used for photo-taking, the flow proceeds to a step S122. At the step S122, the fork gear 10 is caused to rotate counterclockwise by energizing the film transport motor 47. The film is thus rewound back into the cartridge 34. At the next step S123, a check is made to find if the film rewinding action has finished. If not, the flow returns to the step S122 to repeat it.

If the film rewinding action is found at the step S122 to be finished, the flow proceeds to a step S124. At the step S124, the indication part of the cartridge shown in FIG. 10 is set to indicate a desired film using state, while detecting the bar codes of the data disk 37 by means of the photo-reflector 38. Upon completion of the film using state setting action, the flow proceeds to the step S110. At the step S110, the rotation of the fork gear 10 is brought to a stop to finish the film using state setting action. A series of actions then comes to an end.

Further, in a case where the using state of the film is found at the step S115 either to be the exposed state or to be the developed state, the film is decided at the next step S116 to be not usable. The flow then immediately proceeds to the step S122 to rewind the film. When the completion of the film rewinding is detected at the step S123, the flow proceeds to the step S124 to set the film using state to indicate the exposed state or the developed state in the same manner as the state detected at the step S115. After that, the flow proceeds to the step S110 to bring the rotation of the fork gear 10 to a stop to end the series of actions.

The first embodiment disclosed is arranged to unlock the cartridge chamber lid 1 by utilizing the output of the film transport motor 47. Compared with a case where a motor is arranged to be used solely to this purpose, the first embodiment permits not only much simplification of the structural arrangement but also reduction in cost.

Further, the cartridge chamber lid 1 is allowed to be unlocked at the time of changing the rotating direction of the fork gear 10 from the film rewinding direction over to a film thrust-out direction. Therefore, the first embodiment eliminates the possibility of such an accident that the cartridge chamber lid 1 is inadvertently opened when the film is pulled out from the film cartridge, for example, in changing the rotating direction of the fork gear 10 from the film winding direction to the rewinding direction.

Further, the provision of the rotation non-transmitting range, for the rotation of the fork gear 10 and that of the fork 11, is an advantage for use of a film cartridge having a film using state indication part, because it effectively prevents the film using state from being erroneously read due to some change in the set film using state indication caused at the time of unlocking the cartridge chamber lid.

The first embodiment is arranged to unlock the cartridge chamber lid 1 by means of the planetary gear mechanism interlocked with the fork gear 10. Compared with an arrangement for unlocking a lock claw by dividing and taking out the output of a film transport motor from an intermediate part of a film transport gear train, the arrangement of the first embodiment permits much simpler structural arrangement. Further, since the timing of unlocking, etc., can be controlled by controlling the rotation of the fork gear 10 in an ordinary manner, the control system of the camera can be simply arranged.

Further, since the first embodiment is arranged to include the inner gear 15 by which the revolving force of the planet gear is increased, the driving lever 4 and the hook lever 3 can be caused to swing without fail.

(Second Embodiment)

Figure 14:
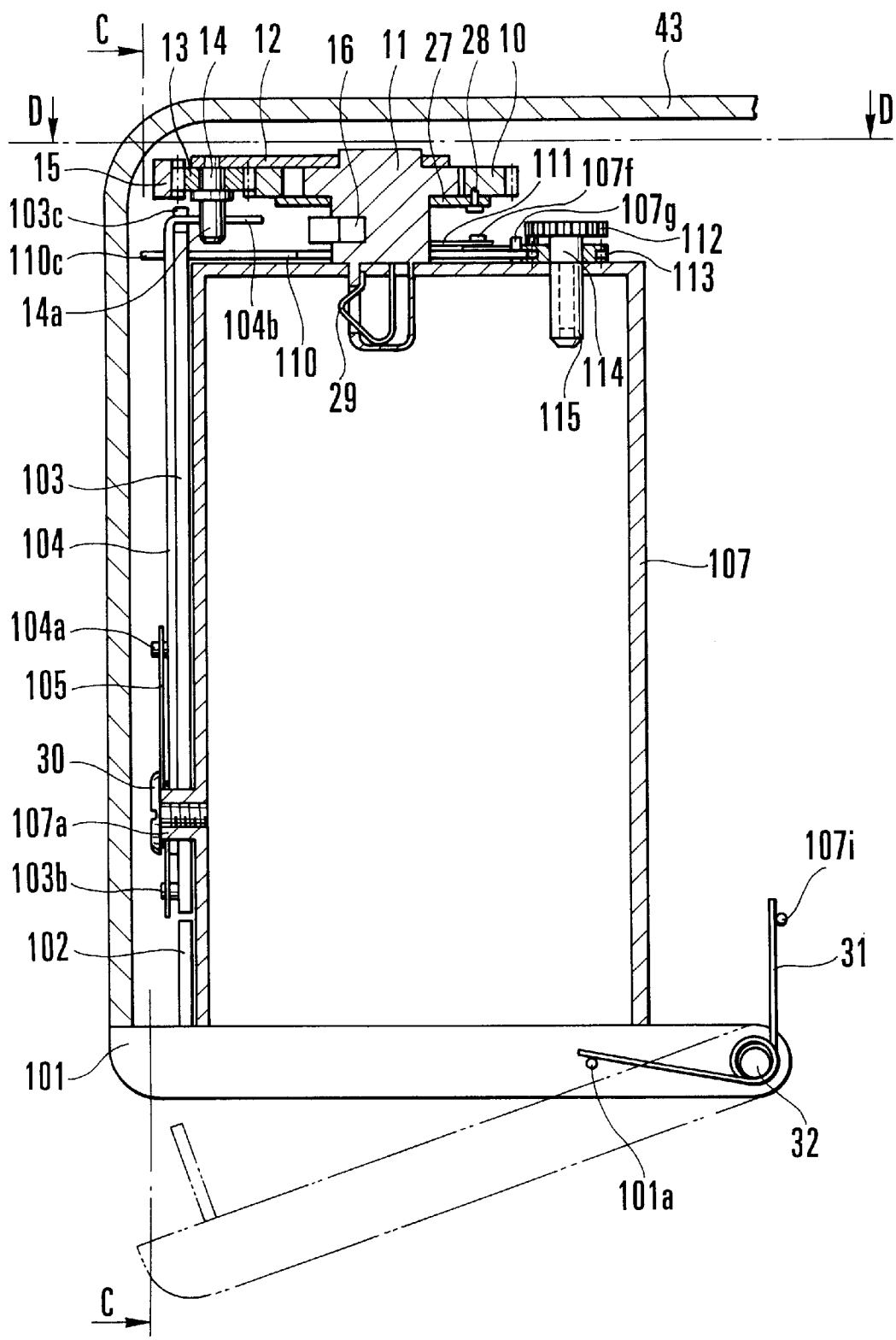
FIG. 14 is a sectional view showing a cartridge chamber and an arrangement therearound of a camera according to a second embodiment of the invention.
Figure 15A:
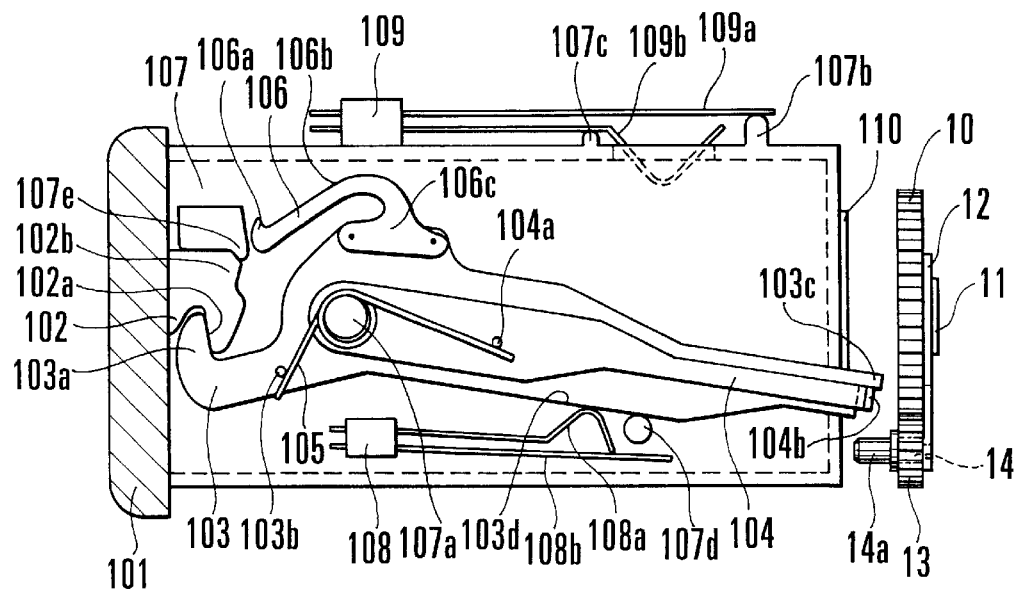
FIGS. 15(a) and 15(b) are sectional views showing essential parts of the camera shown in FIG. 14, when the planet gear is in a first position.
Figure 15B:
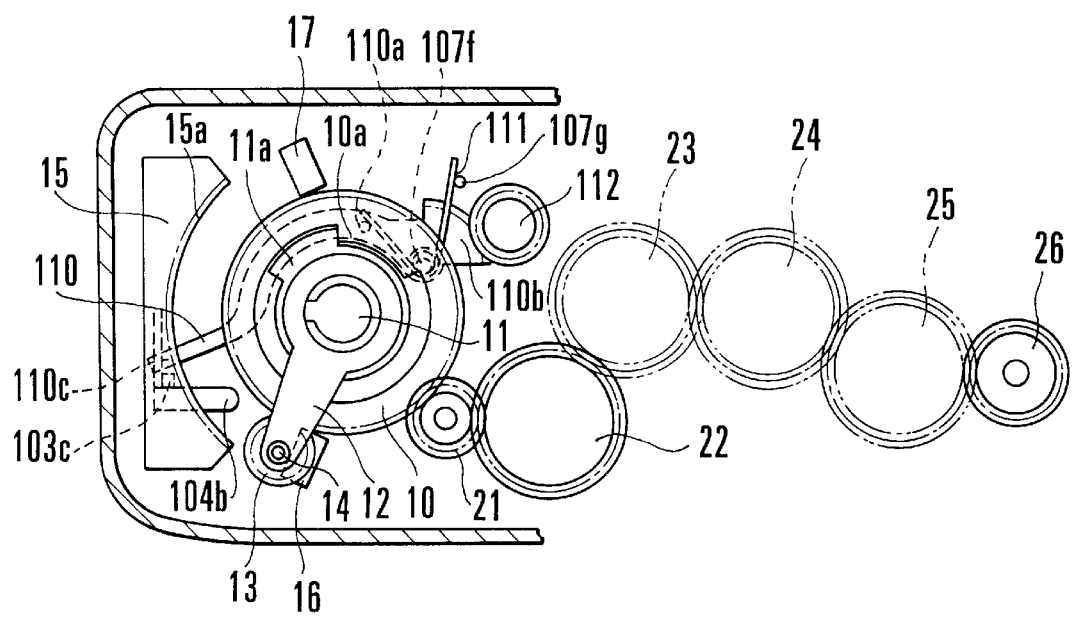
Figure 16A:
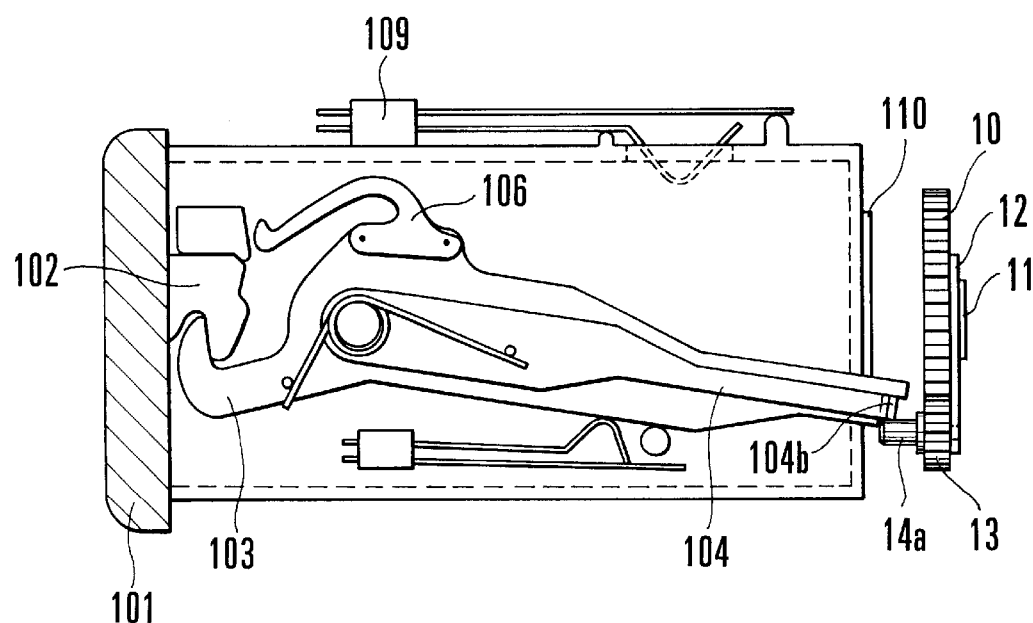
FIGS. 16(a) and 16(b) are sectional views showing the same essential parts in a state obtained when the unlocking action of the cartridge chamber lid is in process from the state shown in FIGS. 15(a) and 15(b).
Figure 16B:
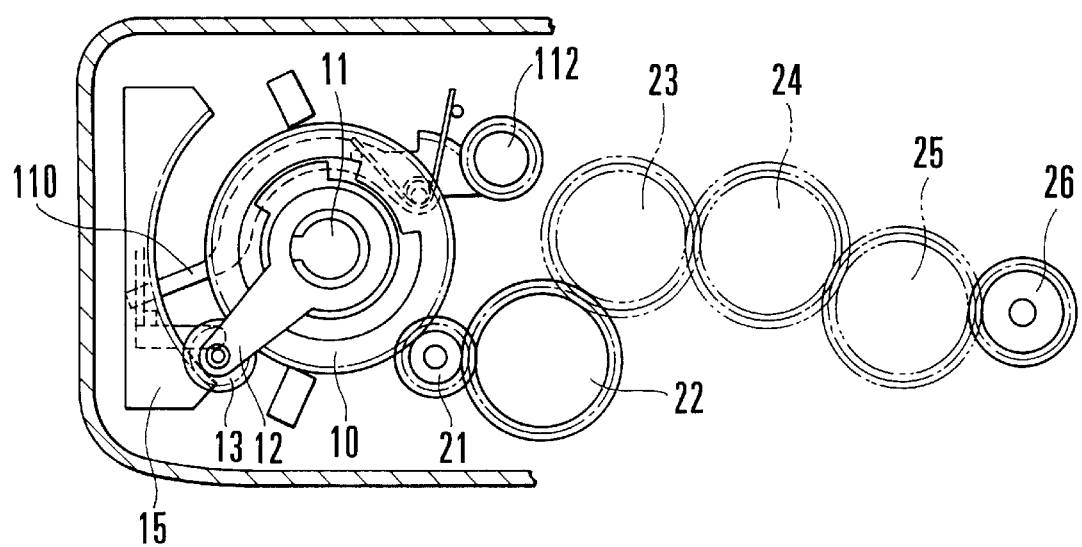
Figure 17A:
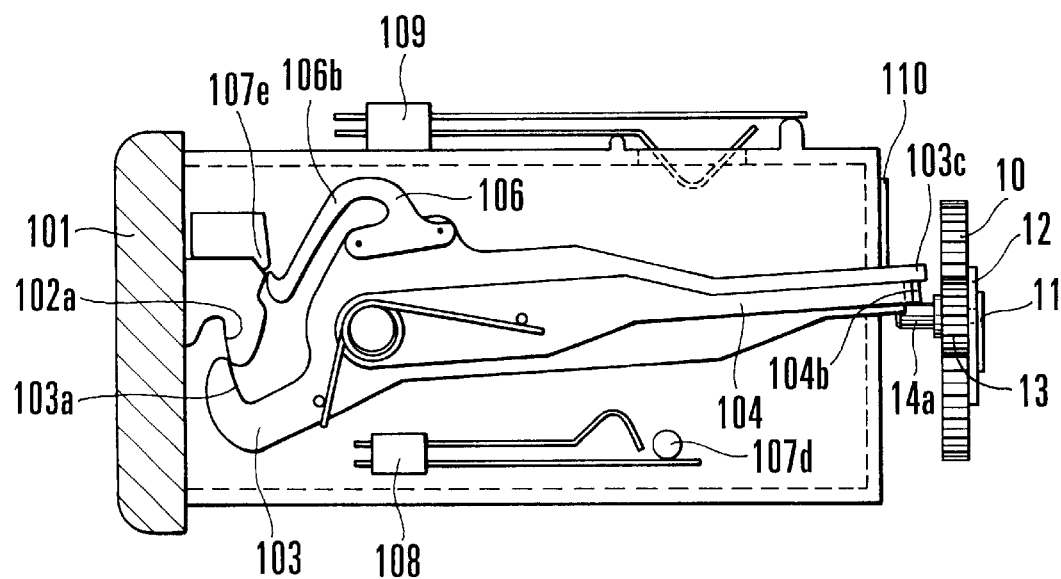
FIGS. 17(a) and 17(b) are sectional views showing the same essential parts in a state obtained immediately before the end of the unlocking action of the cartridge chamber lid in the camera in the second embodiment of the invention.
Figure 17B:
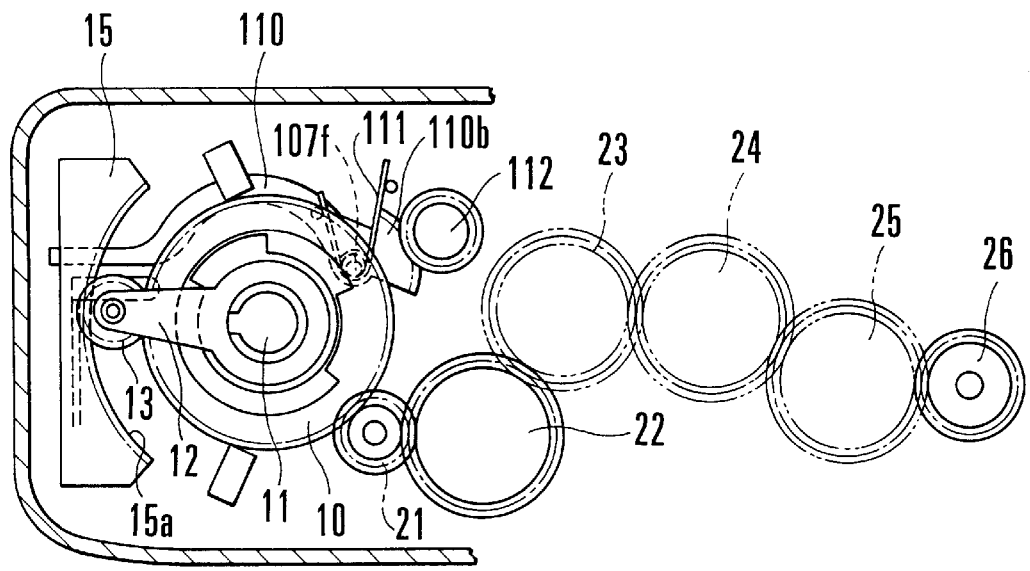
Figure 18A:
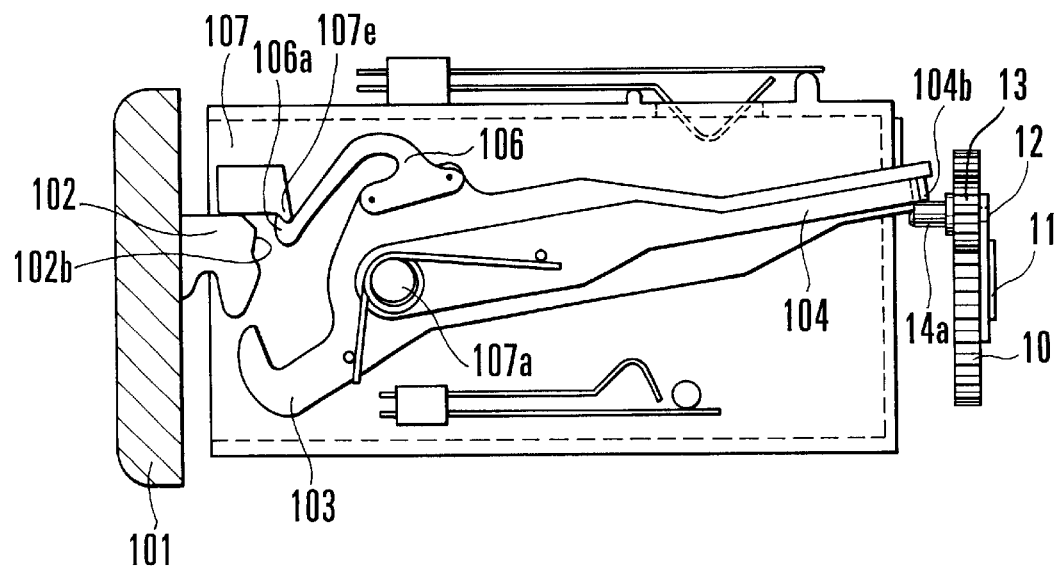
FIGS. 18(a) and 18(b) are sectional views showing the same essential parts in a state obtained after completion of the unlocking action of the cartridge chamber lid in the camera in the second embodiment of the invention.
Figure 18B:
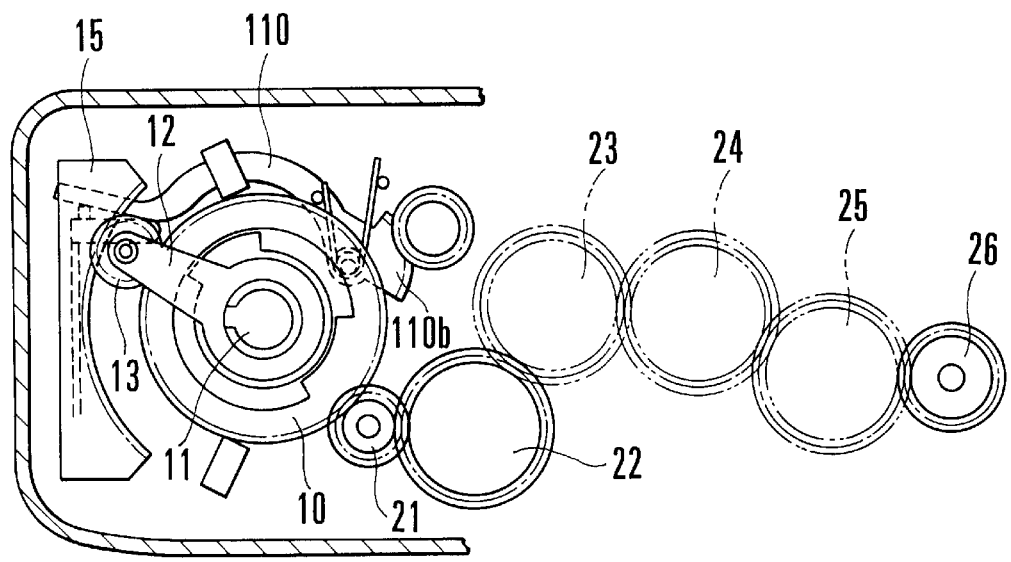
Figure 19A:
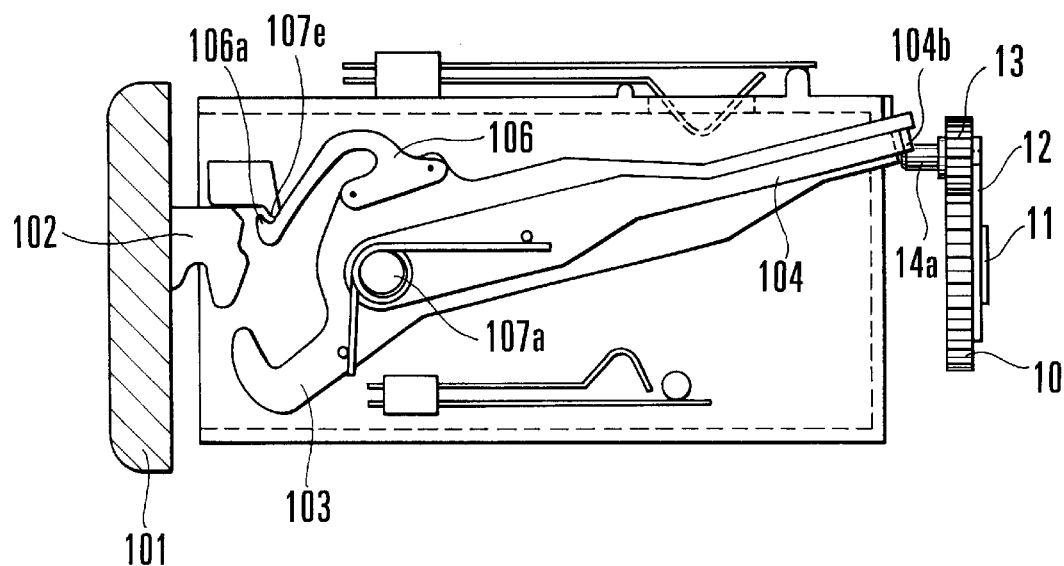
FIGS. 19(a) and 19(b) are sectional views showing the same essential parts in a state obtained when a driving lever, etc., are overcharged in the camera in the second embodiment of the invention.
Figure 19B:
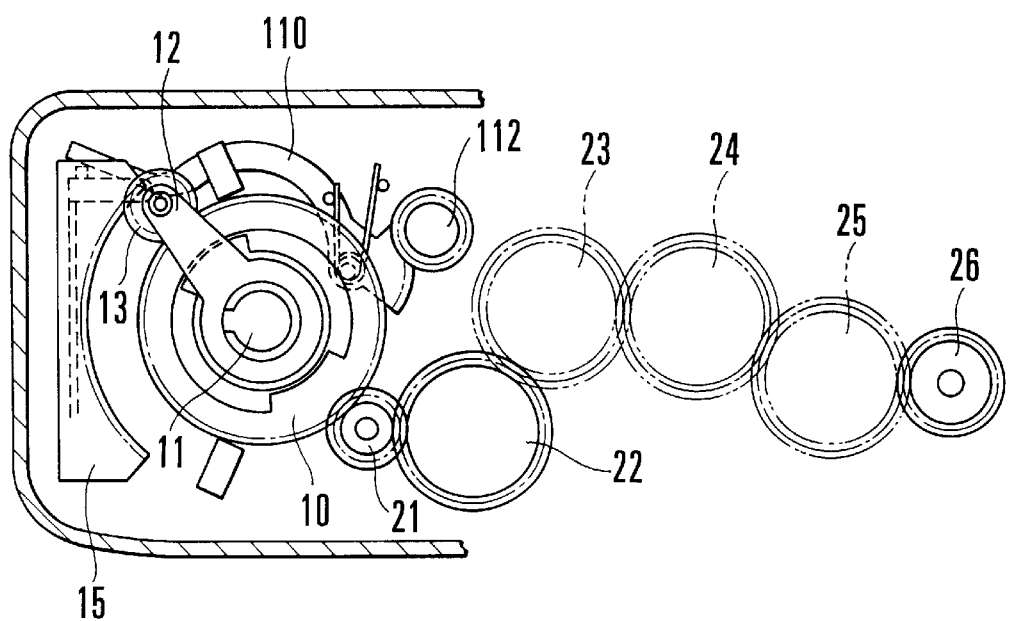
Figure 20A:
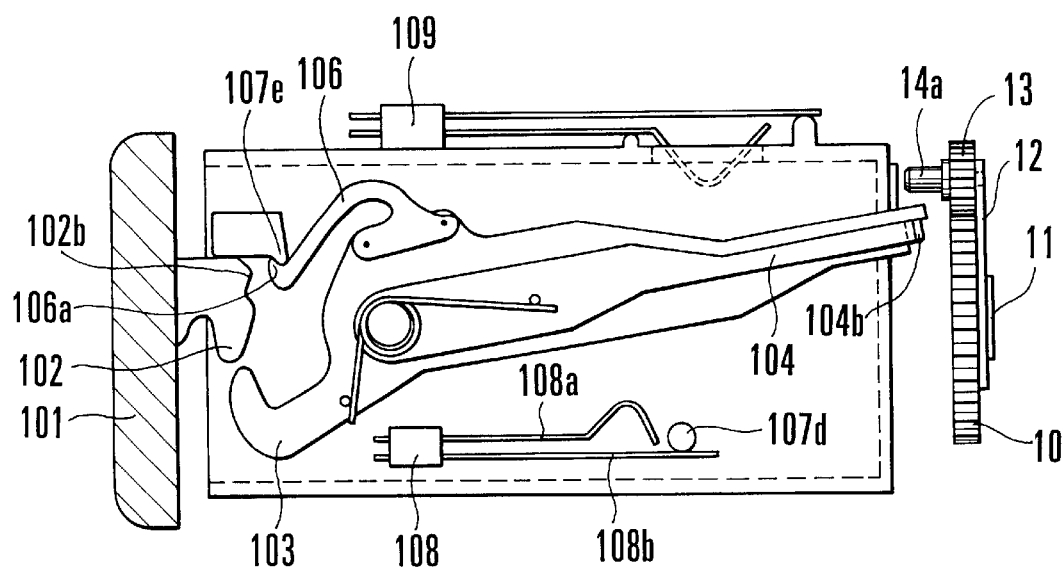
FIGS. 20(a) and 20(b) are sectional views showing the same essential parts in a state obtained when the cartridge chamber lid is kept unlocked after completion of the unlocking action of the cartridge chamber lid and when the planet gear is in a second position in the camera in the second embodiment of the invention.
Figure 20B:
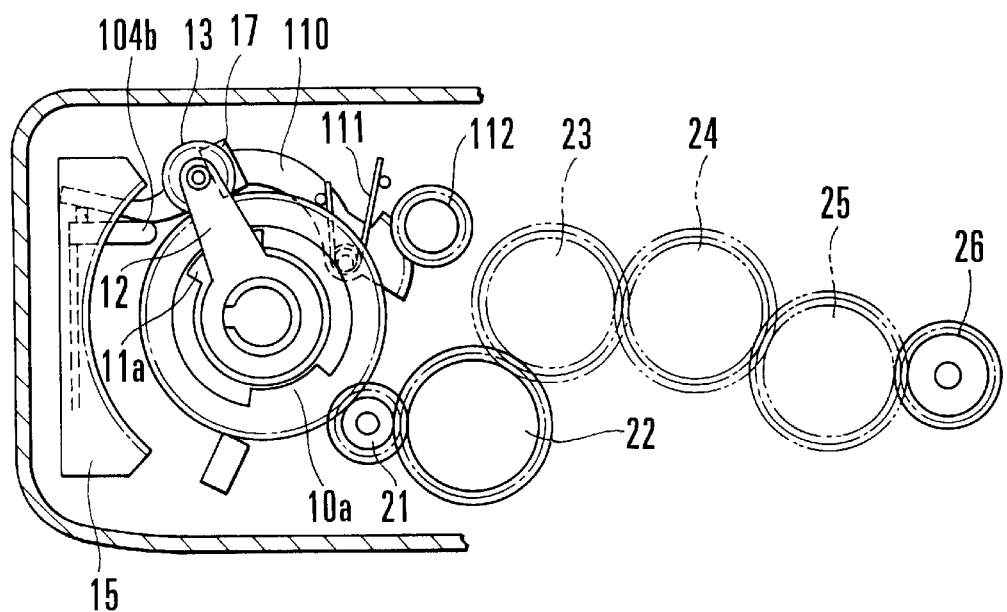
Figure 21A:
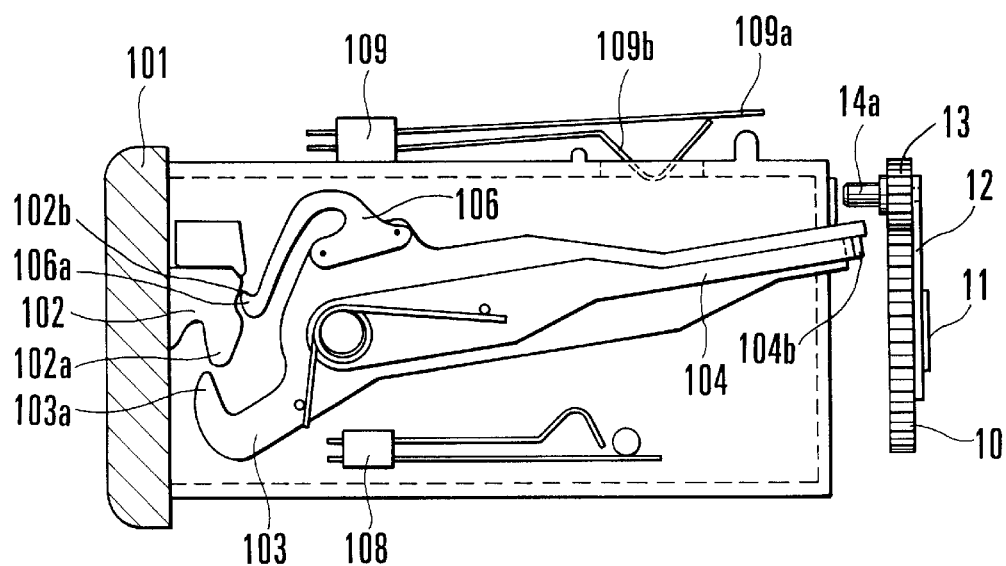
FIGS. 21(a) and 21(b) are sectional views showing the same essential parts in a state obtained immediately after the cartridge chamber lid is closed in the camera in the second embodiment of the invention.
Figure 21B:
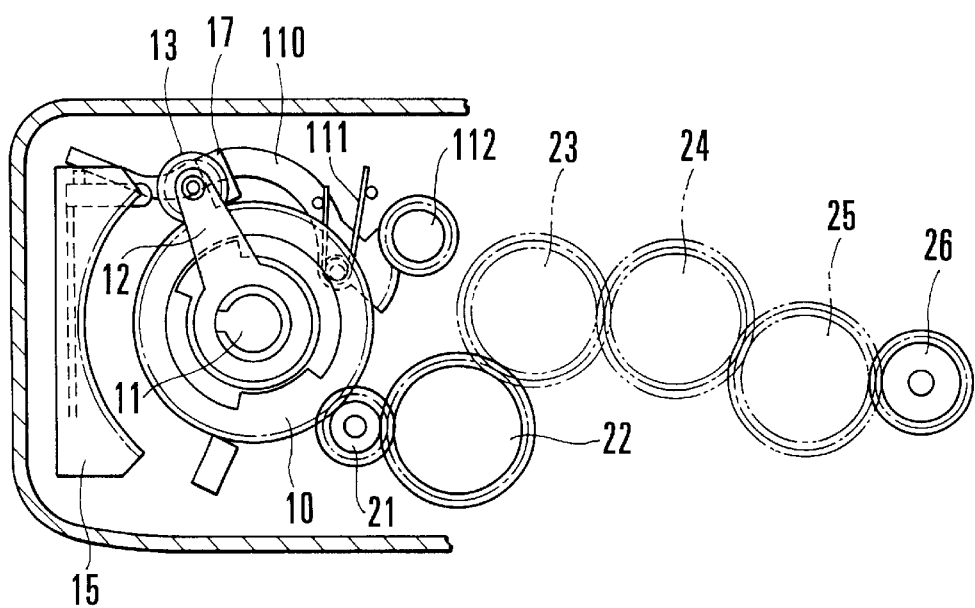
Figure 22A:
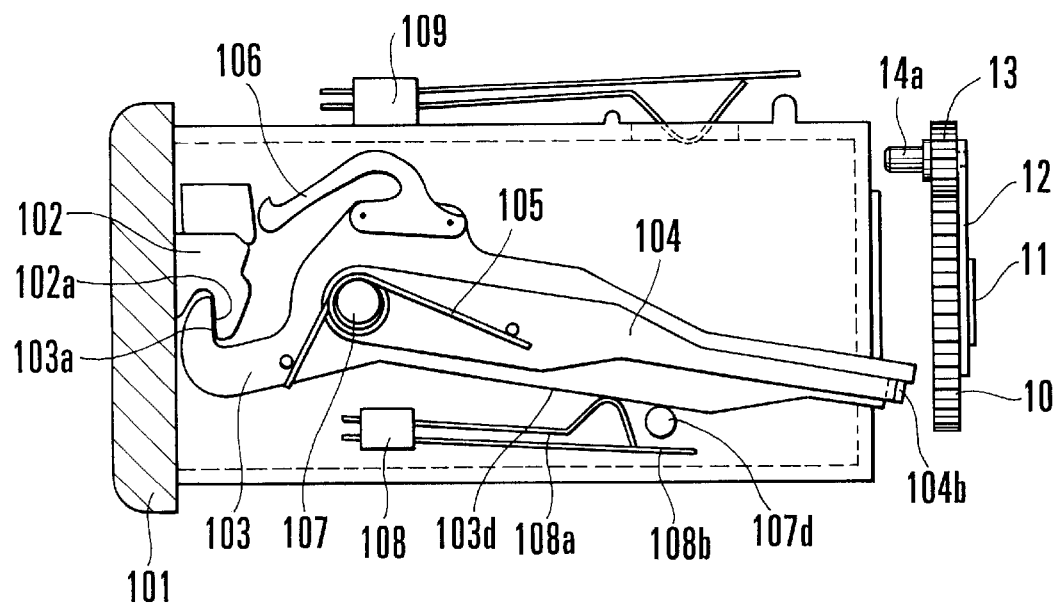
FIGS. 22(a) and 22(b) are sectional views showing the same essential parts in a state obtained when the film is thrust out from the film cartridge in the camera in the second embodiment of the invention.
Figure 22B:
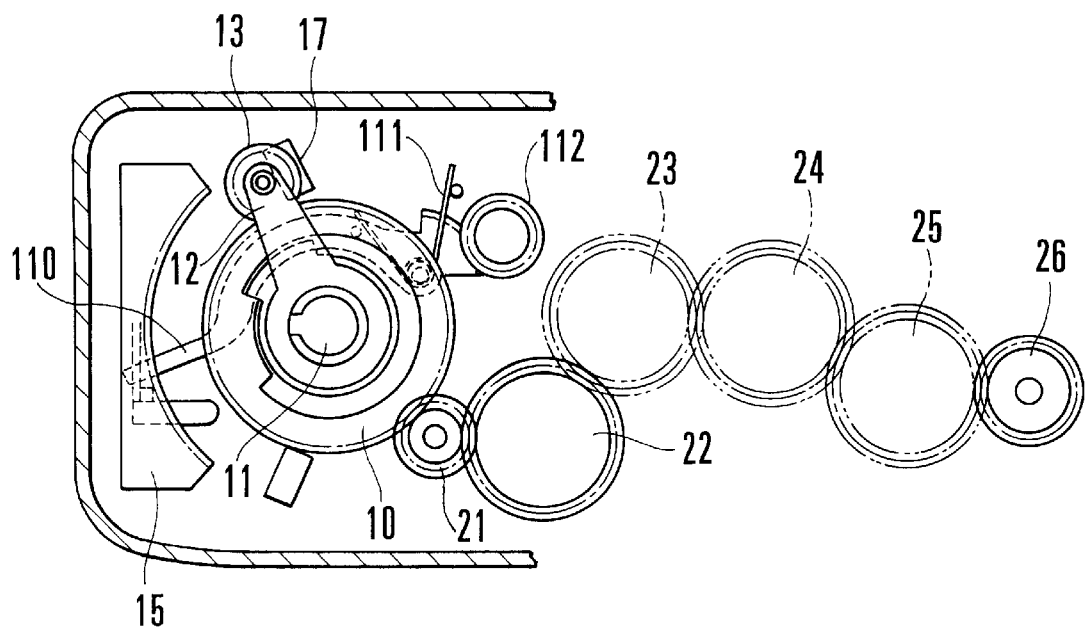
Figure 23A:
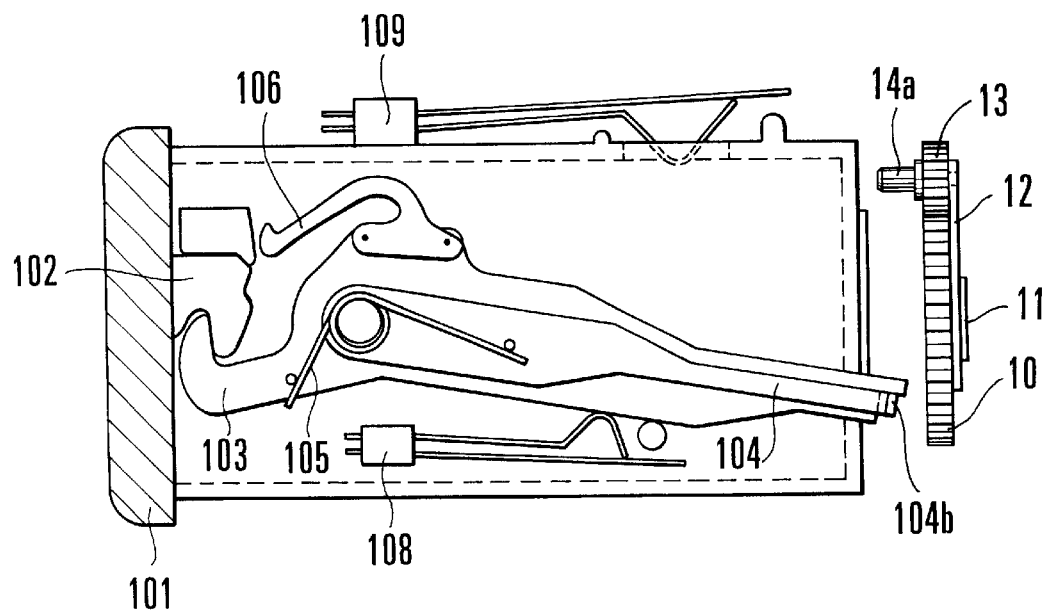
FIGS. 23(a) and 23(b) are sectional views showing the same essential parts in an ordinary photo-taking state in the camera in the second embodiment of the invention.
Figure 23B:
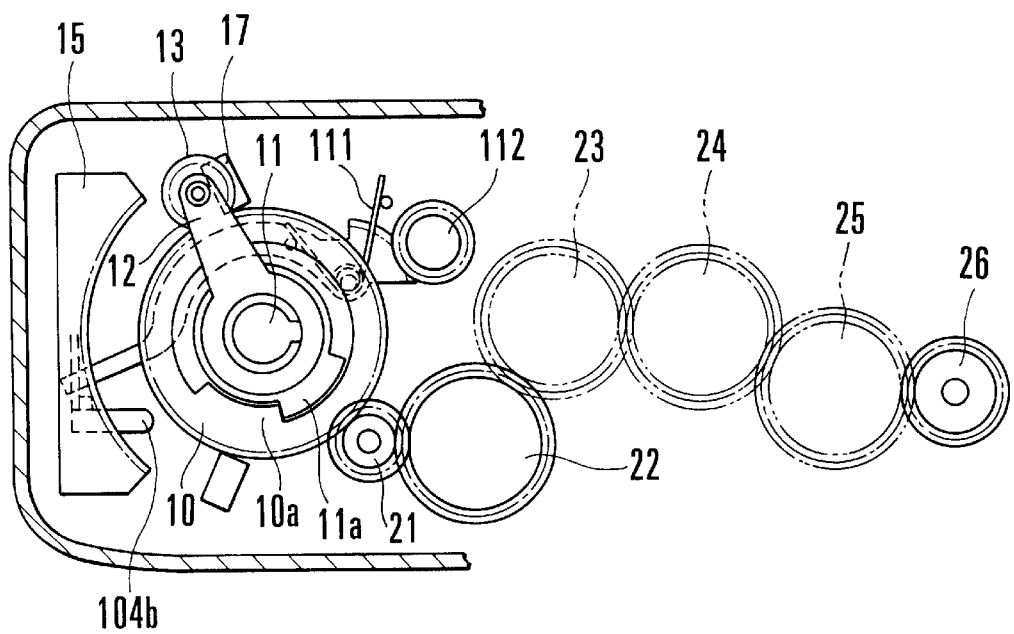
Figure 26:
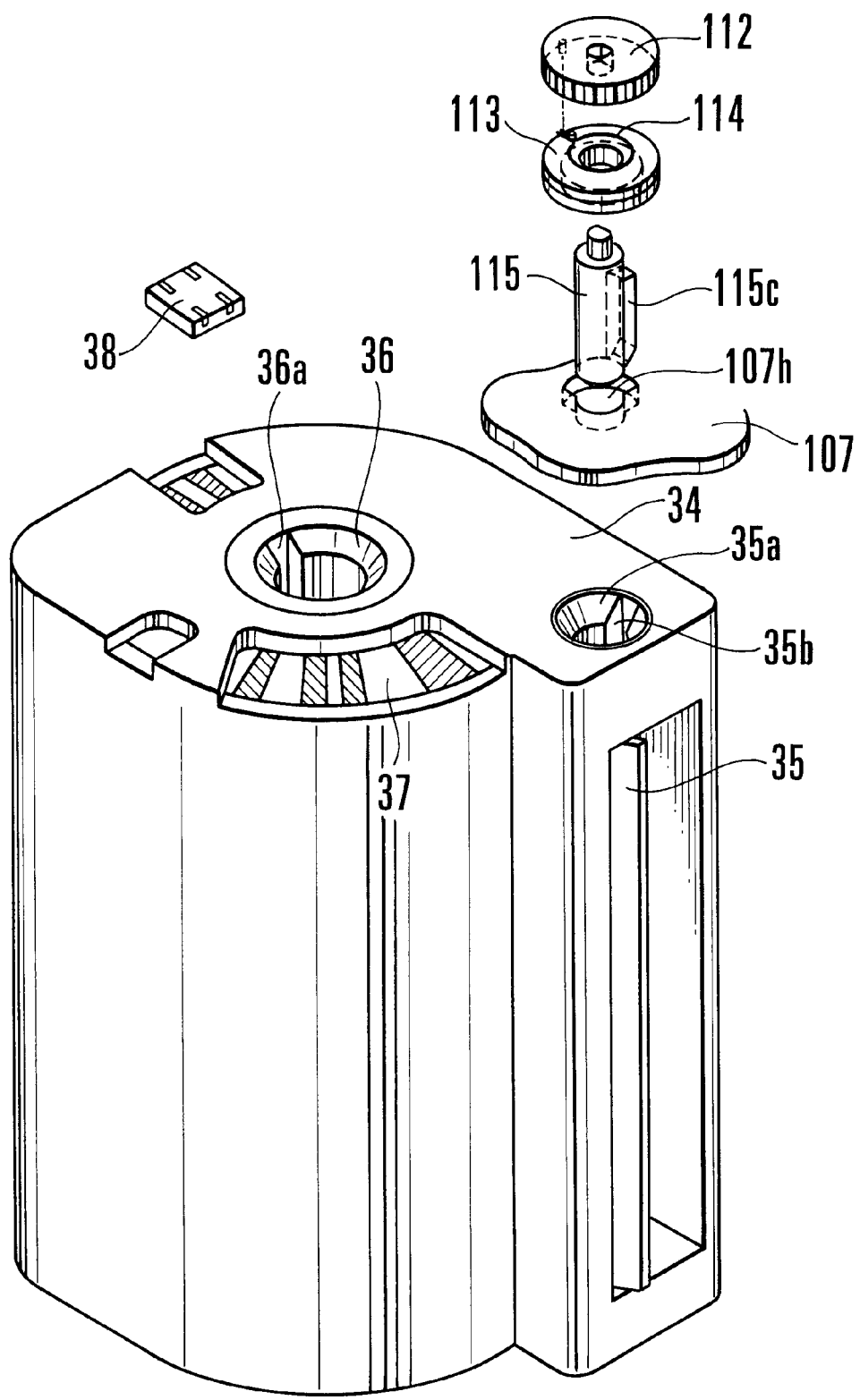
FIG. 26 is a perspective view showing a film cartridge usable for the camera in the second embodiment of the invention.
Figure 27:
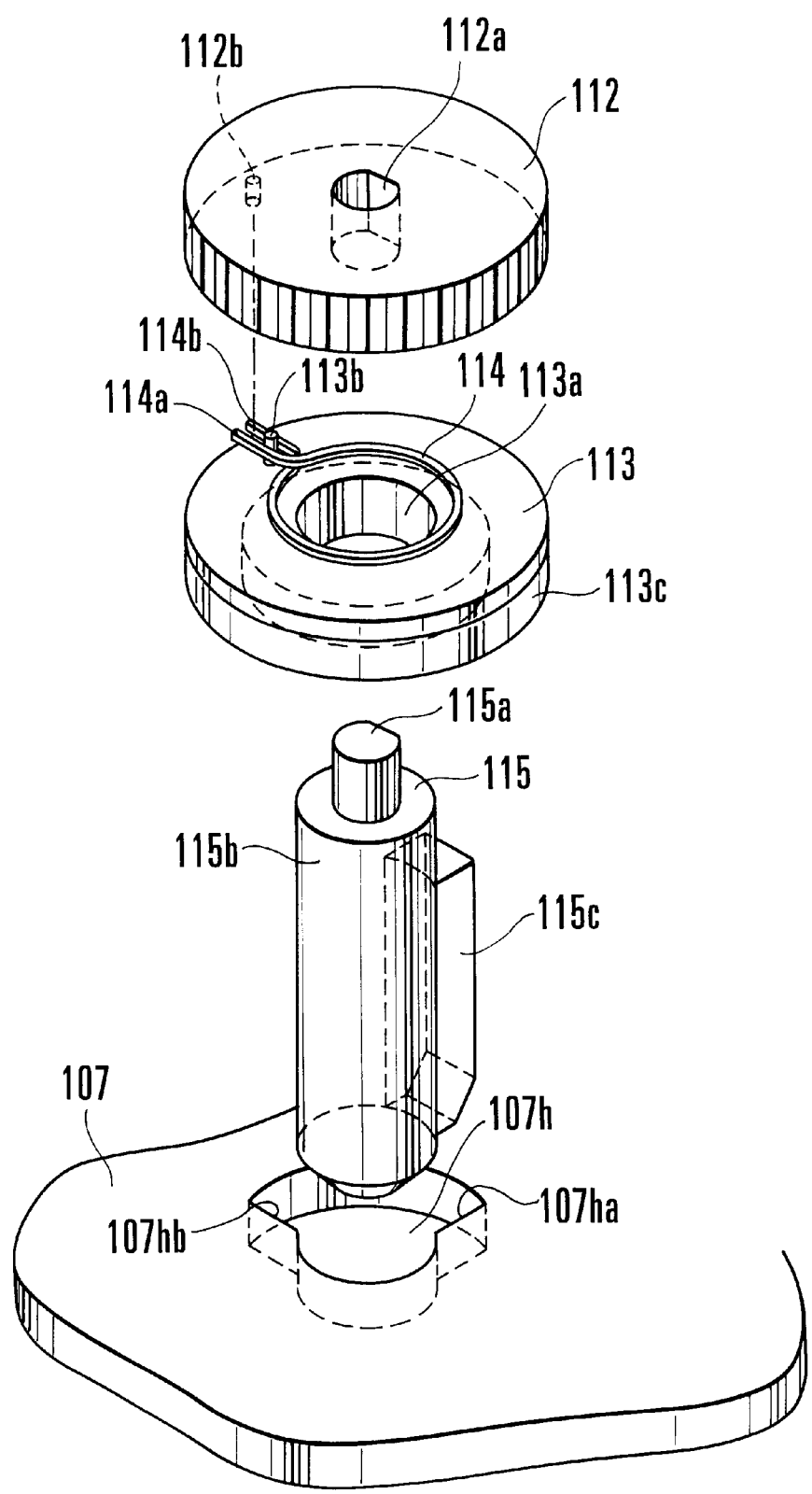
FIG. 27 is a perspective view showing a part of the film cartridge shown in FIG. 26 in an enlarged state.
Figure 28:
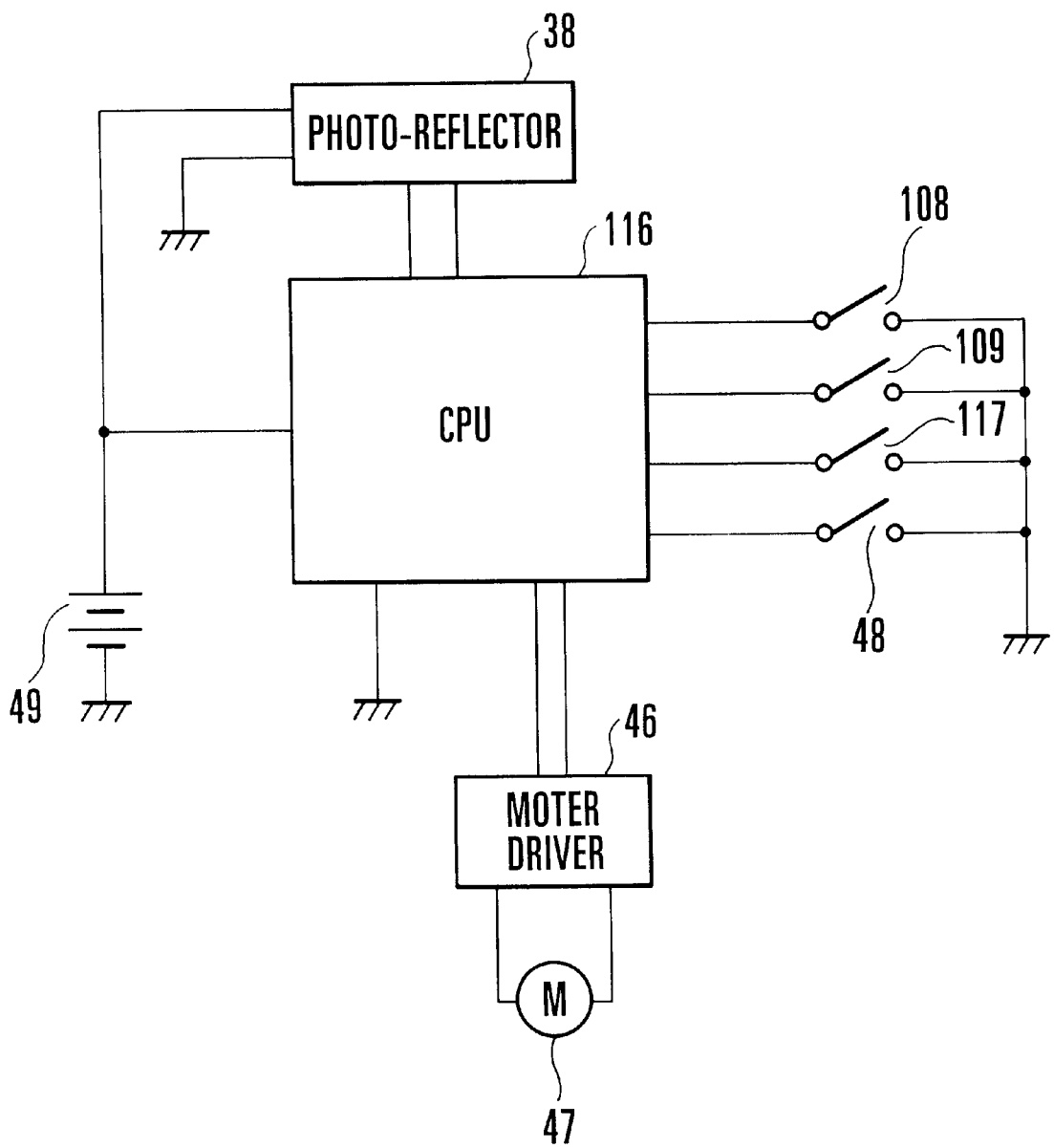
FIG. 28 is a block diagram showing the circuit arrangement of essential parts of the camera in the second embodiment of the invention.
Figure 29:
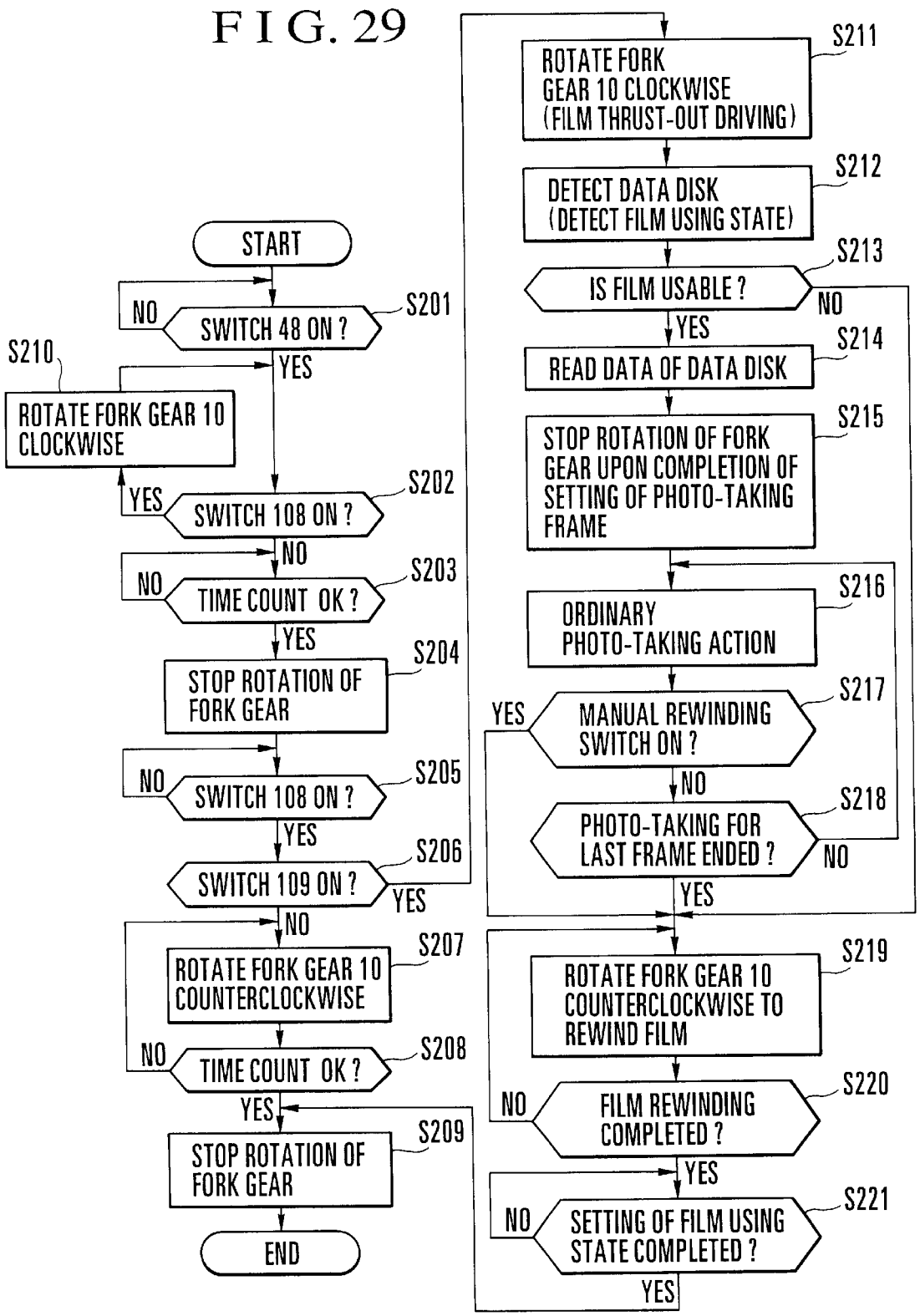
FIG. 29 is a flow chart showing a series of actions of the camera in the second embodiment of the invention.

FIGS. 14 to 29 relate to a camera according to a second embodiment of the invention. Of these figures, FIG. 14 is a sectional view showing the arrangement of a cartridge chamber and parts therearound of the camera in the second embodiment. FIGS. 15(a) and 15(b) are sectional views showing essential parts of the camera shown in FIG. 14 in the second embodiment. More specifically, FIG. 15(a) is a sectional view taken along a line C—C of FIG. 14 and FIG. 15(b) is a sectional view taken along a line D—D of FIG. 14. Each of pairs of other figures, i.e., FIGS. 16(a) and 16(b) to FIGS. 24(a) and 24(b), are sectional views likewise taken along the lines C—C and D—D. FIGS. 16(a) and 16(b) show the essential parts in a state obtained at an intermediate point of a process of releasing (unlocking) the cartridge chamber lid from its locked state shown in FIGS. 15(a) and 15(b). FIGS. 17(a) and 17(b) show the essential parts in a state obtained immediately before the end of the unlocking action on the cartridge chamber lid. FIGS. 18(a) and 18(b) show the essential parts in a state obtained after completion of the unlocking action on the cartridge chamber lid. FIGS. 19(a) and 19(b) show the essential parts in a state obtained when the driving lever and other members are overcharged after the cartridge chamber lid is unlocked. FIGS. 20(a) and 20(b) show the essential parts in a state of having the cartridge chamber lid retained in the unlocked state. FIGS. 21(a) and 21(b) show the essential parts in a state obtained immediately after the cartridge chamber lid is closed. FIGS. 22(a) and 22(b) show the essential parts in a state obtained in thrusting out the film from the cartridge. FIGS. 23(a) and 23(b) show the essential parts in an ordinary photo-taking state. FIGS. 24(a) and 24(b) show the essential parts in a state of performing a film rewinding action. FIGS. 25(a) to 25(e) show a change of a light-blocking door driving system taking place in association with the unlocking action on the cartridge chamber lid, etc. FIG. 26 shows in a perspective view a cartridge to be used for the camera in the second embodiment. FIG. 27 is an enlarged perspective view showing a part of the cartridge shown in FIG. 26. FIG. 28 shows in a block diagram the circuit arrangement of essential parts of the camera in the second embodiment of the invention. FIG. 29 is a flow chart showing a flow of operation processes of the camera in the second embodiment.

All parts of the second embodiment that are identical in shape and function with those of the first embodiment described in the foregoing are indicated by the same reference numerals as in the first embodiment.

FIGS. 14, 15(a) and 15(b) show all component elements that are essential to the invention. The arrangement of the members of the camera in the second embodiment is, therefore, described below with reference mainly to FIGS. 14, 15(a) and 15(b).

Referring to FIGS. 14, 15(a) and 15(b), a cartridge chamber lid 101 is arranged to be swingable on a shaft 32 which is secured to a camera body 107. A spring 31 is arranged between a pin 107i of the camera body 107 and a pin 101a of the cartridge chamber lid 101 to urge the cartridge chamber lid 101 to swing counterclockwise, i.e., in the direction of opening the cartridge chamber lid 101. A lock claw 102 is secured to the cartridge chamber lid 101 and is provided with a hook part 102a and a pushing-up part 102b as shown in FIG. 15(a). A hook lever 103 is swingably supported by a shaft 107a provided on the camera body 107. The hook lever 103 is provided with a hook part 103a which is arranged to lock the hook part 102a of the lock claw 102 when the cartridge chamber lid 101 is closed, and a stopper face 103d which is arranged to push a switch 108 when the hook lever 103 swings clockwise and to secure a lock position by abutting on a pin 107d provided on the camera body 107.

A driving lever 104 is swingably supported by the camera body shaft 107a in the same manner as the hook lever 103. A spring 105 is arranged between a pin 104a of the driving lever 104 and a pin 103b of the hook lever 103 to urge the driving lever 104 to swing clockwise with respect to the hook lever 103. A driving part 104b of the driving lever 104 is arranged to act as a stopper against the clockwise swing in conjunction with a projection 103c of the hook lever 103. The hook lever 103 and the driving lever 104 are thus arranged to swing together, unless some force is exerted on the driving part 104b.

A lock lever 106 is secured to the hook lever 103 at its fixing part 106c. The lock lever 106 is thus arranged to swing together with the hook lever 103. The lock lever 106 is provided with a lock holding part 106a which is arranged to be hooked on a hook part 107e of the camera body 107 as shown in FIG. 20(a), when the cartridge chamber lid 101 opens, and an elastic part 106b which is arranged to elastically deform when the hook lever 103 swings until the lock claw 102 is unlocked as shown in FIG. 17(a). When the cartridge chamber lid 101 is opened with the cartridge chamber lid 101 unlocked by the hook lever 103, the lock holding part 106a of the lock lever 106 is hooked on the hook part 107e. When the cartridge chamber lid 101 is pushed in the direction of closing the cartridge chamber lid 101 under this condition, the pushing-up part 102b of the lock claw 102 pushes up the lock holding part 106a of the lock lever 106 to unlock the lock lever 106 and to render the lock lever 106 swingable again in the clockwise direction.

The switch 108 is provided for detecting whether or not the cartridge chamber lid 101 is locked by the hook lever 103. A moving contact piece 108a of the switch 108 is pushed into contact with a fixed contact piece 108b by the stopper face 103*d* of the hook lever 103 when the hook lever 103 is in a position shown in FIG. 15(*a*). When the hook lever 103 is in an unlocking position as shown in FIG. 20(*a*), the moving contact piece 108*a* of the switch 108 moves back to its position away from the fixed contact piece 108*b* to turn off the switch 108. A switch 109 is identical with the switch 9 in the first embodiment and is provided for detecting the presence or absence of the cartridge. When the camera is not loaded with the cartridge 34 (see FIG. 26) as shown in FIG. 15(*a*), a moving contact piece 109*b* of the switch 109 is abutting on a camera body stopper 107*c* while a fixed contact piece 109*a* is abutting on a camera body stopper 107*b* to leave the switch 109 in an off-state. When the camera is loaded with the cartridge 34 as shown in FIG. 21(*a*), an external cover of the cartridge 34 pushes the moving contact piece 109*b* into contact with the fixed contact piece 109*a* to turn on the switch 109.

A sector lever 110 is arranged, as shown in FIGS. 14, 15(*a*) and 25(*a*) to 25(*e*), to be swingable on a shaft 107*f* provided on the camera body 107. A spring 111 is arranged between a pin 107*g* of the camera body 107 and a pin 110*a* of the sector lever 110 to constantly urge the sector lever 110 to swing counterclockwise. An abutting part 110*c* of the sector lever 110 is arranged to abut on the projection 103*c* of the hook lever 103 in the direction opposite to the driving part 104*b* of the driving lever 104. The counterclockwise urging force on the sector lever 110 is arranged to impart a clockwise urging force on the hook lever 103. The sector lever 110 is provided with a sector gear part 110*b* which is in mesh with a gear 113 as shown in FIGS. 25(*a*) to 25(*e*). The light-blocking door 35 of the cartridge 34 is arranged to be opened or closed by the rotation of the gear 113 caused by a swing of the sector lever 110.

Referring to FIGS. 15(*b*), 26 and 27, a rotary plate 112 is arranged to rotate a driver member 115 which is provided for driving the light-blocking door 35 of the cartridge 34 to open and close. A D-shaped shaft 115*a* of the driver member 115 is press-fitted through a hole 113*a* of the gear 113 into a D-shaped hole 112*a* formed in the center of the rotary plate 112, so that the rotary plate 112 and the driver member 115 can rotate together. The gear 113 is interposed in between the driver member 115 and the rotary plate 112 with the hole 113*a* fitted on a shaft 115*b* of the driver member 115. The gear 113 is, however, arranged to be rotatable on the shaft 115*b* independently of the rotary plate 112 or the driver member 115. As shown in FIG. 27, a phase deviation absorbing spring 114 is arranged between the rotary plate 112 and the gear 113. The spring 114 is provided with arms 114*a* and 114*b* which are arranged to have a pin 112*b* of the rotary plate 112 and a pin 113*b* of the gear 113 fitted in between the arms 114*a* and 114*b* at the same time.

The driver member 115 is arranged to drive the light-blocking door 35 to open or close by coming into an engaging hole 35*a* provided in the light-blocking door 35 with a key part 115*c* thereof inserted into a key way 35*b* of the light-blocking door 35. In FIG. 26, the cartridge 34 is shown in a state of having the light-blocking door 35 opened. The light-blocking door 35 is closed when the driver member 115 rotates counterclockwise. Further, a hole 107*h* of the camera body 107 and a support member (not shown) are arranged to make the driver member 115 and the rotary plate 112 rotatable. The rotation of the driver member 115 and the rotary plate 112 is restricted with the side face of a key part 115*c* of the driver member 115 abutting on stopper faces 107*ha* and 107*hb* of the hole 107*h* of the camera body 107. The light-blocking door 35 is thus prevented from being damaged by any excessive rotation of the driver member 115. Further, as shown in FIG. 14, the sector lever 110 is arranged at such a height where it is in mesh with the gear 113 only. Therefore, the sector lever 110 never interferes with the rotary plate 112. Further, the sector lever 110 and the spring 111 are arranged at such a height that they never interfere with the fork gear 10, the stoppers 16 and 17, the planet gear 13, the shaft 14 and the extended shaft part 14*a*.

FIG. 28 shows in a block diagram the circuit arrangement of only such parts of the camera that relate to the second embodiment of the invention. Circuits for ordinary camera functions, such as light measuring, distance measuring, shutter control and frame position indexing circuits, etc., are omitted from FIG. 28.

Referring to FIG. 28, a photo-reflector 38 is provided for detecting bar codes provided on the data disk 37. A motor driver 46 is arranged to drive the film transport motor 47. A chamber lid opening switch 48 is provided for opening the cartridge chamber lid 101. A battery 49 is arranged as the power source of the camera. A CPU 116 is arranged to store the state of the camera and control various actions of the camera.

The operation of the camera in the second embodiment arranged as described above is described with reference to FIGS. 15(*a*) and 15(*b*) to FIGS. 24(*a*) and 24(*b*) as follows.

FIGS. 15(*a*) and 15(*b*) show the essential parts of the camera in a state of having the cartridge chamber lid 101 closed with the cartridge 34 not loaded therein. When the user turns on the chamber lid opening switch 48 in this state for loading the cartridge 34, the CPU 116 detects turning-on of the switch 48. The CPU 116 then causes the motor driver 46 to energize the film transport motor 47. With the film transport motor 47 energized, the output of the motor 47 is transmitted to the fork gear 10 through a reduction system (not shown), a one-way clutch system (not shown) and a gear train (gears 21 to 26). The fork gear 10 then begins to rotate clockwise (in a first direction). The friction of the planet gear 13 causes the planet gear 13 and the planetary lever 12 to revolve clockwise. The gear part 15*a* of the inner gear 15 and the planet gear 13 intermesh with each other to change the revolution caused by a frictional force over to a revolution caused by gear coupling. After that, the driving part 104*b* of the driving lever 104 comes to abut on the extended shaft part 14*a* which extends downward from the shaft 14 of the planet gear 13. At this moment, there is obtained the state shown in FIGS. 16(*a*) and 16(*b*).

When the fork gear 10 further rotates clockwise (in the first direction), the extended shaft part 14*a* pushes the driving lever 104 to cause the driving lever 104 to swing counterclockwise together with the hook lever 103 which is pushed by the driving part 104*b*, as shown in FIG. 17(*a*). The counterclockwise swing of the hook lever 103 pushes the sector lever 110 which is abutting on the projection 103*c* of the hook lever 103. The sector lever 110 is thus caused to swing clockwise on the shaft 107*f* against the force of the spring 111, as shown in FIG. 17(*b*). Then, the gear 113 which is in mesh with the gear part 110*b* of the sector lever 110 comes to rotate counterclockwise. When the fork gear 10 is at its rotation position shown in FIG. 17(*b*), the hook part 103*a* of the hook lever 103 is not disengaged from the hook part 102*a* of the lock claw 102 of the cartridge chamber lid 101, as shown in FIG. 17(*a*). Therefore, in this state, the cartridge chamber lid 101 cannot be opened as yet.

The sector lever 110 is driven to move accordingly as the fork gear 10 rotates further from the position shown in FIGS. 15(*a*) and 15(*b*) through the position shown in FIGS. 16(*a*)

and 16(*b*) to the position shown in FIGS. 17(*a*) and 17(*b*), as mentioned above. Such a movement of the sector lever 110 is shown in FIGS. 25(*a*), 25(*b*) and 25(*c*). FIG. 25(*a*) shows the sector lever 110 at a position corresponding to the position shown in FIGS. 15(*a*) and 15(*b*). In this state, the phase of the gear 113 which is in mesh with the sector lever 110 is obtained by rotating the gear 113 further clockwise than the rotary plate 112 for the purpose of having the key part 115*c* of the driver member 115 to abut, without fail, on the stopper face 107*ha* (see FIG. 27) of the hole 107*h* of the camera body 107. This arrangement causes a phase deviation between the gear 113 and the rotary plate 112. However, the phase deviation can be absorbed by the phase deviation absorbing spring 114 which is provided at a part where the gear 113 and the rotary plate 112 are interlocked as shown in FIG. 25(*a*). By virtue of the absorbing action of the spring 114, the phase deviation is allowable without damaging the key part 115*c* of the driver member 115, etc. In other words, the motion (phase) of the gear 113 and that of the rotary plate 112 are perfectly interlocked, and the key part 115*c* is abutting on the stopper 107*ha* or 107*hb* of the camera body hole 107*h* in the states shown in FIGS. 25(*b*) and 25(*c*). The interlocked state disappears when the sector lever 110 further swings from this state as shown in FIG. 25(*a*), 25(*d*) or 25(*e*). In the states shown in FIGS. 25(*a*), 25(*d*) and 25(*e*), an urging force is exerted in such a way as to bring the arms 114*a* and 114*b* of the spring 114 to come closer to each other. In the case of FIG. 25(*a*), for example, after the key part 115*c* of the driver member 115 is reliably caused to abut on the stopper 107*ha* of the camera body hole 107*h*, the urging force is further exerted to ensure that the light-blocking door 35 is kept in an open position when the camera is loaded with the cartridge 34.

Further, the sector lever 110 can be set at such a phase that the light-blocking door 35 can be reliably closed when the camera is loaded with the cartridge 34, as shown in FIG. 25(*c*), even when the cartridge chamber lid 101 has not been completely unlocked in the process of opening the cartridge chamber lid 101 as shown in FIG. 17(*a*).

The above-stated actions are performed also in a case where the cartridge 34 is to be taken out when the camera is loaded with the cartridge 34. In this case, like in the case of the first embodiment, the cartridge chamber lid 101 is completely unlocked by the processes of changing the states in the order of FIGS. 15(*a*) and 15(*b*)→FIGS. 16(*a*) and 16(*b*)→FIGS. 17(*a*) and 17(*b*)→FIGS. 18(*a*) and 18(*b*) →FIGS. 19(*a*) and 19(*b*)→FIGS. 20(*a*) and 20(*b*). Then, the fork gear 10 rotates clockwise until extended shaft part 14*a* comes to abut on the stopper 17 after the extended shaft part 14*a* escapes from the driving part 104*b* of the driving lever 104. The clockwise rotation of the fork gear 10 is transmitted to the fork 11 in such a way as to cause no change of a phase at which the film using state is set.

More specifically, the film using state (indication) set on the cartridge 34 is determined by a phase at which the counterclockwise rotation (film rewinding rotation) of the fork gear 10 comes to a stop. The unlocking action on the cartridge chamber lid 101 is, on the other hand, performed through the processes of changing the states shown in FIGS. 15(*a*) and 15(*b*) to FIGS. 20(*a*) and 20(*b*) by the clockwise rotation of the fork gear 10 (film thrust-out direction), which is contrary to the rotation made when the film using state is set. In other words, the fork gear 10 is rotated in the direction in which the projection 10*a* of the fork gear 10 and the projection 11*a* of the fork 11 move away from their mutually abutting positions, i.e., from one end to the other of the rotation non-transmitting range. Therefore, the cartridge chamber lid 101 can be unlocked without causing any change in the setting of the film using state.

FIGS. 18(*a*) and 18(*b*) show the essential parts of the camera in a state obtained when the fork gear 10 is rotated further clockwise from the state shown in FIGS. 17(*a*) and 17(*b*). At this moment, the phase of the sector lever 110 and that of the rotary plate 112 are as shown in FIG. 25(*d*). In the state shown in FIGS. 18(*a*) and 18(*b*), the lock claw 102 of the cartridge chamber lid 101 is completely released from the hook lever 103 to allow the cartridge chamber lid 101 to be opened by the spring 31. At that moment, the pushing-up part 102*b* of the lock claw 102 ceases to push the hook part 106*a* of the lock lever 106. As a result, the hook part 106*a* of the lock lever 106 is hooked on the hook part 107*e* of the camera body 107, so that the hook lever 103 can be held in its unlocking position to facilitate a loading operation on the cartridge 34.

When the fork gear 10 rotates further clockwise, there is obtained the state shown in FIGS. 19(*a*) and 19(*b*), and the hook lever 103 swings further clockwise. Therefore, even if the lock lever 106 fails to be hooked on the hook part 107*e* of the camera body 107, the hook lever 103 can be held in the unlocking position without fail through the overcharging process shown in FIGS. 19(*a*) and 19(*b*).

When the fork gear 10 rotates clockwise still further, the extended shaft part 14*a* and the driving part 104*b* of the driving lever 104 are no longer interlocked with each other, as shown in FIGS. 20(*a*) and 20(*b*). Therefore, the hook lever 103 is caused to swing clockwise by the urging force of the spring 111 of the sector lever 110. The hook lever 103 thus swings until it is held in a position where the hook part 106*a* of the lock lever 106 is hooked on the hook part 107*e* of the camera body 107.

The cartridge chamber lid 101 is opened by the actions described above. Therefore, when the user loads the camera with the cartridge 34 and pushes the cartridge chamber lid 101 in the direction of closing, there is obtained a state shown in FIGS. 21(*a*) and 21(*b*). In this state, as shown in FIG. 21(*a*), the switch 109 which is provided for detecting the presence or absence of the cartridge 34 is in an on-state as the camera is loaded with the cartridge 34. Further, with the cartridge chamber lid 101 closed, the lock claw 102 is pushed inward. Then, the pushing-up part 102*b* of the lock claw 102 pushes the hook part 106*a* of the lock lever 106 to disengage the hook part 106*a* from the hook part 107*e*. Accordingly, the restriction on the clockwise swing of the hook lever 103 is canceled to allow the hook lever 103 to be caused to swing clockwise by the urging force of the spring 111 of the sector lever 110. The hook part 103*a* of the hook lever 103 then comes to engage the hook part 102*a* of the lock claw 102 to hold the cartridge chamber lid 101 in its closed position, as shown in FIGS. 22(*a*) and 22(*b*). At the same time, the switch 108 is turned on. The stopper face 103*d* of the hook lever 103 then remains in a state of abutting on the stopper pin 107*d*.

In the states shown in FIGS. 21(*a*) and 21(*b*) and FIGS. 22(*a*) and 22(*b*), the extended shaft part 14*a* is of course in a position of being completely retracted from the moving range of the driving part 104*b* of the driving lever 104.

When the hook lever 103 moves to lock the lock claw 102 of the cartridge chamber lid 101 as shown in FIGS. 21(*a*) and 21(*b*) to FIGS. 22(*a*) and 22(*b*), the position of the sector lever 110 varies, in association with this, in the order of positions shown in FIGS. 25(*d*), 25(*c*), 25(*b*) and 25(*a*). More specifically, FIG. 25(*d*) shows a state in which the driver member 115 for the light-blocking door 35 is urged to move in the direction of closing the light-blocking door 35. When the cartridge 34 is newly loaded, the light-blocking door 35 is naturally in a closed state and, therefore, the phase of the key part 115*c* of the driver member 115 can be adequately adjusted to the key way 35*b* provided in the light-blocking door 35. After that, when the cartridge chamber lid 101 is closed, the sector lever 110 is caused by the spring 111 to swing counterclockwise. The counterclockwise swing of the sector lever 110 causes the gear 113 to rotate clockwise. During the transition from the state shown in FIG. 25(*c*) to that shown in FIG. 25(*b*), the light-blocking door 35 changes from a closed state to an open state. Further, by the overcharging process shown in FIG. 25(*a*), the light-blocking door 35 is reliably set in its open position.

Further, FIG. 25(*e*) shows a state corresponding to the state of transition from the state shown in FIGS. 19(*a*) and 19(*b*) to the state shown in FIGS. 20(*a*) and 20(*b*). Even when overcharging is to be made for automatic cancellation of the interlocked state of the extended shaft part 14*a* and the driving part 104*b*, the sector lever 110 also makes an overstroke swing. However, any excess of rotation that is imparted by such an overstroke can be absorbed by the phase deviation absorbing spring 114 provided between the gear 113 and the rotary plate 112.

When the switch 108 turns on while the switch 109 provided for detecting the presence or absence of the cartridge is in an on-state as shown in FIG. 23(*a*), the CPU recognizes that the camera is loaded with the cartridge 34 and causes the fork gear 10 to rotate clockwise. The projection 10*a* of the fork gear 10 then comes to abut on the projection 11*a* of the fork 11 to make the fork gear 10 and the fork 11 to rotate together. The spool 36 of the cartridge 34 then rotates in the film thrust-out direction. With the film thrust out from the cartridge, an ordinary photo-taking operation is performed.

A driving action is performed to thrust out the film from the cartridge when the camera is in the state shown in FIG. 22(*b*). The film thrust out from the cartridge is taken up and wound around a spool (not shown) which is disposed inside the camera body. The film winding speed by the camera spool becomes faster than the film thrust-out speed when a film amount corresponding to a certain number of frames has been taken up. Then, the fork gear 10 comes to be rotated by the fork 11 in the state shown in FIG. 23(*b*).

In rewinding the film after completion of a photo-taking operation, the fork gear 10 begins to rotate counterclockwise (in a second direction) in a state shown in FIGS. 24(*a*) and 24(*b*). In this state, the extended shaft part 14*a* is again interlocked with the driving part 104*b*. However, unlike in the states shown in FIGS. 17(*a*) and 17(*b*) and FIGS. 18(*a*) and 18(*b*), the driving part 104*b* does not act on the hook lever 103 and acts only to charge the spring 105 in this state. The counterclockwise rotation of the fork gear 10 reaches its peak in the state shown in FIGS. 24(*a*) and 24(*b*). When the fork gear 10 rotates further in the same direction, the interlocked relation between the extended shaft part 14*a* and the driving part 104*b* is automatically canceled, and the state of the camera becomes as shown in FIG. 15(*b*), like in the case of the states shown in FIGS. 19(*a*) and 19(*b*) and FIGS. 20(*a*) and 20(*b*).

After that, when the chamber lid opening switch 48 is turned on for taking out the cartridge 34, the fork gear 10 rotates clockwise as shown in FIGS. 15(*a*) and 15(*b*) →FIGS. 16(*a*) and 16(*b*)→FIGS. 17(*a*) and 17(*b*)→FIGS. 18(*a*) and 18(*b*)→FIGS. 19(*a*) and 19(*b*)→FIGS. 20(*a*) and 20(*b*). Then, as mentioned in the foregoing, the light-blocking door 35 can be reliably closed by the interlocked action of the sector lever 110 before the cartridge chamber lid 101 is unlocked and opened, in the same manner as in the case of the first embodiment. However, as compared with the first embodiment which is arranged to use a motor dedicated to opening and closing the light-blocking door, the second embodiment is arranged to use only the film transport motor 47 in carrying out the same control operation. The second embodiment thus permits further reduction in cost.

FIG. 29 is a flow chart showing a flow of operation processes of the second embodiment.

At a step S201 of FIG. 29, the flow of operation waits until the chamber lid opening switch 48 is pushed. When the chamber lid opening switch 48 is turned on, the flow proceeds to a step S202. At the step S202, a check is made to find if the switch 108 is in an on-state to indicate that the cartridge chamber lid 101 is closed. If so, the flow proceeds to a step S210. At the step S210, the motor driver 46 is caused to drive the film transport motor 47. The output of the film transport motor 47 is transmitted to the fork gear 10 through the reduction gear (not shown) and the gears 21 to 25. The fork gear 10 is thus caused to rotate clockwise. This action is performed as shown in FIGS. 15(*a*) and 15(*b*) to FIGS. 17(*a*) and 17(*b*). When the switch 108 turns off as shown in FIG. 17(*a*), the flow proceeds from the step S202 to a step S203. At the step S203, the clockwise rotation of the fork gear 10 is allowed to continue further just for a predetermined period of time as counted by a timer. The state of the camera then changes from the state shown in FIGS. 17(*a*) and 17(*b*) to the state shown in FIGS. 20(*a*) and 20(*b*).

When the predetermined period of time is found at the step S203 to have elapsed, the flow proceeds to a step S204 to bring the clockwise rotation of the fork gear 10 to a stop. At the next step S205, the flow waits until the switch 108 turns on. This step corresponds to the transition of the state of the camera from the state shown in FIGS. 20(*a*) and 20(*b*) in which the cartridge chamber lid 101 is open until the cartridge chamber lid 101 is closed to turn on the switch 108 through the states shown in FIGS. 21(*a*) and 21(*b*) and FIGS. 22(*a*) and 22(*b*).

When the switch 108 is found at the step S205 to have turned on, the flow proceeds to a step S206. At the step S206, a check is made to find if the switch 109 which is provided for detecting the presence or absence of the cartridge is in an on-state thus indicating that the camera is loaded with the cartridge 34. If not, the flow proceeds to a step S207. At the step S207, the fork gear 10 is caused to rotate counterclockwise. The flow then proceeds to a step S208 to allow the counterclockwise rotation of the fork gear 10 to continue for a sufficiently long period of time, as counted by the timer, for the transition of the state of the camera from the state shown in FIGS. 22(*a*) and 22(*b*) to the state shown in FIGS. 15(*a*) and 15(*b*) through the state shown in FIGS. 23(*a*) and 23(*b*). After the lapse of this period of time, the flow proceeds from the step S208 to a step S209. At the step S209, the fork gear 10 is stopped from rotating, and a sequence of steps comes to an end.

In a case where the camera is found at the step S206 to be loaded with the cartridge 34, the flow proceeds from the step S206 to a step S211. At the step S211, the fork gear 10 is caused to rotate clockwise to interlock the fork gear 10 with the fork 11. After that, the spool 36 of the cartridge 34 is caused to rotate in the film thrust-out direction to thrust out the film. At the next step S212, the using state of the film is detected by detecting the phase of the data disk 37 of the cartridge 34 with the photo-reflector 38. At a step S213, a check is made to find whether the film contained in the cartridge 34 is usable as in the unexposed state or the partly exposed state or not usable as in the exposed state or the developed state. If the film is found to be unusable, the flow proceeds immediately to a step S219. At the step S219, the fork gear 10 is rotated counterclockwise to cause the film which has been thrust out only to a slight extent to be moved back into the cartridge 34. At a step S220, a check is made to find if the film is completely rewound back into the cartridge 34. If so, the flow proceeds to a step S221 to set a film using state indication at the using state detected at the step S212. When the film using state setting action is found to have finished, the flow proceeds to the step S209 to stop the fork gear 10 from rotating and to bring the sequence of processes to an end.

Further, if the film is found at the step S213 to be usable, the flow proceeds from the step S213 to a step S214. At the step S214, while the film thrust-out driving action by the clockwise rotation of the fork gear 10 is still in process, information on the sensitivity, etc., of the film is read by means of the photo-reflector 38 from the bar codes provided on the data disk 37 of the cartridge 34. At a step S215, a photo-taking frame of the film is set in place and the fork gear 10 is stopped from rotating. At this step, if the film is unexposed, the first frame portion of the film is set in a predetermined position. If the film is partly exposed, an unexposed frame located next to the last exposed frame is set in the predetermined position.

At a step S216, an ordinary photo-taking operation is performed in a known manner. Since the second embodiment is not directly related to the photo-taking operation, the photo-taking operation is omitted from the following description. At steps S217 and S218, checks are made to find if the manual rewinding switch 117 is turned on and if the last frame of the film has been used for photo-taking. If the result of either of these checks is affirmative (YES), the flow proceeds to the step S219 to cause the fork gear 10 to rotate counterclockwise for rewinding the film. At the next step S220, a check is made to find if the film rewinding action has finished. If so, the flow proceeds to the step S221. At the step S221, the film using state indication is set at the "partly exposed" state if the film rewinding action is performed with the manual rewinding switch 117 pushed or at the "exposed" state if the film rewinding action is performed after completion of use of the last frame for photo-taking. When the film using state setting action has finished, the flow proceeds to the step S209. At the step S209, the fork gear 10 is stopped from rotating, and the sequence of processes comes to an end.

(Third Embodiment)

Figure 30:
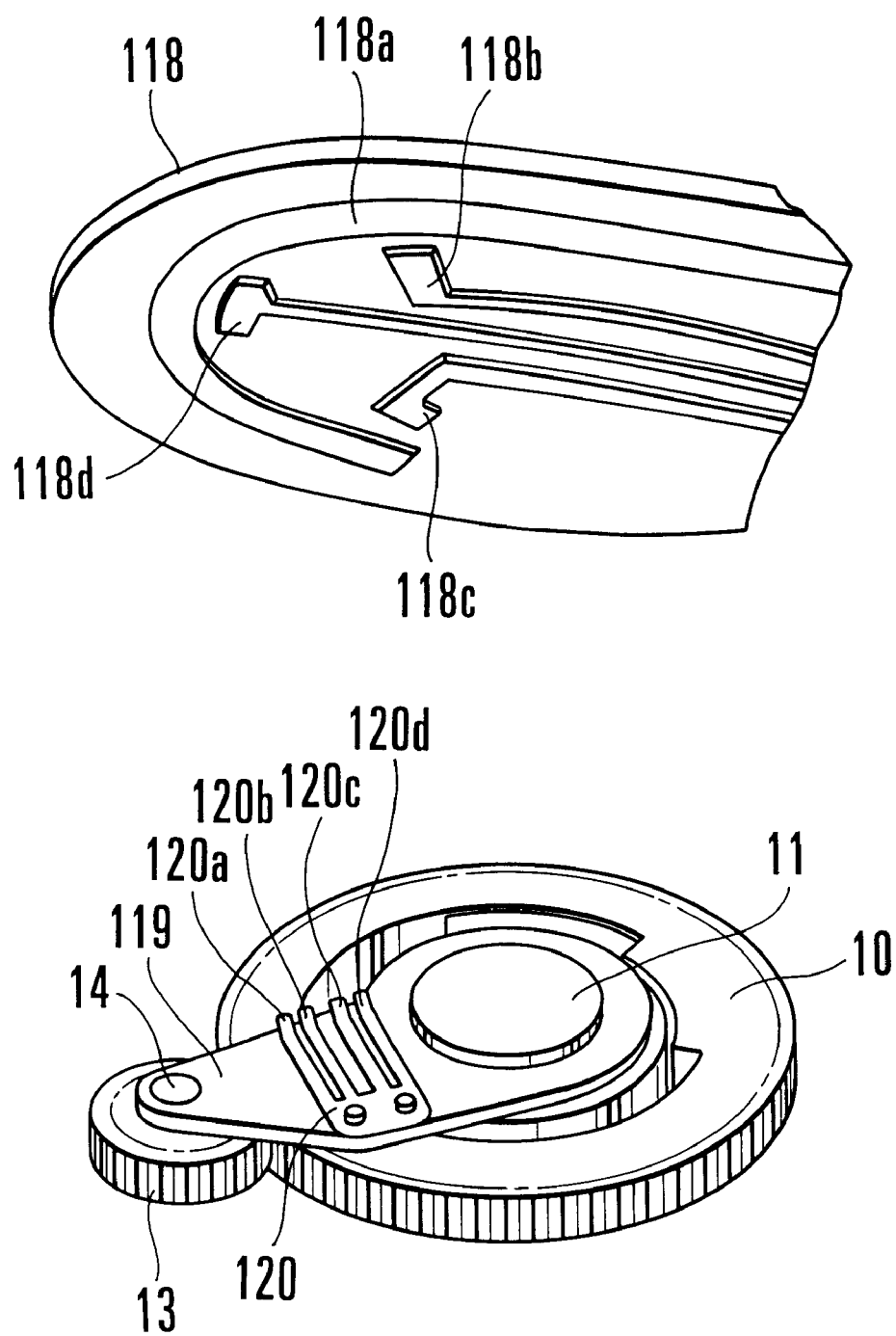
FIG. 30 is a perspective view showing the arrangement of essential parts of a camera according to a third embodiment of the invention.

FIG. 30 is a perspective view showing the arrangement of essential parts of a camera according to a third embodiment of the invention. In FIG. 30, all parts identical with those shown in FIG. 1 in shape and function are indicated by the same reference numerals.

Referring to FIG. 30, a planetary lever 119 supports a planet gear 13 which is in mesh with the fork gear 10. A common contact piece 120 is secured to the planetary lever 119. When the planetary lever 119 is caused by the rotation of the fork gear 10 to revolve (or swing) around the fork gear 10, the revolving position of the planetary lever 119 is detected through a relation between the common contact piece 120 and a printed circuit board 118. The revolving position of the planetary lever 119 is thus controlled according to the result of detection. More specifically, a plurality of patterns are provided on the printed circuit board 118, including a common pattern 118*a* and position patterns 118*b*, 118*c* and 118*d*. On the side of the planetary lever 119, there are provided contact pieces 120*a*, 120*b*, 120*c* and 120*d* besides the common contact piece 120. The patterns 118*a*, 118*b*, 118*c* and 118*d* are formed on the printed circuit board 118 concentrically with the fork 11. The contact pieces 120*a* and 120*b* are arranged to come into sliding contact with the common pattern 118*a*. The contact pieces 120*c* and 120*d* are arranged to come into sliding contact with the position patterns 118*b*, 118*c* and 118*d*. The position of the planetary lever 119 is detected and controlled by detecting how the common pattern 118*a* and one of the position patterns 118*b*, 118*c* and 118*d* are coming into contact with the common contact piece 120.

While each of the first and second embodiments is arranged to carry out the change-over of the rotating direction of the fork gear 10 from one direction to the other by using a timer, the third embodiment is arranged to accurately detect the change-over by arranging the planetary lever 119 in the manner described above. The arrangement of the third embodiment not only eliminates any unnecessary action by accurately detecting the state of the change-over but also makes it possible to provide a warning display or the like upon detection of any disorder. Further, the provision of the intermediate pattern 118*d* enables the third embodiment to bring the rotation of the fork gear 10 to a stop in a position shown in FIGS. 5(*a*) and 5(*b*) in the first embodiment. The arrangement obviates the necessity of providing the slanting faces 2*b* and 3*b* to permit the lock claw 2 to escape in closing the cartridge chamber lid 1, so that the cartridge chamber lid 1 can be closed with a much smaller force than in the case of the first embodiment. In this case, the lock claw 2 of course can be locked with the hook lever 3 by causing the fork gear 10 to rotate clockwise with the switch 8 pushed and turned on when the cartridge chamber lid 1 is closed in the state shown in FIGS. 5(*a*) and 5(*b*).

Figure 31:
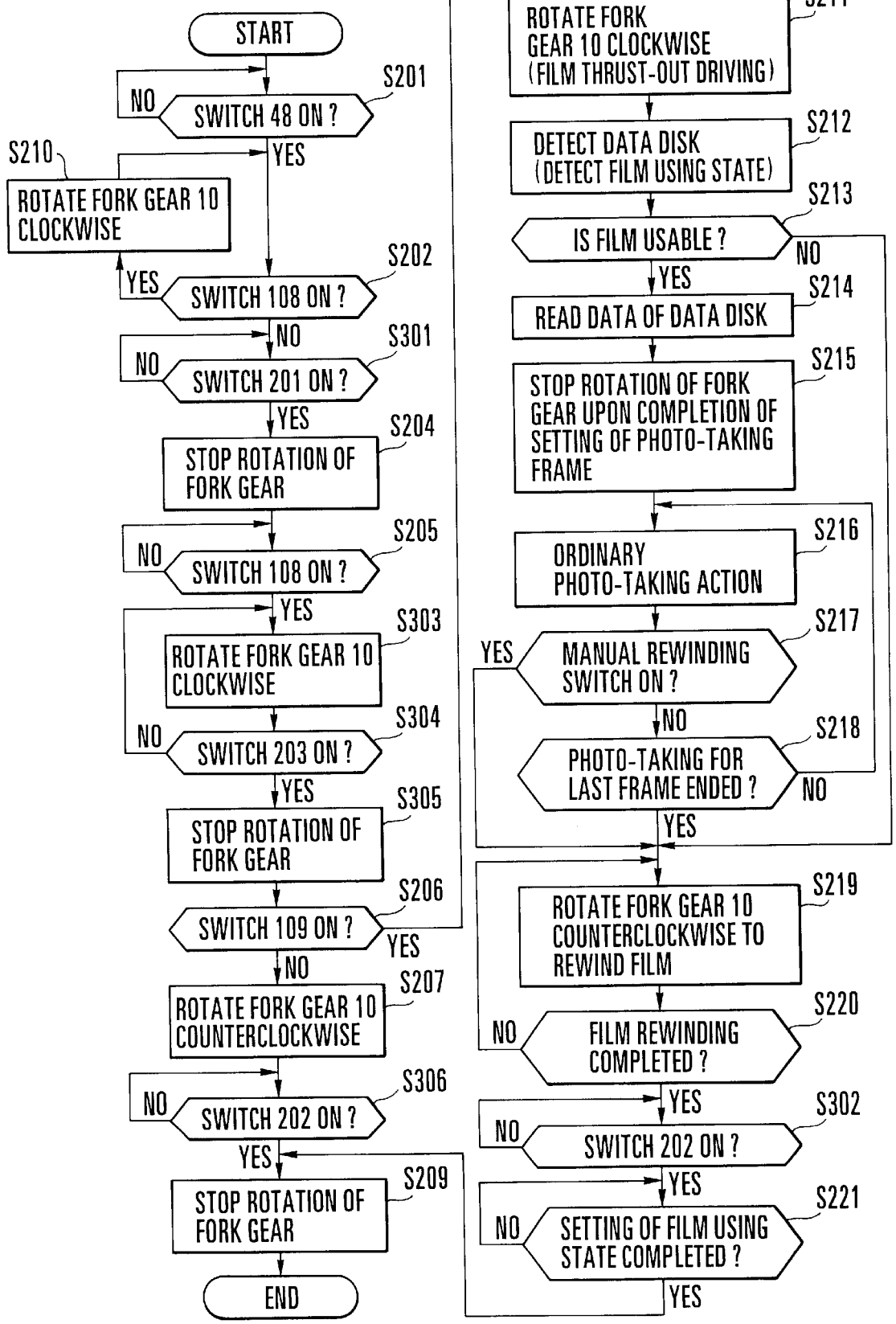
FIG. 31 is a flow chart showing a series of actions of the camera in the third embodiment of the invention.

FIG. 31 shows in a flow chart a flow of operation of the camera in the third embodiment, in which the position of the planetary lever 119 is detected by means of the common contact piece 120 and the printed circuit board 118 arranged in combination with the planetary lever 119. In FIG. 31, all steps for the same actions as those of steps of FIG. 29 are indicated by the same step numbers as in FIG. 29, and the details of them are omitted from the following description. Further, the camera in the third embodiment is arranged in the same manner as the second embodiment except that the third embodiment does not have the lock lever 106 which is secured to the hook lever 103 in the case of the second embodiment (like in the case of the first embodiment).

Referring to FIG. 31, a switch 201 shown at a step S301 is arranged to turn on when the common pattern 118*a* and the position pattern 118*d* are shortcircuited by the common contact piece 120. When the switch 201 turns on, the camera reaches the state shown in FIGS. 5(*a*) and 5(*b*) or in FIGS. 18(*a*) and 18(*b*). The flow of operation then proceeds to a step S204.

At the step S204, the rotation of the fork gear 10 is brought to a stop. At the next step S205, a check is made for the state of the switch 108. Since the cartridge chamber lid 1 or 101 is still open, the switch 108 is in an off-state. The flow waits until the cartridge chamber lid 1 or 101 is closed to cause the switch 108 to turn on. When the switch 108 turns on, the flow proceeds to a step S303. At the step S303, the film transport motor 47 is energized to rotate the fork gear 10 clockwise for locking the cartridge chamber lid 1 or 101. Accordingly, the state of the camera is caused to shift to the states shown in the order of FIGS. 5(a) and 5(b) →FIGS. 6(a) and 6(b)→FIGS. 8(a) and 8(b) or FIGS. 18(a) and 18(b)→FIGS. 19(a) and 19(b)→FIGS. 22(a) and 22(b). At the next step S304, the flow waits until the common pattern 118a and the position pattern 118c are shortcircuited by the common contact piece 120. In other words, the flow waits until a switch 203 turns on. When the switch 203 turns on, the flow proceeds to a step S305.

The switch 203 is provided for detecting a shift of the hook lever 3 from its intermediate position of the unlocking state shown in FIGS. 5(a) and 5(b) or FIGS. 18(a) and 18(b) to a position of the locked state in which the shaft 14 of the planet gear 13 ceases to engage the driving part 4b of the driving lever 4. The switch 203 thus obviates the necessity of control by means of a timer like in the case of the first or second embodiment.

At the step S305, the rotation of the fork gear 10 is immediately brought to a stop, and the flow proceeds to a step S206, which is the same as in the case of FIG. 29.

A switch 202 which is shown at steps S302 and S306 is arranged to turn on when the common pattern 118a and the position pattern 118b are shortcircuited by the common contact piece 120. After completion of the film rewinding at the step S220, it is possible to find, through the on-state of the switch 202, that the camera has reached the state shown in FIGS. 15(a) and 15(b), so that the flow can proceed to the next step S221. In the case of the step S306, the camera likewise can be found to have reached the state shown in FIGS. 15(a) and 15(b), without having recourse to the timer control.

(Fourth Embodiment)

Figure 32A:
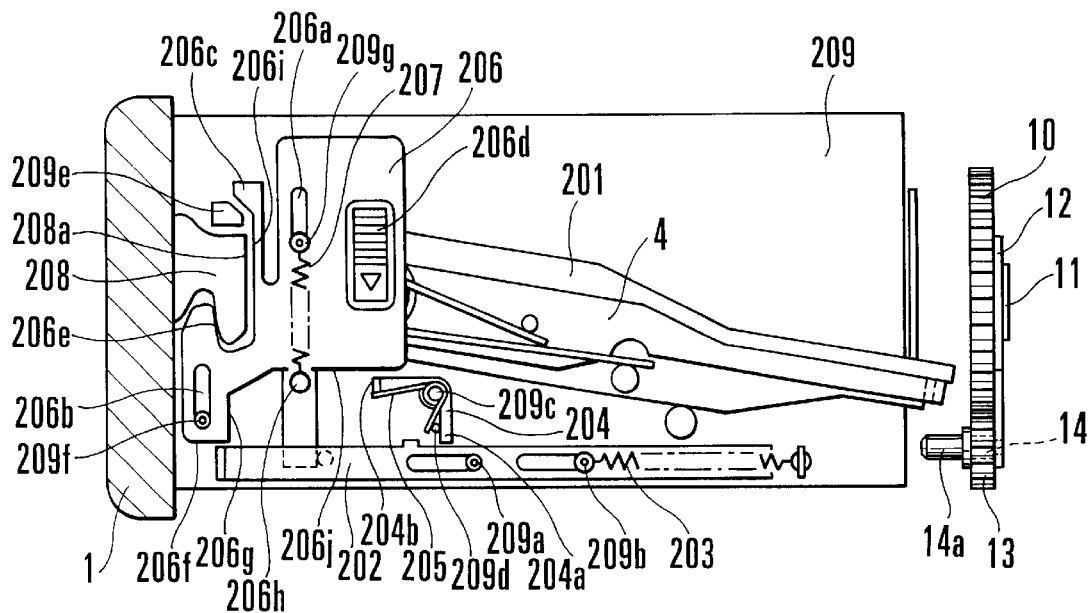
FIGS. 32(a) and 32(b) are sectional views showing the arrangement of essential parts of a camera according to a fourth embodiment of the invention, when the planet gear is in a first position.
Figure 32B:
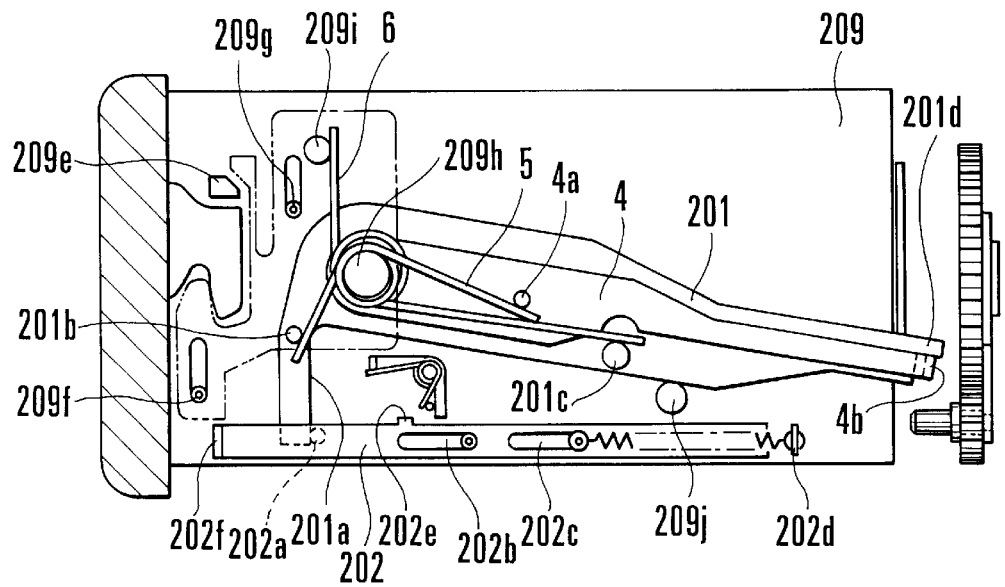
Figure 33:
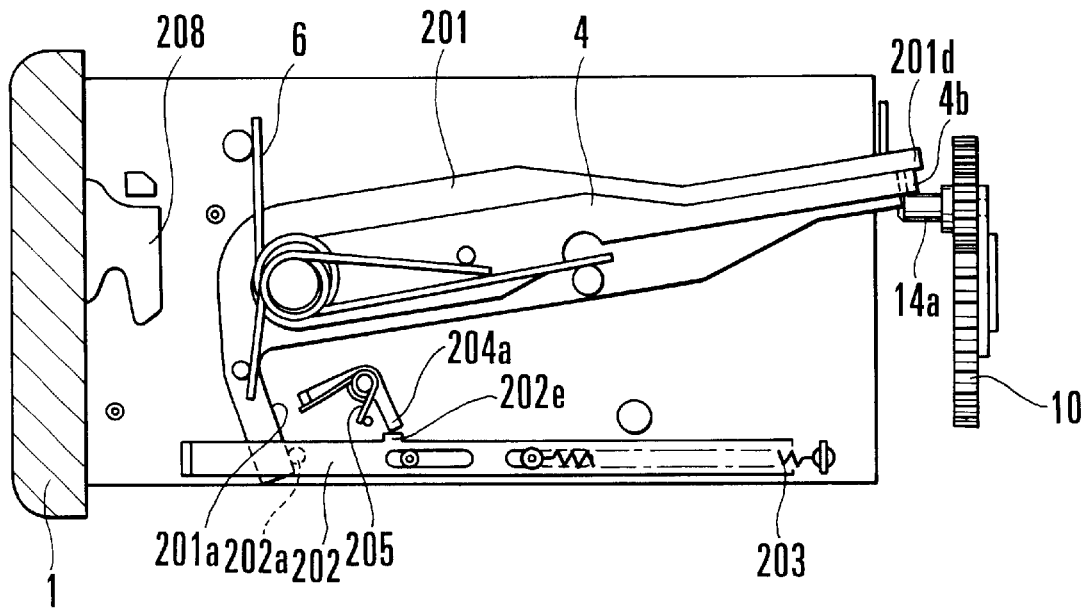
FIG. 33 is a sectional view showing the same essential parts in a state obtained when a driving lever, etc., are caused to rotate counterclockwise by rotating a fork gear clockwise from the state shown in FIGS. 32(a) and 32(b).
Figure 34:
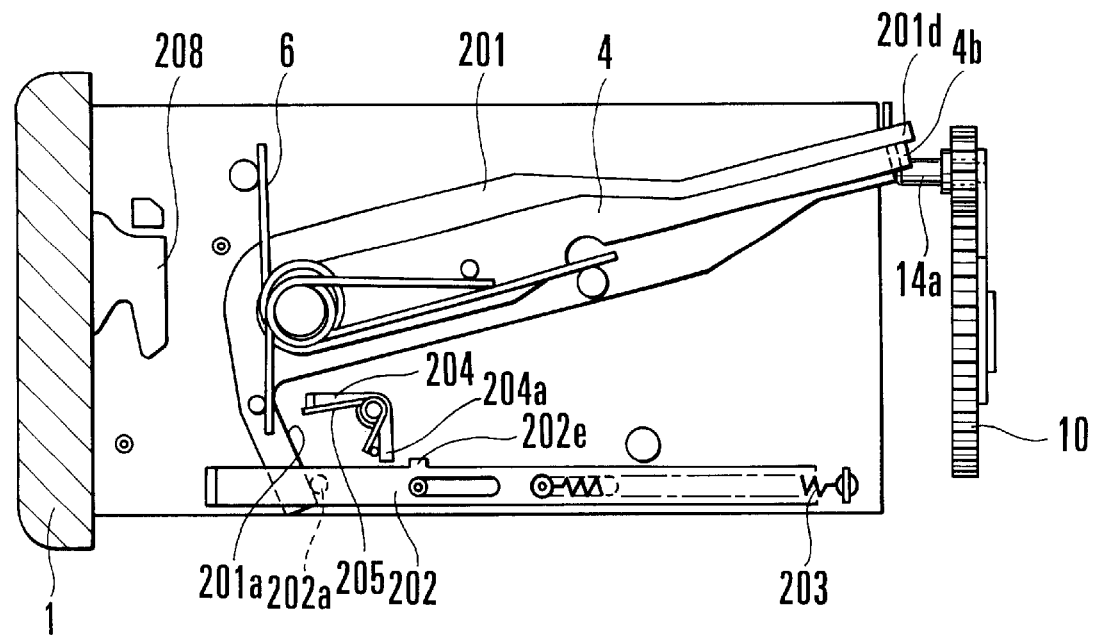
FIG. 34 is a sectional view showing the same essential parts in a state obtained when the fork gear is rotated further from the state shown in FIG. 33.
Figure 37:
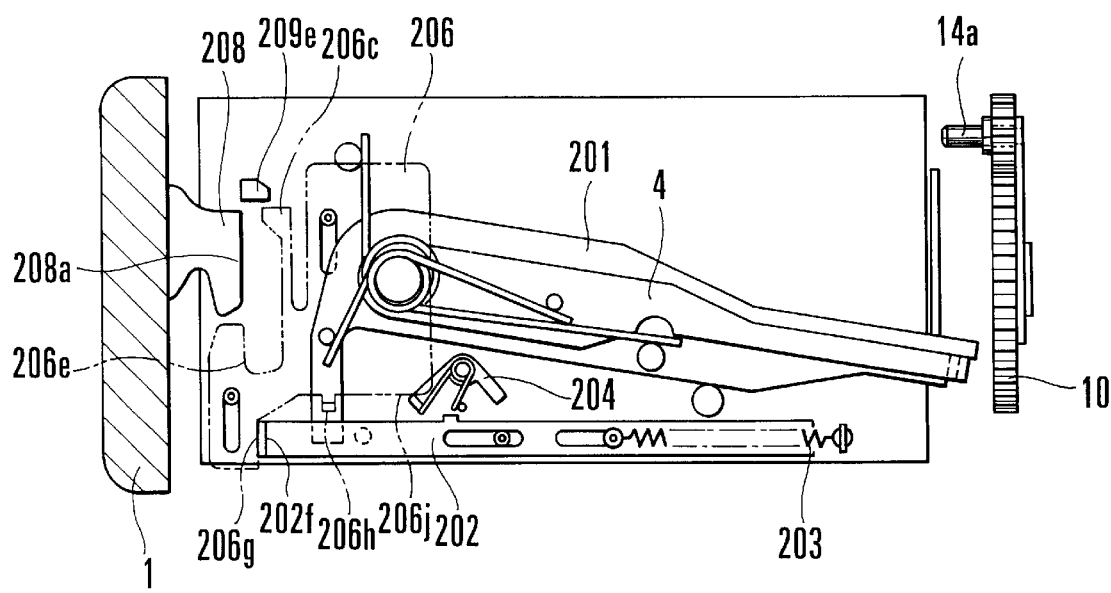
FIG. 37 is a sectional view showing the same essential parts in a state obtained when the cartridge chamber lid is opened in the camera in the fourth embodiment of the invention.
Figure 38:
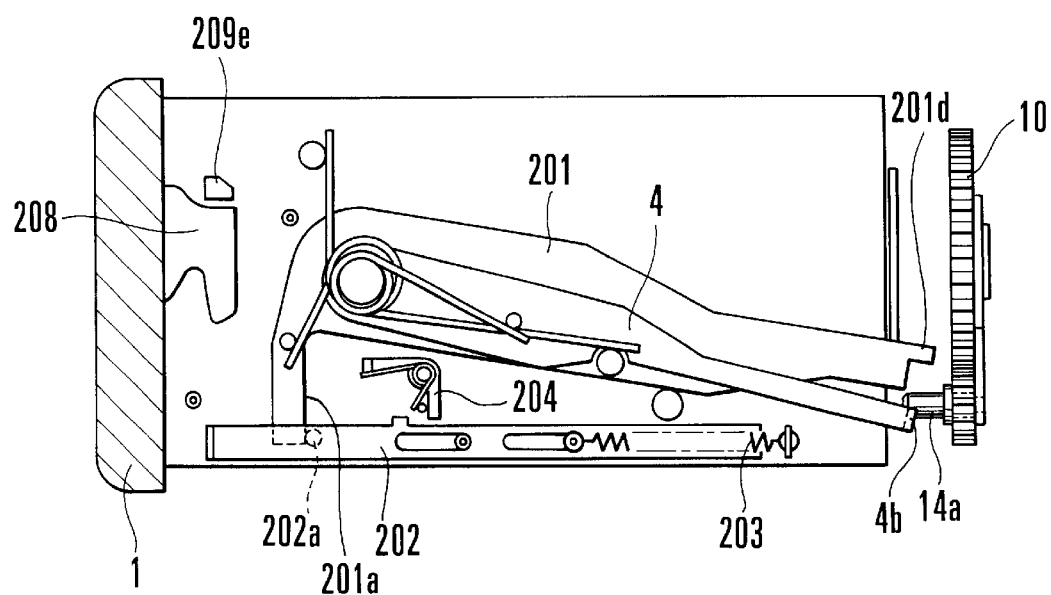
FIG. 38 is a sectional view showing the same essential parts in a state obtained at the commencement of film rewinding in the camera in the fourth embodiment of the invention.

FIGS. 32(a) and 32(b) to FIG. 38 relate to a camera according to a fourth embodiment of the invention. FIGS. 32(a) and 32(b) show in sectional views the structural arrangement of essential parts of the camera in the fourth embodiment. FIG. 33 shows in a sectional view the essential parts in a state obtained when a driving lever, etc., are caused to swing counterclockwise by rotating the fork gear clockwise from the state shown in FIGS. 32(a) and 32(b). FIG. 34 shows in a sectional view the essential parts in a state obtained by rotating the fork gear further counterclockwise from the state shown in FIG. 33. FIG. 35 shows in a sectional view the essential parts in a state obtained by unlocking an operation knob to bring a cartridge chamber lid into an unlocked state for opening at any time. FIG. 36 shows in a sectional view the essential parts in a state obtained immediately before the cartridge chamber lid is opened by sliding the operation knob from the state shown in FIG. 35. FIG. 37 shows in a sectional view the essential parts in a state obtained with the cartridge chamber lid opened. FIG. 38 shows in a sectional view the essential parts in a state obtained in rewinding a film.

All parts of the fourth embodiment that are identical in shape and function with those of the first embodiment disclosed in the foregoing are indicated by the same reference numerals. A mechanism of transmitting a driving power to the fork gear and an arrangement for thrusting-out, winding and rewinding the film and setting a film using state indication on the film cartridge are the same as those of the first embodiment and, therefore, the details of the mechanism and the arrangement are omitted from the following description.

FIGS. 32(a) and 32(b) show all the component elements essential to the fourth embodiment. Therefore, the arrangement of each member of the fourth embodiment of the invention is first described with reference to FIGS. 32(a) and 32(b).

Referring to FIGS. 32(a) and 32(b), a set lever 201 is supported by a shaft 209h of a camera body 209 to be swingable on the shaft 209h. A torsion spring 6 is set between shafts 209i and 201c to urge the set lever 201 to swing clockwise. The clockwise swing of the set lever 201 is restricted by a shaft 209j. A stop lever 202 is supported in a laterally slidable manner by shafts 209a and 209b which are fitted in slots 202b and 202c formed in the stop lever 202. A spring 203 is arranged between a hook part 202d of the stop lever 202 and the shaft 209b to constantly urge the stop lever 202 to move to the left as viewed in FIGS. 32(a) and 32(b). The stop lever 202 has a shaft 202a which extends rearward on the rear side of the paper of the drawing of FIGS. 32(a) and 32(b) and is arranged to abut on an end face 201a of the set lever 201. A latch pawl 204 is rotatably supported by a shaft 209c. A torsion spring 205 which is set between a bent-up part 204b of the latch pawl 204 and a shaft 209d is arranged to urge the latch pawl 204 to swing clockwise. The clockwise swing of the latch pawl 204 is stopped by the shaft 209d. A lock part 204a of the latch pawl 204 is arranged to abut on a locking projection 202e of the stop lever 202 when the stop lever 202 slides to the right as viewed in FIGS. 32(a) and 32(b).

An operation knob 206 is slidably supported by shafts 209f and 209g which are fitted into slots 206a and 206b of the operation knob 206 to permit the operation knob 206 to slide vertically as viewed in FIGS. 32(a) and 32(b). A spring 207 which is arranged between a spring peg part 206h and the shaft 209g to urge the operation knob 206 to move upward as viewed in FIGS. 32(a) and 32(b). An operation part 206d is arranged to be operated in opening the cartridge chamber lid 1. When the operation knob 206 is caused to slide against the force of the spring 207 by pushing the operation part 206d downward as viewed in FIGS. 32(a) and 32(b), a hook part 206e which locks the hook claw 208 of the cartridge chamber lid 1 is retracted downward as viewed in FIGS. 32(a) and 32(b) to unlock the cartridge chamber lid 1, so that the cartridge chamber lid 1 can be opened. However, when the stop lever 202 is in a stop position as shown in FIG. 32(a), the stopper face 206f of the operation knob 206 abuts on the bent-up part 202f of the stop lever 202 to prevent the cartridge chamber lid 1 from being opened.

The operation knob 206 is provided with a lock claw 206c and an elastic deforming part 206i. When the operation knob 206 is slid downward, the elastic deforming part 206i deforms to allow the lock claw 206c to abut on a projection 209e in such a way as to retain the operation knob 206, against the force of the spring 207, in a state in which the cartridge chamber lid 1 can be opened. In closing the cartridge chamber lid 1, an abutting part 208a of a hook claw 208 pushes up the lock claw 206c to cause the lock claw 206c to override the projection 209e. Then, the spring 207 acts to slide the operation knob 206 upward and to cause the hook part 206e of the operation knob 206 to engage the hook claw 208 of the cartridge chamber lid 1. The closing action of the cartridge chamber lid 1 is thus completed. Further, an end face 206j of the operation knob 206 is arranged to abut on the bent-up part 204b of the latch claw 204 when the operation knob 206 slides downward.

Like in the case of the first embodiment, the driving lever 4 is arranged to be supported by a shaft 209h to swing thereon and to be urged by the spring 5 to swing counterclockwise relative to the set lever 201. The driving part 4b of the driving lever 4 abuts on the abutting part 201d of the set lever 201 to restrict the counterclockwise swing of the driving lever 4. The driving part 4b is also arranged to be driven by the shaft 14 of the planet gear 13 which is driven by the fork gear 10 in the same manner as the first embodiment.

The fourth embodiment arranged as described above operates as follows. Incidentally, the operation knob 206 is illustrated by a two-dot-chain line in FIGS. 32(b), 36 and 37, and is omitted in FIGS. 33, 34, 35 and 38 for simplifying the illustration.

FIGS. 32(a) and 32(b) show the essential parts of the camera in a state obtained after completion of setting a film using state indication part of the cartridge with the film rewound upon completion of a photo-taking operation on the film. In the state shown in FIG. 32(a), the cartridge chamber lid 1 cannot be opened by pushing the operation knob 206 downward, as the stopper face 206f is abutting on the bent-up part 202f of the stop lever 202. In other words, the operation knob 206 is kept in a locked state.

FIG. 33 shows the essential parts in a state obtained while the driving lever 4 and the set lever 201 are in process of being swung counterclockwise with the shaft 14 of the planet gear 13 by causing the fork gear 10 to rotate again in the film thrust-out direction after completion of setting the film using state indication.

When the set lever 201 is swung counterclockwise, the shaft 202a of the stop lever 202 which is abutting on the end face 201a of the set lever 201 is pushed against the force of the spring 203 to the right as viewed in FIG. 33. This causes the stop lever 202 to slide to the right. Then, the locking projection 202e comes to cause the latch pawl 204 to swing counterclockwise against the force of the spring 205. When the set lever 201 swings further counterclockwise, the locking projection 202e comes to override the lock part 204a of the latch pawl 204 as shown in FIG. 34. Therefore, the latch pawl 204 is allowed to be brought back to its position shown in FIG. 32(a) by the force of the spring 205. When the fork gear 10 further rotates, the shaft 14 (14a) of the planet gear 13 disengages from the driving lever 4 in the same manner as in the case of the first embodiment, to bring about a state shown in FIG. 35.

In the state shown in FIG. 35, the set lever 201 has been returned by the spring 6 to the state shown in FIG. 32(a). However, the stop lever 202 has come to have the locking projection 202e abut on the lock part 204a of the latch pawl 204. Therefore, even after the disappearance of the rightward driving force of the set lever 201, the position of the stop lever 202 sliding by the spring 203 to the left is retained as shown in FIG. 35. In the state shown in FIG. 35, therefore, the operation knob 206 is in an unlocked position, so that the operation knob 206 can be slid downward. When the operation knob 206 is slid downward, the lock claw 206c abuts on the projection 209e. Then, the elastic deforming part 206i deforms to allow the lock claw 206c to override the projection 209e. FIG. 36 shows the lock claw 206c in process of overriding the projection 209e.

When the operation knob 206 slides further downward, the end face 206j of the operation knob 206 pushes the bent-up part 204b of the latch pawl 204 to cause the latch pawl 204 to swing counterclockwise against the force of the spring 205. The lock part 204a of the latch pawl 204 then ceases to lock the locking projection 202e of the stop lever 202 to render the stop lever 202 slidable to the left. However, in the state shown in FIG. 36, the cartridge chamber lid 1 cannot be opened as yet, because the hook claw 208 of the cartridge chamber lid 1 is not completely detached from the hook part 206e of the operation knob 206.

When the operation knob 206 slides still further downward, the hook claw 208 is completely freed from the hook part 206e, so that the cartridge chamber lid 1 can be opened. Then, since the abutting part 208a of the hook claw 208 escapes to the left, the lock claw 206c overrides the projection 209e and is allowed to come back to the position shown in FIG. 37 by the action of the elastic deforming part 206i. Then, the lock claw 206c is in a position where it can abut on the lower face of the projection 209e. Therefore, the operation knob 206 can be slid slightly upward from the position shown in FIG. 37 against the force of the spring 207 and can be set in that position. In the state shown in FIG. 37, the cartridge chamber lid 1 is opened and is waiting for a closing operation. The stop lever 202 is freed from the latch claw 204 to be slid to the left by the force of the spring 203. However, the end face 206g of the operation knob 206 is abutting on the bent-up part 202f to keep the stop lever 202 at a position before the locking position of the operation knob 206.

When the cartridge chamber lid 1 is closed from the state shown in FIG. 37, the abutting part 208a of the hook claw 208 pushes the lock claw 206c upward to bring it in a position where the lock claw 206c can override the projection 209e. Then, the spring 207 causes the operation knob 206 to slide upward. Accordingly, the hook part 206e engages the hook claw 208 to bring the cartridge chamber lid 1 into a locked state. Further, since the end face 206g also moves upward, the stop lever 202 slides to the left up to the locking position of the operation knob 206 shown in FIGS. 32(a) and 32(b) and comes to a stop at that position. Since the end face 206j of the operation knob 206 moves upward, the latch pawl 204 is caused to swing clockwise by the spring 205 and returns to the waiting position shown in FIGS. 32(a) and 32(b).

FIG. 38 shows the essential parts in a state obtained at the beginning of a film rewinding process after completion of a film transport process with the cartridge chamber lid 1 closed from the state shown in FIG. 37. Like in the case of the first embodiment, when the rotating direction of the fork gear 10 is changed from the film thrust-out direction over to the film rewinding direction, the driving lever 4 only is made to move, and the set lever 201 and the stop lever 202 are arranged to be capable of holding the operating knob 206 in its locked position in the same manner as in the case of FIGS. 32(a) and 32(b).

As described above, even in the camera arranged to open and close the cartridge chamber lid 1 by means of the operation knob 206, the cartridge chamber lid 1 can be unlocked by the operation of the operation knob 206 when the rotating direction of the fork gear 10 is changed from the film rewinding direction to the film thrust-out direction. Therefore, the arrangement effectively prevents the cartridge chamber lid 1 from being inadvertently opened while the film is in process of being pulled out from the cartridge, so that the film can be saved from being wasted by such an accident.

Each of the embodiments disclosed above has been described on the assumption that it uses a film cartridge of the kind having even a fore end part (leader part) of film rolled therein. However, the arrangement of each of the embodiments is likewise advantageously applicable to the conventional type film cartridge containing a film called a 135 film (having a fore end part of the film left outside of the cartridge to be readily hooked on a spool of the camera).

Further, with respect to the rotation of the fork gear 10 and that of the fork 11, each of the embodiments is arranged to have a rotation non-transmitting range within which these rotations are not interlocked. However, the provision of this range is not always necessary for a camera adapted for use of a film cartridge containing the above-stated film called a 135 film or for use of a film cartridge having no film using state indication part.

In each of the embodiments, a planetary gear mechanism for unlocking the cartridge chamber lid is arranged at the fork gear which is disposed at the last stage of the film transport gear system. However, the invention is not limited to that arrangement. For example, the planetary gear mechanism may be arranged at a gear preceding the fork gear 10 by one or at one or two transmission gears by arranging them between the fork gear 10 and the fork 11. The arrangement anyway enables the camera to unlock the cartridge chamber lid by using a driving system for driving the fork gear 10, so that the unlocking mechanism can be simply arranged.

Each of the embodiments is arranged to load and eject the film cartridge from the lower side of the camera body. However, the film cartridge loading and ejecting direction is not limited to this direction but may be changed to any other suitable direction. For example, the film cartridge may be loaded and ejected from above or from one side of the camera body. Further, while each of the embodiments is arranged to axially load and eject the film cartridge, the invention is not limited to the axial loading and ejection.

Further, while each of the embodiments uses a film cartridge having a movable light-blocking door of the kind described above, the invention is applicable also to a film cartridge having a movable light-blocking door of a different structure.

The invention is applicable also to an image recording medium other than a film.

Further, the invention is applicable to a film cartridge of a kind which differs from the kind used in each of the embodiments, to a cartridge containing an image recording medium other than a film, to cartridges of other kinds and also to various things, such as a battery or the like, which are to be loaded and ejected.

The software arrangement and the hardware arrangement disclosed are interchangeable as desired.

The invention may be carried out by combining as necessary the embodiments or their technological elements described in the foregoing.

The invention applies to various cases where either the whole or a part of claims or the arrangement of each embodiment disclosed forms one apparatus or is used in combination with some other apparatus or as a component element of an apparatus.

Further, the invention is applicable to cameras of various kinds, such as a single-lens reflex camera, a lens-shutter type camera, a video camera, etc., optical apparatuses other than cameras, devices adapted for cameras, optical apparatuses and other apparatuses, and component elements forming these apparatuses and devices.

What is claimed is:

1. An optical apparatus having a cartridge chamber lid, comprising:
    a) a motor;
    b) a sun gear which is driven by said motor;
    c) a planet gear meshing with said sun gear; said planet gear moving from a first position to a second position while rotating when said sun gear rotates in a first direction, and moving from the second position to the first position while rotating when said sun gear rotates in a second direction opposite to the first direction; and
    d) a lock mechanism which shifts said cartridge chamber lid from a locked state to an unlocked state by revolving force of said planet gear when said planet gear moves around said sun gear from the first position to the second position.

2. An optical apparatus according to claim 1, wherein said lock mechanism has a lever member which engages said cartridge chamber lid, and wherein said lever member disengages from said cartridge chamber lid in association with only movement of said planet gear from the first position to the second position.

3. An optical apparatus according to claim 2, wherein said lock mechanism has an urging member which urges said lever member to a position where said lever member engages said cartridge chamber lid, and wherein, after said lever member disengages from said cartridge chamber lid in association with movement of said planet gear from the first position to the second position, said lever member is caused by an urging force of said urging member to return to the position where said lever member engages said cartridge chamber lid.

4. An optical apparatus according to claim 1, wherein said lock mechanism has a first lever member which engages said cartridge chamber lid and a second lever member which engages said planet gear, and wherein, when said planet gear moves from the first position to the second position, both said first lever member and said second lever member move to cause said first lever member to disengage from said cartridge chamber lid, and, when said planet gear moves from the second position to the first position, only said second lever member moves and said first lever member maintains engaging said cartridge chamber lid.

5. An optical apparatus according to claim 4, wherein said lock mechanism has an urging member which urges said second lever member to said first lever member.

6. An optical apparatus according to claim 1, wherein said sun gear is arranged to drive a fork, and wherein said fork rotates in such direction as to thrust out a film when said sun gear rotates in the first direction, and said fork rotates in such a direction as to rewind the film when said sun gear rotates in the second direction.

7. An optical apparatus having a cartridge chamber lid, comprising:
    a) a driving gear arranged to drive a member which engages a spool of a cartridge;
    b) a planet gear which engages with said driving gear and revolves relative to said driving gear; and
    c) a lock mechanism which shifts said cartridge chamber lid from a locked state to an unlocked state by the revolving force of said planet gear when said driving gear rotates from a rewinding direction to a thrusting-out direction.

8. An optical apparatus according to claim 7, wherein said lock mechanism has a lever member which engages said cartridge chamber lid, and wherein said lever member disengages from said cartridge chamber lid when the rotating direction of said driving gear changes from the rewinding direction to the thrusting-out direction.

9. An optical apparatus according to claim 8, wherein said lock mechanism has an urging member which urges said lever member to a position where said lever member engages said cartridge chamber lid, and wherein, after said lever member disengages from said cartridge chamber lid when the rotating direction of said driving gear changes from the rewinding direction to the thrusting-out direction, said lever member is caused by an urging force of said urging member to return to the position where said lever member engages said cartridge chamber lid.

10. An optical apparatus according to claim 7, wherein said lock mechanism has a first lever member which engages said cartridge chamber lid and a second lever member which engages said driving gear, and wherein, when the rotating direction of said driving gear changes from the rewinding direction to the thrusting-out direction, both said first lever member and said second lever member move to cause said first lever member to disengage from said cartridge chamber lid, and, when the rotating direction of said driving gear changes from the thrusting-out direction to the rewinding direction, only said second lever member moves and said first lever member maintains engaging said cartridge chamber lid.

11. An optical apparatus according to claim 10, wherein said lock mechanism has an urging member which urges said second lever member to said first lever member.

12. An optical apparatus according to claim 7, wherein an operation of changing a film using state indication is performed when said driving gear rotates in the rewinding direction.

* * * * *

UNITED STATES PATENT AND TRADEMARK OFFICE
CERTIFICATE OF CORRECTION

PATENT NO. : 6,375,367 B2
DATED : April 23, 2002
INVENTOR(S) : Masakazu Taku

It is certified that error appears in the above-identified patent and that said Letters Patent is hereby corrected as shown below:

Column 2,
Line 18, delete "the-same" and insert -- the same --.

Signed and Sealed this

First Day of October, 2002

Attest:

JAMES E. ROGAN
Attesting Officer  Director of the United States Patent and Trademark Office